US012236862B2

(12) United States Patent
Yonebayashi

(10) Patent No.: US 12,236,862 B2
(45) Date of Patent: Feb. 25, 2025

(54) DISPLAY DEVICE AND METHOD FOR DRIVING SAME

(71) Applicant: Sharp Kabushiki Kaisha, Sakai (JP)

(72) Inventor: Ryo Yonebayashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/559,397

(22) PCT Filed: Jun. 17, 2021

(86) PCT No.: PCT/JP2021/023034
§ 371 (c)(1),
(2) Date: Nov. 7, 2023

(87) PCT Pub. No.: WO2022/264359
PCT Pub. Date: Dec. 22, 2022

(65) Prior Publication Data
US 2024/0233633 A1 Jul. 11, 2024

(51) Int. Cl.
*G09G 3/3225* (2016.01)

(52) U.S. Cl.
CPC ....... *G09G 3/3225* (2013.01); *G09G 2300/02* (2013.01); *G09G 2310/0208* (2013.01); *G09G 2310/0237* (2013.01); *G09G 2310/0286* (2013.01)

(58) Field of Classification Search
CPC ... G09G 3/3225; G09G 3/3233; G09G 3/3291
See application file for complete search history.

(56) References Cited

U.S. PATENT DOCUMENTS

2010/0164847 A1 7/2010 Lee et al.
2012/0001896 A1 1/2012 Han et al.
2020/0118487 A1 4/2020 Kim et al.
2020/0226978 A1 7/2020 Lin et al.
2021/0110769 A1 4/2021 Ueno

FOREIGN PATENT DOCUMENTS

JP 2020-112795 A 7/2020
WO 2019/186763 A1 10/2019

*Primary Examiner* — Sardis F Azongha
(74) *Attorney, Agent, or Firm* — Keating & Bennett, LLP

(57) ABSTRACT

The present application discloses a current-driven display device employing an internal compensation method capable of achieving high-resolution of the display image while suppressing a reduction in the yield of manufacturing, the deterioration in display quality, an increase in the circuit amount. In a pixel circuit of an organic EL display device, a voltage of the gate terminal of a drive transistor is initialized before the voltage of a data signal line is written into a holding capacitor via the drive transistor in a diode-connected state. At this time, a current flows from the holding capacitor connected to the gate terminal of the drive transistor to an initialization voltage line via a threshold compensation transistor, a second light emission control transistor, and a display element initialization transistor, and the voltage of the gate terminal is initialized. Thus, an initialization transistor provided between the gate terminal and the initialization voltage line in the related art comes to be unnecessary.

15 Claims, 26 Drawing Sheets

DISPLAY DEVICE AND METHOD FOR DRIVING SAME

TECHNICAL FIELD

The present disclosure relates to a display device, and more particularly to a current-driven display device including a display element driven by a current, such as an organic electro-luminescence (EL) display device, and a method for driving the display device.

BACKGROUND ART

In recent years, organic EL display devices (also referred to as "OLED display devices") provided with pixel circuits including organic EL elements (also referred to as organic light emitting diodes (OLEDs)) have been put to practical use. The pixel circuit in such an organic EL display device includes a drive transistor, a write control transistor, a holding capacitor, and the like in addition to the organic EL element. A thin film transistor is used for the drive transistor and the write control transistor. The holding capacitor is connected to a gate terminal of the drive transistor. A voltage corresponding to an image signal representing an image to be displayed (more specifically, a voltage indicating the gray scale values of pixels to be formed by the pixel circuit, hereinafter referred to as a "data voltage") is applied to the holding capacitor from the drive circuit via a data signal line. The organic EL element is a self-luminous display element that emits light with luminance corresponding to a current flowing through the organic EL element. The drive transistor is provided in series with the organic EL element and controls the current flowing through the organic EL element in accordance with a voltage held by the holding capacitor.

Variation and shift occur in characteristics of the organic EL element and the drive transistor. Thus, variation and shift in characteristics of these elements need to be compensated in order to perform higher image quality display in the organic EL display device. For the organic EL display device, a method for compensating the characteristics of the elements inside the pixel circuits and a method for compensating the characteristics of the elements outside the pixel circuits are known. One known pixel circuit corresponding to the former method is a pixel circuit configured to charge the holding capacitor with the data voltage via the drive transistor in a diode-connected state after initializing the voltage at the gate terminal of the drive transistor, that is, the voltage held in the holding capacitor. In such a pixel circuit, variation and shift of the threshold voltage in the drive transistor are compensated within the pixel circuit (hereinafter, the compensation of variation and shift of the threshold voltage is referred to as "threshold compensation").

As described above, matters associated with an organic EL display device (OLED display device) employing a method of threshold compensation in a pixel circuit (hereinafter referred to as an "internal compensation method") is described in, for example, PTL 1. In the pixel circuit of the organic EL display device employing the internal compensation method as discussed above (hereinafter referred to as an "internal compensation type pixel circuit"), in addition to a transistor for initializing the voltage of the gate terminal of the drive transistor, that is, the gate voltage of the drive transistor (hereinafter referred to as a "gate voltage initialization transistor"), a transistor for initializing the voltage of the anode electrode of the organic EL element, that is, the anode voltage of the organic EL element (hereinafter referred to as an "anode voltage initialization transistor" or a "display element initialization transistor") is generally provided to suppress the deterioration in display quality affected by the previous frame image (for example, see switching transistors Qs2 and Qs6 illustrated in FIG. 2 of PTL 1). In PTL 2 as well, some pixel circuits serving as pixel circuits in an OLED display device employing an internal compensation method (internal compensation type pixel circuits) and configured to perform initialization of the gate voltage and initialization of the anode voltage are disclosed (for example, see FIGS. 4C, 8A, and 10 in PTL 2).

CITATION LIST

Patent Literature

PTL 1: US 2010/0164847 A
PTL 2: US 2012/0001896 A
PTL 3: WO 2019/186763
PTL 4: US 2020/0118487 A
PTL 5: JP 2020-112795 A

SUMMARY

Technical Problem

In the internal compensation type pixel circuit as described above, it is necessary to initialize the anode voltage in order to suppress the deterioration in display quality, and therefore an anode voltage initialization transistor is generally provided in addition to a gate voltage initialization transistor. Thus, in the internal compensation type pixel circuit, the number of elements is large and the layout density is high. As a result, it is difficult to achieve high-resolution of the display image, and when an attempt is made to support high-resolution, the yield of manufacturing of a display panel is likely to be lowered.

On the other hand, an internal compensation type pixel circuit configured as follows is also known: instead of providing the gate voltage initialization transistor, a transistor to perform other functions in the pixel circuit is also used for initializing the gate voltage. For example, in a pixel circuit illustrated in FIG. 12 of PTL 1, a switching transistor Qs3 for threshold compensation, a switching transistor Qs5 for light emission control, and a switching transistor Qs6 for initialization of the anode voltage are also used for initialization of the gate voltage (voltage of a node N1). In addition, for example, a threshold compensation type pixel circuit having a similar configuration to the above-mentioned configuration is also disclosed in FIG. 8A of PTL 2.

However, in such a threshold compensation type pixel circuit, although the number of necessary elements can be decreased as compared with a threshold compensation type pixel circuit including both a gate voltage initialization transistor and an anode voltage initialization transistor (see, for example, FIGS. 2 and 4C of PTL 2), many signal lines are required to control the transistors functioning as switching elements, and as a result, the number of wiring lines in a display portion, the circuit amount in a scanning-side drive circuit, and the like increase.

Therefore, there is a demand for a current-driven display device such as an organic EL display device employing an internal compensation method capable of achieving high-resolution of the display image while suppressing a reduction in the yield of manufacturing, deterioration in the display quality, an increase in the number of wiring lines, and an increase in the circuit amount.

Solution to Problem

A display device according to some embodiments of the disclosure includes:

a display portion including a plurality of data signal lines, a plurality of first scanning signal lines, a plurality of second scanning signal lines, a plurality of light emission control lines, a first power source line, a second power source line, an initialization voltage line, and a plurality of pixel circuits;

a data-side drive circuit configured to generate a plurality of data signals and apply the generated data signals to the plurality of data signal lines: and a scanning-side drive circuit configured to selectively drive the plurality of first scanning signal lines, selectively drive the plurality of second scanning signal lines, and selectively deactivate the plurality of light emission control lines, wherein each of the plurality of pixel circuits corresponds to one of the plurality of data signal lines, corresponds to one of the plurality of first scanning signal lines, corresponds to one of the plurality of second scanning signal lines, and corresponds to one of the plurality of light emission control lines, and includes a display element driven by a current, a drive transistor, a holding capacitor, a write control switching element, a threshold compensation switching element, first and second light emission control switching elements whose conductivity types are different from a conductivity type of the threshold compensation switching element, and an initialization switching element whose conductivity type is identical to the conductivity type of the threshold compensation switching element, the drive transistor has a first conduction terminal connected to a corresponding data signal line via the write control switching element and connected to the first power source line via the first light emission control switching element, a second conduction terminal connected to a first terminal of the display element via the second light emission control switching element, and a control terminal connected to a fixed voltage line via the holding capacitor and connected to the second conduction terminal via the threshold compensation switching element, the first terminal of the display element is connected to the initialization voltage line via the initialization switching element, and a second terminal of the display element is connected to the second power source line, the first light emission control switching element has a control terminal connected to a corresponding light emission control line, the write control switching element has a control terminal connected to a corresponding first scanning signal line, the threshold compensation switching element has a control terminal connected to a corresponding second scanning signal line, the initialization switching element has a control terminal connected to the corresponding light emission control line, the second light emission control switching element has a control terminal connected to a subsequent signal line which is either a subsequent second scanning signal line selected after the corresponding second scanning signal line or a subsequent light emission control line deactivated after the corresponding light emission control line, the subsequent second scanning signal line is a second scanning signal line that is selected from the plurality of second scanning signal lines such that a select period of the corresponding second scanning signal line overlaps with a select period of the subsequent second scanning signal line, the subsequent light emission control line is a light emission control line that is selected from the plurality of light emission control lines such that the subsequent light emission control line is deactivated after a start time point of selection of the corresponding second scanning signal line, and such that a select period of the corresponding second scanning signal line overlaps with a select period as a deactivation period of the subsequent light emission control line, and the scanning-side drive circuit drives the plurality of first scanning signal lines such that the corresponding first scanning signal line is in a non-select state from the start time point of selection of the corresponding second scanning signal line to a start time point of selection of the subsequent signal line, and is in a select state in an overlapping period of the select period of the corresponding second scanning signal line and the select period of the subsequent signal line, and selectively deactivates the plurality of light emission control lines such that the corresponding light emission control line is in a deactivated state during the select period of the corresponding second scanning signal line.

A display device according to some other embodiments of the disclosure includes:

a display portion including a plurality of data signal lines, a plurality of first scanning signal lines, a plurality of second scanning signal lines, a plurality of light emission control lines, a first power source line, a second power source line, an initialization voltage line, and a plurality of pixel circuits;

a data-side drive circuit configured to generate a plurality of data signals and apply the generated data signals to the plurality of data signal lines: and a scanning-side drive circuit configured to selectively drive the plurality of first scanning signal lines, selectively drive the plurality of second scanning signal lines, and selectively deactivate the plurality of light emission control lines, wherein each of the plurality of pixel circuits corresponds to one of the plurality of data signal lines, corresponds to one of the plurality of first scanning signal lines, corresponds to one of the plurality of second scanning signal lines, and corresponds to one of the plurality of light emission control lines, and includes a display element driven by a current, a drive transistor, a holding capacitor, a write control switching element, a threshold compensation switching element, first and second light emission control switching elements, and an initialization switching element, the drive transistor, the write control switching element, the threshold compensation switching element, the first and second light emission control switching elements, and the initialization switching element are transistors whose conductivity types are all identical, the drive transistor has a first conduction terminal connected to a corresponding data signal line via the write control switching element and connected to the first power source line via the first light emission control switching element, a second conduction terminal connected to a first terminal of the display element via the second light emission control switching element, and a control terminal connected to a fixed voltage line via the holding capacitor and connected to the second conduction terminal via the threshold compensation switching element, the first terminal of the display element is connected to the initialization voltage line via the initialization switching element, and a second terminal of the display element is connected to the second power source line, the first light emission control switching element has a control terminal connected to a corresponding light emission control line, the write control switching element has a control terminal connected to a corresponding first scanning signal line, the threshold compensation switching element has a control terminal connected to a corresponding second scanning signal line, the initialization switching element has a control terminal connected to the corresponding second scanning signal line, the second light emission control switching element has a control terminal connected to a subsequent light emission control line that is deactivated after the corresponding light emission control line is deactivated, the subsequent light emission control line is a light emission control line that is selected from the plurality of light emission control lines such that the subsequent light emission control line is deactivated after a start time point of selection of the corresponding second scanning signal line, and such that a select period of the corresponding second scanning signal line overlaps with a select period as a deactivation period of the subsequent light emission control line, and the scanning-side drive circuit drives the plurality of first scanning signal lines such that the corresponding first scanning signal line is in a non-select state from the start time point of selection of the corresponding second scanning signal line to a start time point of deactivation of the subsequent light emission control line, and is in a select state in an overlapping period of the select period of the corresponding second scanning signal line and the select period of the subsequent light emission control line, and selectively deactivates the plurality of light emission control lines such that the corresponding light emission control line is in a deactivated state during the select period of the corresponding second scanning signal line.

A drive method according to some embodiments of the disclosure is a drive method of a display device using a display element driven by a current, wherein the display device includes a display portion including a plurality of data signal lines, a plurality of first scanning signal lines, a plurality of second scanning signal lines, a plurality of light emission control lines, a first power source line, a second power source line, an initialization voltage line, and a plurality of pixel circuits, each of the plurality of pixel circuits corresponds to one of the plurality of data signal lines, corresponds to one of the plurality of first scanning signal lines, corresponds to one of the plurality of second scanning signal lines, and corresponds to one of the plurality of light emission control lines, and includes a display element driven by a current, a drive transistor, a holding capacitor, a write control switching element, a threshold compensation switching element, first and second light emission control switching elements whose conductivity types are different from a conductivity type of the threshold compensation switching element, and an initialization switching element whose conductivity type is identical to the conductivity type of the threshold compensation switching element, the drive transistor has a first conduction terminal connected to a corresponding data signal line via the write control switching element and connected to the first power source line via the first light emission control switching element, a second conduction terminal connected to a first terminal of the display element via the second light emission control switching element, and a control terminal connected to a fixed voltage line via the holding capacitor and connected to the second conduction terminal via the threshold compensation switching element, the first terminal of the display element is connected to the initialization voltage line via the initialization switching element, and a second terminal of the display element is connected to the second power source line, the first light emission control switching element has a control terminal connected to a corresponding light emission control line, the write control switching element has a control terminal connected to a corresponding first scanning signal line, the threshold compensation switching element has a control terminal connected to a corresponding second scanning signal line, the initialization switching element has a control terminal connected to the corresponding light emission control line, the second light emission control switching element has a control terminal connected to a subsequent signal line which is either a subsequent second scanning signal line selected after the corresponding second scanning signal line or a subsequent light emission control line deactivated after the corresponding light emission control line, the subsequent second scanning signal line is a second scanning signal line that is selected from the plurality of second scanning signal lines such that a select period of the corresponding second scanning signal line overlaps with a select period of the subsequent second scanning signal line, the subsequent light emission control line is a light emission control line that is selected from the plurality of light emission control lines such that the subsequent light emission control line is deactivated after a start time point of selection of the corresponding second scanning signal line, and such that a select period of the corresponding second scanning signal line overlaps with a select period as a deactivation period of the subsequent light emission control line, and the drive method includes driving the plurality of first scanning signal lines such that the corresponding first scanning signal line is in a non-select state from the start time point of selection of the corresponding second scanning signal line to a start time point of selection of the subsequent signal line, and is in a select state in an overlapping period of the select period of the corresponding second scanning signal line and the select period of the subsequent signal line, and selectively deactivating the plurality of light emission control lines such that the corresponding light emission control line is in a deactivated state during the select period of the corresponding second scanning signal line.

A drive method according to some other embodiments of the disclosure is a drive method of a display device using a display element driven by a current, wherein the display device includes a display portion including a plurality of data signal lines, a plurality of first scanning signal lines, a plurality of second scanning signal lines, a plurality of light emission control lines, a first power source line, a second power source line, an initialization voltage line, and a plurality of pixel circuits, each of the plurality of pixel circuits corresponds to one of the plurality of data signal lines, corresponds to one of the plurality of first scanning signal lines, corresponds to one of the plurality of second scanning signal lines, and corresponds to one of the plurality of light emission control lines, and includes a display element driven by a current, a drive transistor, a holding capacitor, a write control switching element, a threshold compensation switching element, first and second light emission control switching elements, and an initialization switching element, each of the drive transistor, the write control switching element, the threshold compensation switching element, the first and second light emission control switching elements, and the initialization switching element is a P-type transistor, the drive transistor has a first conduction terminal connected to a corresponding data signal line via the write control switching element and connected to the first power source line via the first light emission control switching element, a second conduction terminal connected to a first terminal of the display element via the second light emission control switching element, and a control terminal connected to a fixed voltage line via the holding capacitor and connected to the second conduction terminal via the threshold compensation switching element, the first terminal of the display element is connected to the initialization voltage line via the initialization switching element, and a second terminal of the display element is connected to the second power source line, the first light emission control switching element has a control terminal connected to a corresponding light emission control line, the write control switching element has a control terminal connected to a corresponding first scanning signal line, the threshold compensation switching element has a control terminal connected to a corresponding second scanning signal line, the initialization switching element has a control terminal connected to the corresponding second scanning signal line, the second light emission control switching element has a control terminal connected to a subsequent light emission control line that is deactivated after the corresponding light emission control line is deactivated, the subsequent light emission control line is a light emission control line that is selected from the plurality of light emission control lines such that the subsequent light emission control line is deactivated after a start time point of selection of the corresponding second scanning signal line, and such that a select period of the corresponding second scanning signal line overlaps with a select period as a deactivation period of the subsequent light emission control line, and the drive method includes driving the plurality of first scanning signal lines such that the corresponding first scanning signal line is in a non-select state from the start time point of selection of the corresponding second scanning signal line to a start time point of deactivation of the subsequent light emission control line, and is in a select state in an overlapping period of the select period of the corresponding second scanning signal line and the select period of the subsequent light emission control line, and selectively deactivating the plurality of light emission control lines such that the corresponding light emission control line is in a deactivated state during the select period of the corresponding second scanning signal line.

Advantageous Effects of Disclosure

In the pixel circuit according to the some embodiments mentioned above of the disclosure, the control terminal of the drive transistor is connected to the first power source line via the holding capacitor and to the second conduction terminal of the drive transistor via the threshold compensation switching element. The second conduction terminal is connected to the first terminal of the display element via the second light emission control switching element, and the first terminal is connected to the initialization voltage line via the initialization switching element. In this case, the conductivity types of the first and second light emission control switching elements are different from the conductivity type of the threshold compensation switching element, while the conductivity type of the initialization switching element is the same as that of the threshold compensation switching element. The control terminal of the threshold compensation switching element is connected to the second scanning signal line corresponding to the pixel circuit, the control terminal of the second light emission control switching element is connected to the subsequent signal line (the subsequent second scanning signal line or the subsequent light emission control line), and the control terminal of the initialization switching element is connected to the light emission control line corresponding to the pixel circuit. Accordingly, the threshold compensation switching element and the second light emission control switching element are in ON state in a period from the start time point of selection of the second scanning signal line to the start time point of selection of the subsequent signal line (selection of the subsequent second scanning signal line or deactivation of the subsequent light emission control line). In this period, the light emission control line is in the deactivated state, and therefore the initialization switching element whose conductivity type is different from those of the first and second light emission control switching elements is also in ON state.

Accordingly, in this period, the voltage of the initialization voltage line, that is, the initialization voltage is supplied to the holding capacitor via the initialization switching element, the second light emission control switching element, and the threshold compensation switching element. Thus, the above-discussed period corresponds to an initialization period prior to data writing into the holding capacitor. On the other hand, the first scanning signal line corresponding to the pixel circuit is in the select state in the overlapping period of the select period of the second scanning signal line and the select period of the subsequent signal line. Therefore, in the select period of the first scanning signal line, the threshold compensation switching element is in ON state in addition to the write control switching element, and the second light emission control switching element is in OFF state. In addition, in this overlapping period, the light emission control line is in the deactivated state, and therefore the first light emission control switching element is also in OFF state. In the select period of the first scanning signal line in such overlapping period, the voltage of the data signal line is supplied as the data voltage to the holding capacitor via the drive transistor brought into the diode-connected state by the threshold compensation switching element, whereby the writing of the data voltage having been subjected to threshold compensation is performed. Thus, according to the some embodiments mentioned above of the disclosure, in the pixel circuit including the above-described threshold compensation function, a dedicated switching element for initializing the holding capacitor prior to data writing is unnecessary, and the pixel circuit may be achieved with a smaller number of elements. In addition, an increase in the number of signal lines necessary for driving the pixel circuit may be suppressed as compared with the known pixel circuit in which the holding capacitor is initialized without using the dedicated switching element. As a result, in the display device employing the internal compensation method, the high-resolution of the display image may be easily achieved, and the yield of manufacturing may also be improved.

In the pixel circuit according to the some other embodiments mentioned above of the disclosure as well, the control terminal of the drive transistor is connected to the first power source line via the holding capacitor and to the second conduction terminal of the drive transistor via the threshold compensation switching element. Then, the second conduction terminal is connected to the first terminal of the display element via the second light emission control switching element, and the first terminal is connected to the initialization voltage line via the initialization switching element. In this case, the drive transistor, the write control switching element, the threshold compensation switching element, the first and second light emission control switching elements, and the initialization switching element are transistors whose conductivity types are all the same. The control terminal of the threshold compensation switching element is connected to the second scanning signal line corresponding to the pixel circuit, the control terminal of the second light emission control switching element is connected to the subsequent light emission control line, and the control terminal of the initialization switching element is connected to the second scanning signal line. Thus, the threshold compensation switching element, the second light emission control switching element, and the initialization switching element are each in ON state in a period from the start time point of selection of the second scanning signal line to the start time point of deactivation of the subsequent light emission control line. Accordingly, in this period, the voltage of the initialization voltage line, that is, the initialization voltage is supplied to the holding capacitor via the initialization switching element, the second light emission control switching element, and the threshold compensation switching element. Thus, the above-discussed period corresponds to an initialization period prior to data writing into the holding capacitor. On the other hand, the first scanning signal line corresponding to the pixel circuit is in the select state in the overlapping period of the select period of the second scanning signal line and the select period (deactivation period) of the subsequent light emission control line. Therefore, in the select period of the first scanning signal line, the threshold compensation switching element is in ON state in addition to the write control switching element, and the second light emission control switching element is in OFF state. Further, in this overlapping period, since the light emission control line corresponding to the pixel circuit is in the deactivated state, the first light emission control switching element is also in OFF state. In the select period of the first scanning signal line in such overlapping period, the voltage of the data signal line is supplied as the data voltage to the holding capacitor via the drive transistor brought into the diode-connected state by the threshold compensation switching element, whereby the writing of the data voltage having been subjected to threshold compensation is performed. Thus, according to the some other embodiments mentioned above of the disclosure, in a pixel circuit including the above-described threshold compensation function, a dedicated switching element for initializing the holding capacitor prior to data writing is unnecessary, and the pixel circuit may be achieved with a smaller number of elements. In addition, an increase in the number of signal lines necessary for driving the pixel circuit may be suppressed as compared with the known pixel circuit in which the holding capacitor is initialized without using the dedicated switching element. As a result, in the display device employing the internal compensation method using the pixel circuit configured by using the transistors and the switching elements of the same conductivity type, the high-resolution of the display image is easily achieved and the yield of manufacturing is also improved.

DESCRIPTION OF EMBODIMENTS

In the following, each embodiment will be described with reference to the accompanying drawings. Note that, in each transistor to be referred to below, a gate terminal corresponds to a control terminal, one of a drain terminal and a source terminal corresponds to a first conduction terminal, and the other of the drain terminal and the source terminal corresponds to a second conduction terminal. The transistors according to each of the embodiments are, for example, thin film transistors, but the disclosure is not limited thereto. Furthermore, “connection” in the present description means “electrical connection” unless otherwise specified, and without departing from the gist of the disclosure, the “connection” means not only direct connection, but also indirect connection via another element.

1. First Embodiment

1.1 Overall Configuration

Figure 1:
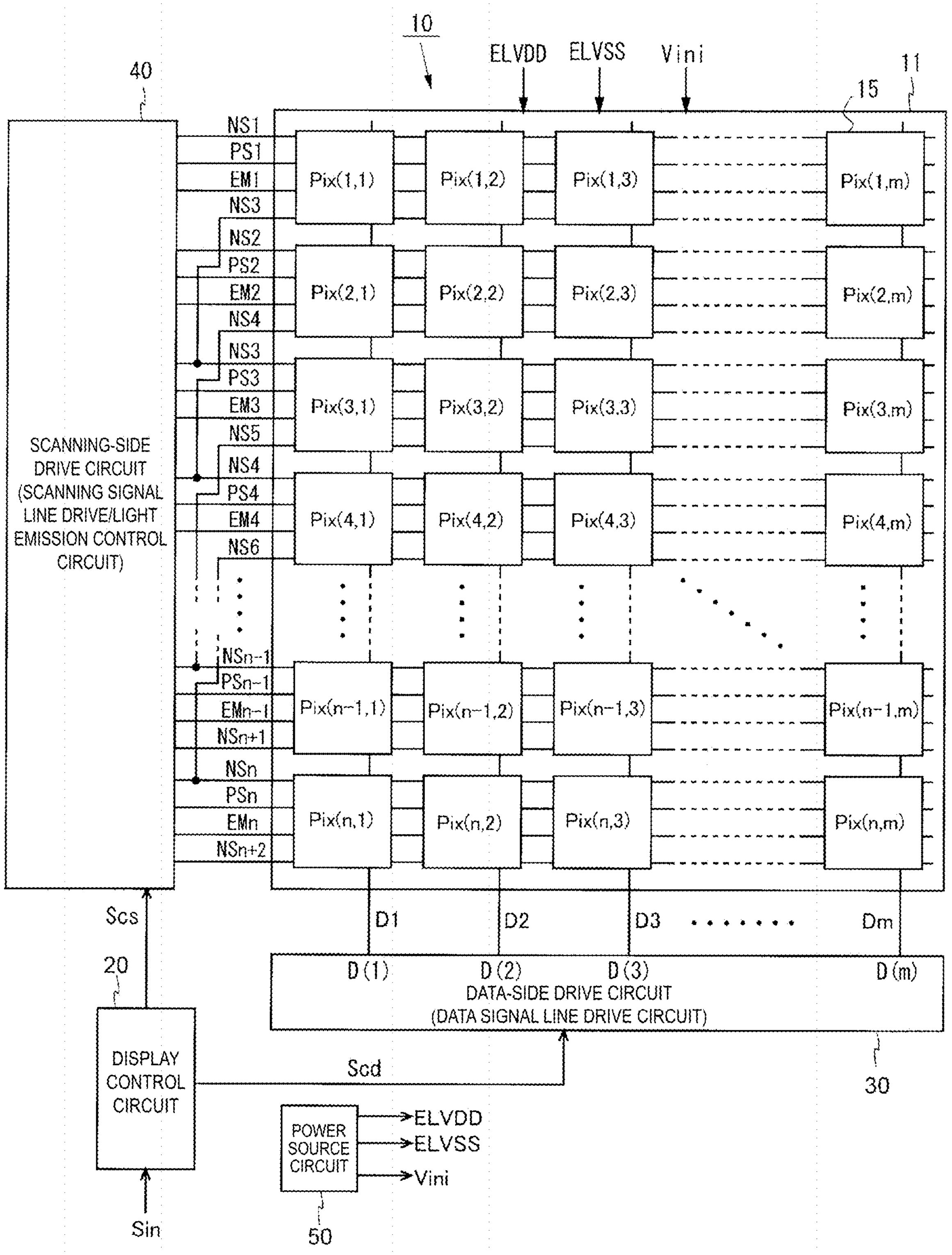
FIG. 1 is a block diagram illustrating an overall configuration of a display device according to a first embodiment.

FIG. 1 is a block diagram illustrating an overall configuration of an organic EL display device 10 according to a first embodiment. The display device 10 is an organic EL display device that performs internal compensation. That is, when pixel data is written into each pixel circuit in the display device 10, a holding capacitor is charged with the voltage of a data signal (data voltage) via a drive transistor in a diode-connected state in the pixel circuit to compensate for variations and shifts in a threshold voltage of the drive transistor (details will be described below).

As illustrated in FIG. 1, the display device 10 includes a display portion 11, a display control circuit 20, a data-side drive circuit 30, a scanning-side drive circuit 40, and a power source circuit 50. The data-side drive circuit 30 functions as a data signal line drive circuit (also referred to as a “data driver”). The scanning-side drive circuit 40 functions as a scanning signal line drive circuit (also referred to as a “gate driver”) and a light emission control circuit (also referred to as an “emission driver”). These two circuits on the scanning side are configured as one scanning-side drive circuit 40 in the configuration illustrated in FIG. 1, but a configuration where the two circuits are separated as needed, or a configuration where the two circuits are disposed separately on one side and the other side of the display portion 11 may be adopted. At least part of the scanning-side drive circuit and data signal line drive circuit may be integrally formed with the display portion 11. The same applies to other embodiments described later. The power source circuit 50 generates a high-level power source voltage ELVDD, a low-level power source voltage ELVSS, and an initialization voltage Vini, which will be described later, to be supplied to the display portion 11, and generates power source voltages (not illustrated) to be supplied to the display control circuit 20, the data-side drive circuit 30, and the scanning-side drive circuit 40.

In the display portion 11, there are disposed m (m is an integer of 2 or more) data signal lines D1, D2 to Dm, and n first scanning signal lines PS1, PS2 to PSn and n+2 (n is an integer of 2 or more) second scanning signal lines NS1, NS2 to NSn+2 intersecting with the above data signal lines: further, n light emission control lines (emission lines) EM1 to EMn are disposed along the n first scanning signal lines PS1 to PSn, respectively. Furthermore, in the display portion 11, (n×m) pixel circuits 15 arranged in a matrix shape along the m data signal lines D1 to Dm and the n first scanning signal lines PS1 to PSn are provided. Each pixel circuit 15 corresponds to one of the m data signal lines D1 to Dm and one of the n first scanning signal lines PS1 to PSn (hereinafter, when distinguishing each pixel circuit 15 from another, a pixel circuit corresponding to the i-th first scanning signal line PSi and the j-th data signal line Dj will also be referred to as a “pixel circuit on the i-th row and j-th column”, and denoted by a reference sign of “Pix(i, j)”). Each pixel circuit 15 also corresponds to one of the n second scanning signal lines NS1 to NSn and one of the n light emission control lines EM1 to EMn.

The display portion 11 is also provided with a power source line (not illustrated) common to each pixel circuit 15. In other words, a first power source line (hereinafter, referred to as a “high-level power source line” and designated by the reference sign “ELVDD” similar to the high-level power source voltage) used for supplying the high-level power source voltage ELVDD for driving the organic EL element described later, and a second power source line (hereinafter, referred to as a "low-level power source line" and designated by the reference sign "ELVSS" similar to the low-level power source voltage) used for supplying the low-level power source voltage ELVSS for driving the organic EL element are provided. More specifically, the low-level power source line ELVSS is a cathode common to the plurality of pixel circuits 15. The display portion 11 also includes a not illustrated initialization voltage line (denoted by the same reference sign "Vini" as that of the initialization voltage) for supplying the initialization voltage Vini used in a reset operation (also referred to as an "initialization operation") for initializing each pixel circuit 15. The high-level power source voltage ELVDD, the low-level power source voltage ELVSS, and the initialization voltage Vini are supplied from the power source circuit 50.

The display control circuit 20 receives an input signal Sin including image information representing an image to be displayed and timing control information for image display from outside of the display device 10 and, based on the input signal Sin, generates a data-side control signal Scd and a scanning-side control signal Scs, and outputs the data-side control signal Scd to the data-side drive circuit (data signal line drive circuit) 30 and outputs the scanning-side control signal Scs to the scanning-side drive circuit (scanning signal line drive/light emission control circuit) 40.

The data-side drive circuit 30 drives the data signal lines D1 to Dm based on the data-side control signal Scd output from the display control circuit 20. More specifically, the data-side drive circuit 30 outputs in parallel m data signals D(1) to D(m) representing an image to be displayed, and applies the data signals D(1) to D(m) to the data signal lines D1 to Dm, respectively, based on the data-side control signal Scd.

The scanning-side drive circuit 40 functions, based on the scanning-side control signal Scs from the display control circuit 20, as a scanning signal line drive circuit that drives the n first scanning signal lines PS1 to PSn and the n+2 second scanning signal lines NS1 to NSn+2, and as a light emission control circuit that drives the light emission control lines EM1 to EMn.

Figure 5:
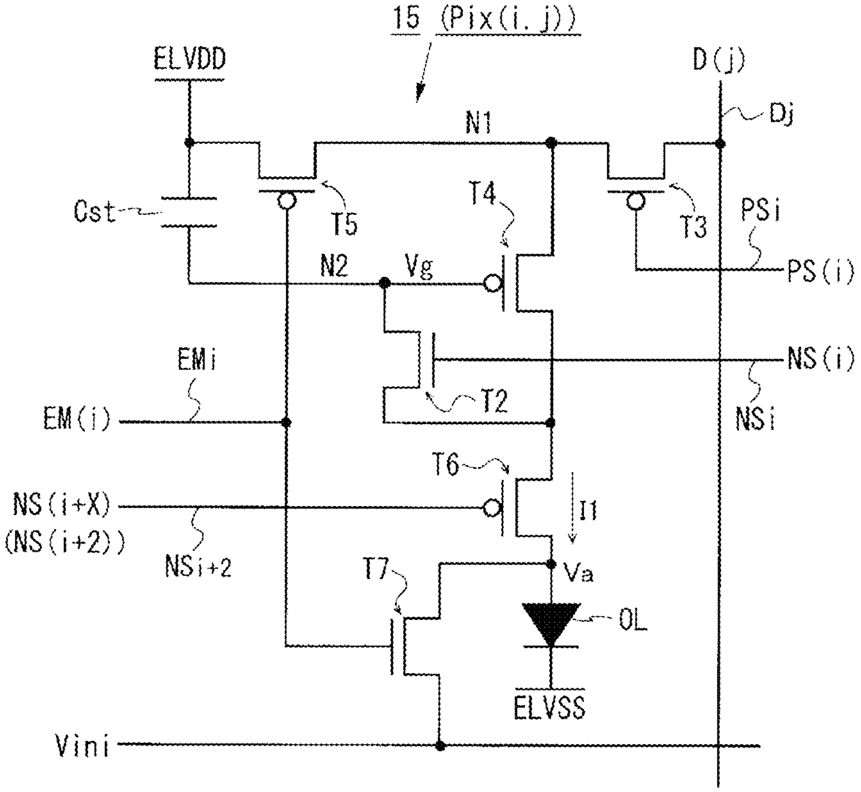
FIG. 5 is a circuit diagram illustrating a configuration of a pixel circuit according to the first embodiment.

More specifically, in each frame period, the scanning-side drive circuit 40, as the scanning signal line drive circuit, based on the scanning-side control signal Scs, sequentially selects the n first scanning signal lines PS1 to PSn each for a predetermined period corresponding to one horizontal period and sequentially selects the n+2 second scanning signal lines NS1 to NSn+2 each for a predetermined period corresponding to one horizontal period, applies an active signal to the selected first scanning signal line PSk (k is an integer satisfying a relation of $1 \leq k \leq n$) and applies an active signal to the selected second scanning signal line NSs (s is an integer satisfying a relation of $1 \leq s \leq n+2$), and applies a non-active signal to the non-selected first scanning signal lines and applies a non-active signal to the non-selected second scanning signal lines. With this, m pixel circuits Pix(k, 1) to Pix(k, m) corresponding to the selected first scanning signal line PSk are collectively selected. As a result, in the select period of the first scanning signal line PSk (hereinafter referred to as a "k-th scanning select period"), the voltages of the m data signals D(1) to D(m) applied to the data signal lines D1 to Dm from the data-side drive circuit 30 (hereinafter also referred to simply as "data voltages" in some cases when these voltages are not distinguished from each other) are written as pixel data into the pixel circuits Pix(k, 1) to Pix(k, m), respectively. As illustrated in FIG. 5 to be described later, in the present embodiment, the first scanning signal line PSi1 is connected to a gate terminal of a predetermined P-channel type (hereinafter also referred to as a "P-type") transistor in the pixel circuit 15 (*i*1=1 to n), and the second scanning signal line NSi2 is connected to a gate terminal of a predetermined N-channel type (hereinafter also referred to as an "N-type") transistor in the pixel circuit 15 (*i*2=1 to n+2). Thus, a low-level voltage is applied to the selected first scanning signal line PSi1 as an active signal, and a high-level voltage is applied to the selected second scanning signal line NSi2 as an active signal.

In each frame period, the scanning-side drive circuit 40 drives the light emission control lines EM1 to EMn in such a manner that these light emission control lines are selectively deactivated interlocking with the driving of the first and second scanning signal lines PS1 to PSn and NS1 to NSn+2. That is, when functioning as the light emission control circuit, based on the scanning-side control signal Scs, the scanning-side drive circuit 40 applies a light emission control signal (high-level voltage) indicating non-light emission to an i-th light emission control line EMi during a predetermined period including the i-th horizontal period and applies a light emission control signal (low-level voltage) indicating light emission to the i-th light emission control line EMi during other periods (i=1 to n). Organic EL elements in pixel circuits Pix(i, 1) to Pix(i, m) corresponding to the i-th first scanning signal line PSi (hereinafter, such pixel circuits are also referred to as "i-th row pixel circuits") emit light with luminance corresponding to the data voltages respectively written into the i-th row pixel circuits Pix(i, 1) to Pix(i, m) while the voltage of the light emission control line EMi is at the low level (activated state). Hereinafter, a period during which the light emission control line EMi is in a deactivated state (deactivation period) is also referred to as a "selection period" (the same applies to other embodiments).

1.2 Schematic Operation

Figure 2:
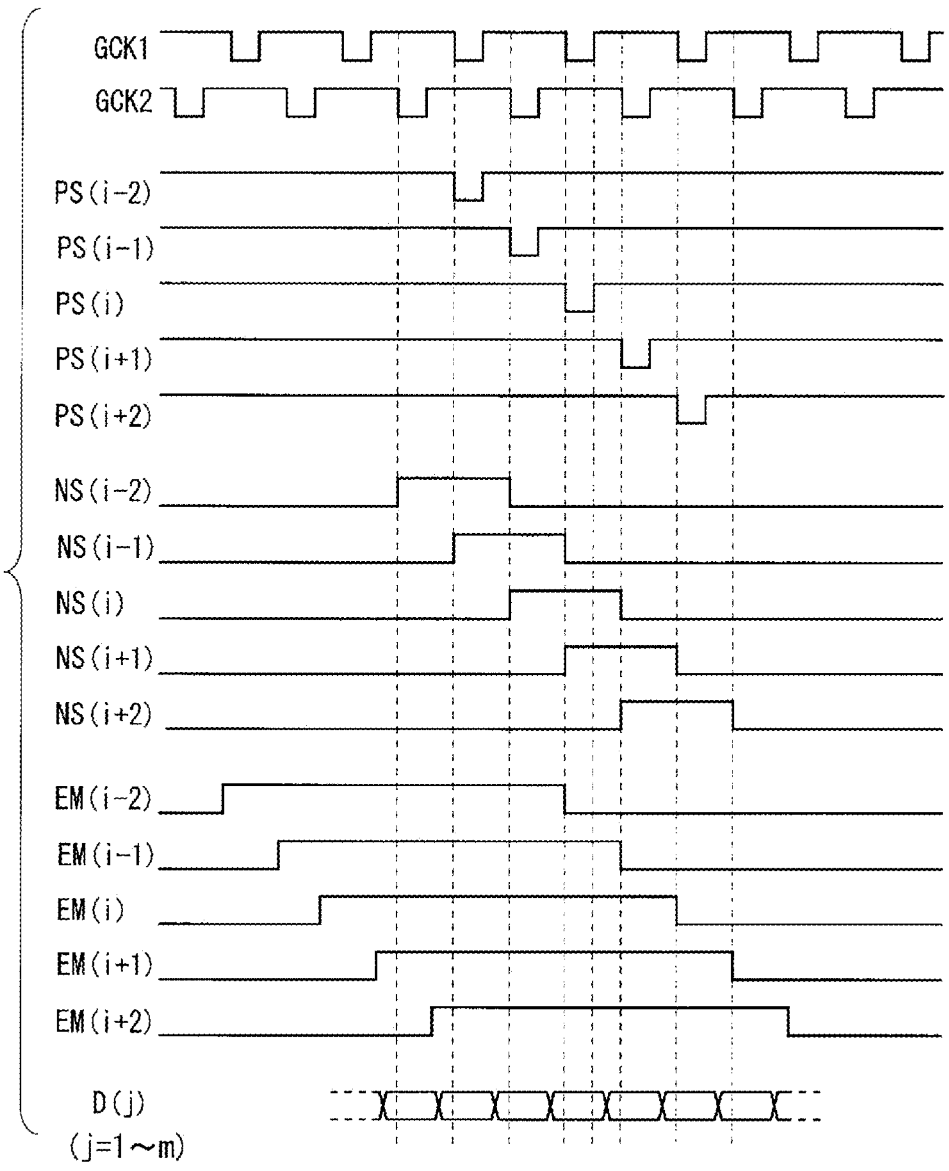
FIG. 2 is a timing chart for describing a schematic operation of a display device according to the first embodiment.

FIG. 2 is a timing chart for describing a schematic operation of the display device 10 according to the present embodiment. The scanning-side control signal Scs sent from the display control circuit 20 to the scanning-side drive circuit 40 includes a two-phase clock signal configured of first and second clock signals having mutually different phases. Hereinafter, the first clock signal will be referred to as a "first gate clock signal" and denoted by the reference sign "GCK1", and the second clock signal will be referred to as a "second gate clock signal" and denoted by the reference sign "GCK2". The scanning-side drive circuit 40, based on the two-phase clock signal, generates first scanning signals PS(1) to PS(n) and second scanning signals NS(1) to NS(n+2) as illustrated in FIG. 2, applies the first scanning signals PS(1) to PS(n) to the first scanning signal lines PS1 to PSn respectively, and applies the second scanning signals NS(1) to NS(n+2) to the second scanning signal lines NS1 to NSn+2 respectively. In addition, the scanning-side drive circuit 40, based on the two-phase clock signal (first and second gate clock signals GCK1 and GCK2), generates the light emission control signals EM(1) to EM(n) as illustrated in FIG. 2, and applies the generated light emission control signals to the light emission control lines EM1 to EMn, respectively. On the other hand, based on the data-side control signal Scd from the display control circuit 20, the data-side drive circuit 30 generates the data signals D(1) to D(m), which change interlocking with the first scanning signals PS(1) to PS(n) as illustrated in FIG. 2, and applies the generated data signals to the data signal lines D1 to Dm, respectively. In this manner, by driving the first scanning signal lines PS1 to PSn, the second scanning signal lines NS1 to NSn+2, the light emission control lines EM1 to EMn, and the data signal lines D1 to Dm in the display portion 11, initialization and data voltage writing are performed on each pixel circuit Pix(i, j) in a non-light emission period, and then in a light emission period, each of the pixel circuits emits light with luminance corresponding to the written data voltage. Note that the display devices according to other embodiments basically operate as illustrated in FIG. 2. However, an operation during a pause period when pause driving is performed is different from the operation illustrated in FIG. 2 (details will be described later).

In the present embodiment, by driving, in the manner described above, the first scanning signal lines PS1 to PSn, the second scanning signal lines NS1 to NSn+2, the light emission control lines EM1 to EMn, and the data signal lines D1 to Dm based on the various signals as illustrated in FIG. 2, a refresh frame period (hereinafter also referred to as an "RF frame period") Trf is repeated in one frame period, where the first scanning signal lines PS1 to PSn and the second scanning signal lines NS1 to NSn+2 are sequentially selected and image data is written into the display portion 11 (specifically, into the pixel circuits Pix(1, 1) to Pix(n, m) of the display portion 11).

1.3 Configuration and Operation of Pixel Circuit in Comparative Example

Prior to describing the configuration and operation of the pixel circuit 15 in the present embodiment, the configuration and operation of a pixel circuit 15*a* in a display device according to a comparative example for the present embodiment will be described with reference to FIGS. 3 and 4. In this comparative example, unlike the configuration illustrated in FIG. 1, second scanning signal lines NS−1, NS1, NS1, . . . , NSn are disposed in the display portion 11 in place of the second scanning signal lines NS1, NS2, . . . , NSn+2. Other components in the overall configuration of the comparative example are the same as the configuration illustrated in FIG. 1.

Figure 3:
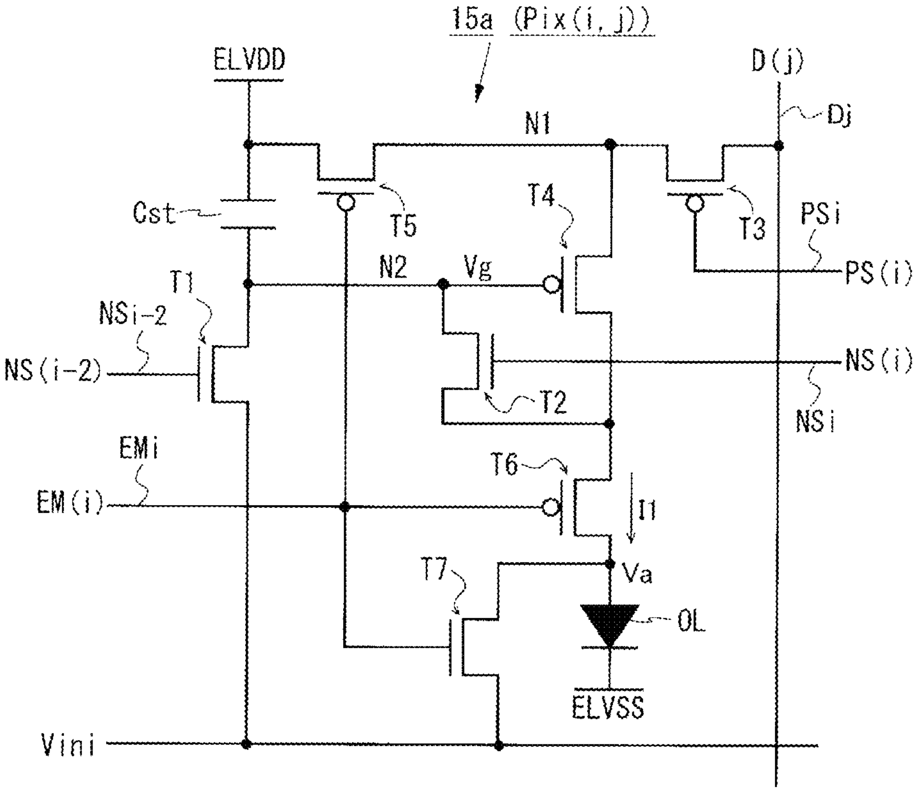
FIG. 3 is a circuit diagram illustrating a configuration of a pixel circuit in a display device according to a comparative example for the first embodiment.
Figure 4:
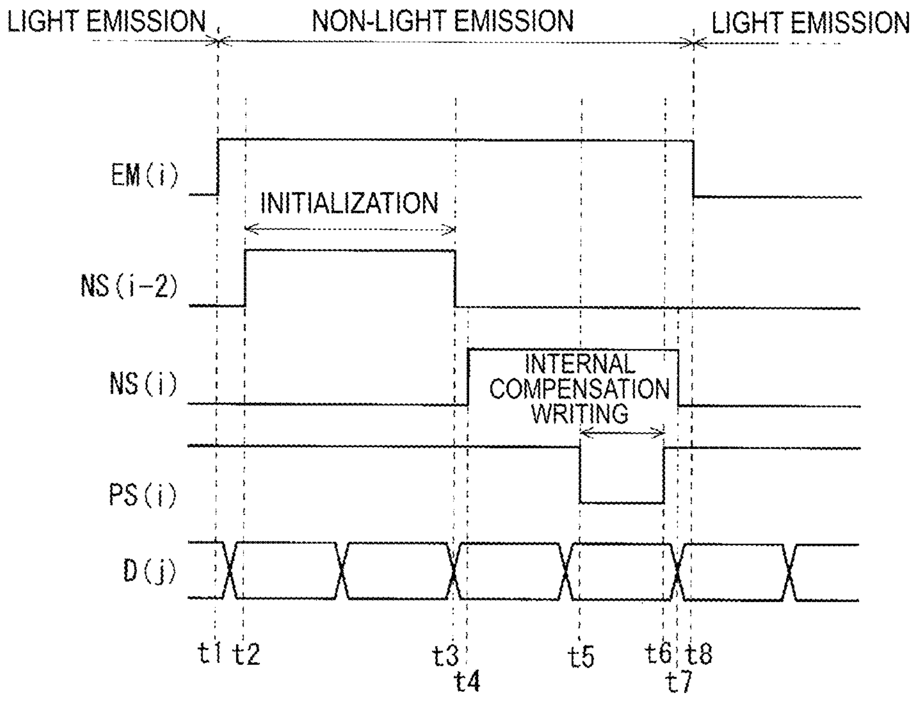
FIG. 4 is a timing chart for describing an operation of a pixel circuit in the comparative example.

FIG. 3 is a circuit diagram illustrating the configuration of the pixel circuit 15*a* in the comparative example, and more specifically is a circuit diagram illustrating the configuration of the pixel circuit 15*a* corresponding to the i-th first scanning signal line PSi and the j-th data signal line Dj, i.e., the pixel circuit Pix(i, j) on the i-th row and j-th column ($1 \le i \le n$, $1 \le j \le m$). The pixel circuit 15*a*, as illustrated in FIG. 3, includes one organic EL element (organic light emitting diode) OL as a display element, seven transistors (typically, thin film transistors) T1 to T7 (hereinafter referred to as a "first initialization transistor T1", a "threshold compensation transistor T2", a "write control transistor T3", a "drive transistor T4", a "first light emission control transistor T5", a "second light emission control transistor T6", and a "second initialization transistor T7"), and one holding capacitor Cst. The transistors T1, T2, and T7 are N-type transistors. The transistors T3 to T6 are P-type transistors. The N-type transistors T1, T2, and T7 are, for example, thin film transistors (hereinafter referred to as "IGZO-TFTs") whose channel layers are each formed of indium gallium zinc oxide (InGaZnO) as an oxide semiconductor, and the P-type transistors T3 to T6 are, for example, thin film transistors (hereinafter referred to as "LTPS-TFTs") whose channel layers are each formed of low-temperature polysilicon. However, the configuration is not limited thereto. The holding capacitor Cst is a capacitance element including two electrodes (first electrode and second electrode). As illustrated in FIG. 3, the first electrode of the holding capacitor Cst is connected to the high-level power source line ELVDD, and the second electrode thereof is connected to the gate terminal of the drive transistor T4. Note that in the pixel circuit 15*a*, the transistors T1 to T3 and T5 to T7 other than the drive transistor T4 function as switching elements.

To the pixel circuit Pix(i, j) of the comparative example, connected are the first scanning signal line PSi corresponding thereto (hereinafter, also referred to as the "corresponding first scanning signal line" in the description focusing on the pixel circuit), the second scanning signal line NSi corresponding thereto (hereinafter, also referred to as the "corresponding second scanning signal line" in the description focusing on the pixel circuit), the second scanning signal line NSi−2 positioned two lines before the corresponding second scanning signal line NSi (which is a scanning signal line positioned two lines before the corresponding second scanning signal line NSi in the scanning order of the second scanning signal lines NS−1 to NSn, and hereinafter is also referred to simply as the "preceding second scanning signal line" in the description focusing on the pixel circuit), the light emission control line EMi corresponding thereto (hereinafter, also referred to as the "corresponding light emission control line" in the description focusing on the pixel circuit), the data signal line Dj corresponding thereto (hereinafter, also referred to as the "corresponding data signal line" in the description focusing on the pixel circuit), the initialization voltage line Vini, the high-level power source line ELVDD, and the low-level power source line ELVSS.

As illustrated in FIG. 3, in the pixel circuit 15*a*, the source terminal of the drive transistor T4 is connected to the corresponding data signal line Dj via the write control transistor T3 and to the high-level power source line ELVDD via the first light emission control transistor T5. The drain terminal of the drive transistor T4 is connected to the anode electrode of the organic EL element OL via the second light emission control transistor T6. The gate terminal of the drive transistor T4 is connected to the high-level power source line ELVDD via the holding capacitor Cst, to the drain terminal of the drive transistor T4 via the threshold compensation transistor T2, and to the initialization voltage line Vini via the first initialization transistor T1. The anode electrode of the organic EL element OL is connected to the initialization voltage line Vini via the second initialization transistor T7, and the cathode electrode of the organic EL element OL is connected to the low-level power source line ELVSS. The gate terminals of the write control transistor T3 and the threshold compensation transistor T2 are connected to the corresponding first scanning signal line PSi and the corresponding second scanning signal line NSi respectively, the gate terminals of the first and second light emission control transistors T5 and T6 and the second initialization transistor T7 are each connected to the corresponding light emission control line EMi, and the gate terminal of the first initialization transistor T1 is connected to the preceding second scanning signal line NSi−2.

Next, the operation of the pixel circuit 15*a* illustrated in FIG. 3, that is, the operation of the pixel circuit Pix(i, j) on the i-th row and j-th column according to the comparative example will be described with reference to FIGS. 3 and 4. FIG. 4 is a timing chart for describing the operation of the pixel circuit Pix(i, j).

When the light emission control signal EM(i) sent to the pixel circuit Pix(i, j) in FIG. 3 via the corresponding light emission control line EMi changes from L level to H level at time t1, the P-type first and second light emission control transistors T5 and T6 change from ON state to OFF state and stay in OFF state while the light emission control signal EM(i) is H level. Accordingly, in the period t1 to t8 during which the light emission control signal EM(i) is H level, a current does not flow to the organic EL element OL and the pixel circuit Pix(i, j) is in a non-light emission state. In addition, in the period (non-light emission period) t1 to t8 in which the pixel circuit Pix(i, j) is in a non-light emission state, the N-type second initialization transistor T7 is turned to ON state. Thus, a voltage (hereinafter referred to as an "anode voltage") Va of the anode electrode of the organic EL element OL is initialized.

In the non-light emission period t1 to t8, the preceding second scanning signal NS(i−2) sent to the pixel circuit Pix(i, j) via the preceding second scanning signal line NSi−2 is changed at time t2 from L level to H level, whereby the N-type first initialization transistor T1 changes from OFF state to ON state and stays in ON state while the second scanning signal NS(i−2) takes H level. In the period (hereinafter referred to as the "initialization period") t2 to t3 during which the first initialization transistor T1 is in ON state, the holding capacitor Cst is initialized, and a voltage (hereinafter referred to as the "gate voltage") Vg of the gate terminal of the drive transistor T4 becomes the initialization voltage Vini.

In the non-light emission period t1 to t8 of the pixel circuit Pix(i, j) in FIG. 3, after the preceding second scanning signal NS(i−2) has changed to L level at time t3, the second scanning signal (hereinafter also referred to as the "corresponding second scanning signal") NS(i) supplied via the corresponding second scanning signal line NSi changes from L level to H level at time t4. With this, the N-type threshold compensation transistor T2 changes from OFF state to ON state and stays in ON state while the corresponding second scanning signal NS(i) takes H level, and the drive transistor T4 is in the diode-connected state.

In the period t4 to t7 in which the threshold compensation transistor T2 is in ON state, the first scanning signal (hereinafter also referred to as the "corresponding first scanning signal") PS(i) sent to the pixel circuit Pix(i, j) via the corresponding first scanning signal line PSi changes from H level to L level at time t5. With this, the P-type write control transistor T3 changes from OFF state to ON state and stays in ON state while the first scanning signal PS(i) takes L level. In the period (hereinafter referred to as the "data write period") t5 to t6 during which the write control transistor T3 is in ON state, the voltage of the data signal D(j) sent to the pixel circuit Pix(i, j) via the corresponding data signal line Dj is applied to the holding capacitor Cst via the drive transistor T4 in the diode-connected state as a data voltage Vdata. As a result, the data voltage having experienced the threshold compensation is written and held in the holding capacitor Cst, and the gate voltage Vg of the drive transistor T4 is maintained at the voltage of the second electrode of the holding capacitor Cst. At this time, when the threshold value of the drive transistor T4 is Vth (<0), the gate voltage Vg is the value obtained via the following formula.

$$Vg = Vdata + Vth \tag{1}$$

In this manner, in the data write period t5 to t6, internal compensation is performed and the data voltage is written.

At time t7 after the data write period t5 to t6, the second scanning signal NS(i) changes from H level to L level, and the threshold compensation transistor T2 turns to OFF state. Next, at time t8, the light emission control signal EM(i) changes from H level to L level. Accordingly, the first and second light emission control transistors T5 and T6 turn to ON state and the light emission period starts. In the light emission period, a current I1 of an amount corresponding to the voltage (voltage written in the data write period t5 to t6) held by the holding capacitor Cst flows from the high-level power source line ELVDD to the low-level power source line ELVSS via the first light emission control transistor T5, the drive transistor T4, the second light emission control transistor T6, and the organic EL element OL.

In the light emission period, the drive transistor T4 operates in a saturation region, and the drive current I1 flowing through the organic EL element OL is obtained by Formula (2) given below. Gain β of the drive transistor T4 included in Formula (2) is obtained by Formula (3) given below.

$$\begin{aligned} I1 &= (\beta/2)\cdot(|Vgs| - |Vth|)^2 \\ &= \beta/2)\cdot(|Vg - ELVDD| - |Vth|)^2 \end{aligned} \tag{2}$$

$$\beta = \mu \times (W/L) \times Cox \tag{3}$$

In Formulae (2) and (3), Vth, μ, W, L, and Cox represent the threshold voltage, mobility, gate width, gate length, and gate insulating film capacitance per unit surface area of the drive transistor T4, respectively. In this case, since the drive transistor T4 is a P-type transistor, and Vth is less than 0 and Vg is less than ELVDD, $$I1 = (\beta/2)\cdot(ELVDD - Vg + Vth)^2$$

is obtained. Further, when Formula (1) described above is substituted into this formula, $$I1 = (\beta/2)\cdot(ELVDD - Vdata)^2 \tag{4}$$

is obtained. As can be understood from Formula (4) described above, in the light emission period after time t8, the organic EL element OL emits light with luminance corresponding to the data voltage Vdata, which is the voltage of the corresponding data signal line Dj, regardless of the threshold voltage Vth of the drive transistor T4.

1.4 Configuration and Operation of Pixel Circuit in Present Embodiment

Figure 6:
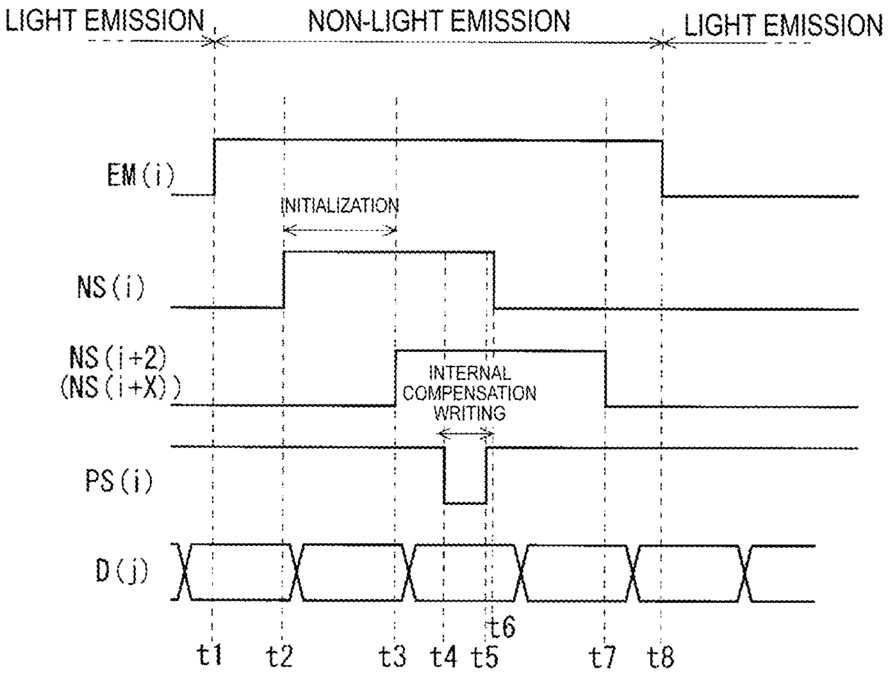
FIG. 6 is a timing chart for describing an operation of the pixel circuit according to the first embodiment.

Next, the configuration and operation of the pixel circuit 15 in the present embodiment will be described with reference to FIGS. 5 and 6. FIG. 5 is a circuit diagram illustrating a configuration of the pixel circuit 15 in the present embodiment. FIG. 6 is a timing chart for describing the operation of the pixel circuit 15 in the present embodiment.

FIG. 5 illustrates the configuration of the pixel circuit 15 corresponding to the i-th first scanning signal line PSi and the j-th data signal line Dj in the present embodiment, i.e., the configuration of the pixel circuit Pix(i, j) on the i-th row and j-th column (1≤i≤n, 1≤j≤m). Similar to the pixel circuit 15*a* (FIG. 3) in the comparative example described above, the pixel circuit 15 includes the organic EL element OL as a display element, the drive transistor T4, the write control transistor T3, the threshold compensation transistor T2, the first light emission control transistor T5, the second light emission control transistor T6, a display element initialization transistor T7 equivalent to the second initialization transistor described before, and the holding capacitor Cst. However, the pixel circuit 15 differs from the pixel circuit 15*a* of the comparative example (FIG. 3) in a point that the first initialization transistor T1 is not included. In the present embodiment as well, the transistors T2 and T7 are N-type transistors, and the transistors T3 to T6 are P-type transistors. The N-type transistors T2 and T7 are, for example, IGZO-TFTs, but are not limited thereto. The P-type transistors T3 to T6 are, for example, LTPS-TFTs, but are not limited thereto. The holding capacitor Cst is a capacitance element including two electrodes (first electrode and second electrode). In the pixel circuit 15 as well, the transistors T2, T3, and T5 to T7 other than the drive transistor T4 function as switching elements.

Similar to the pixel circuit Pix(i, j) in the comparative example (FIG. 3), to the pixel circuit Pix(i, j) on the i-th row and j-th column in the present embodiment, the first scanning signal line corresponding thereto (corresponding first scanning signal line) PSi, the second scanning signal line corresponding thereto (corresponding second scanning signal line) NSi, the light emission control line corresponding thereto (corresponding light emission control line) EMi, the data signal line corresponding thereto (corresponding data signal line) Dj, the initialization voltage line Vini, the high-level power source line ELVDD, and the low-level power source line ELVSS are connected, as illustrated in FIG. 5. However, unlike the pixel circuit Pix(i, j) in the comparative example (FIG. 3), to the pixel circuit Pix(i, j) on the i-th row and j-th column in the present embodiment, the second scanning signal line NSi+2 positioned two lines after the corresponding second scanning signal line NSi (which is a signal line positioned two lines after the corresponding second scanning signal line NSi in the scanning order of the second scanning signal lines NS1 to NSn, and hereinafter is also referred to simply as "subsequent second scanning signal line" in the description focusing on the pixel circuit) is connected, while the preceding second scanning signal line NSi−2 is not connected.

As illustrated in FIG. 5, in the pixel circuit 15, as in the pixel circuit 15*a* in the comparative example (FIG. 3), the source terminal serving as a first conduction terminal of the drive transistor T4 is connected to the corresponding data signal line Dj via the write control transistor T3 and to the high-level power source line ELVDD via the first light emission control transistor T5. The drain terminal serving as a second conduction terminal of the drive transistor T4 is connected to the anode electrode serving as a first terminal of the organic EL element OL via the second light emission control transistor T6. The gate terminal of the drive transistor T4 is connected to the high-level power source line ELVDD serving as a fixed voltage line via the holding capacitor Cst, and to the drain terminal of the drive transistor T4 via the threshold compensation transistor T2. The anode electrode of the organic EL element OL is connected to the initialization voltage line Vini via the display element initialization transistor T7, and the cathode electrode serving as a second terminal of the organic EL element OL is connected to the low-level power source line ELVSS. The gate terminals of the write control transistor T3 and the threshold compensation transistor T2 are connected to the corresponding first scanning signal line PSi and the corresponding second scanning signal line NSi respectively, the gate terminals of the first light emission control transistor T5 and the display element initialization transistor T7 are each connected to the corresponding light emission control line EMi, and the gate terminal of the second light emission control transistor T6 is connected to the subsequent second scanning signal line NSi+2.

Next, the operation of the pixel circuit 15 illustrated in FIG. 5, that is the operation of the pixel circuit Pix(i, j) on the i-th row and j-th column according to the present embodiment will be described with reference to FIGS. 5 and 6. FIG. 6 is a timing chart for describing the operation of the pixel circuit Pix(i, j). In the present embodiment, the first scanning signal line PSi, the second scanning signal line NSi, the light emission control line EMi, and the data signal line Dj are driven as illustrated in FIG. 6, whereby the pixel circuit 15 on the i-th row and j-th column in the present embodiment, that is, the pixel circuit Pix(i, j) operates as follows.

When the light emission control signal (corresponding light emission control signal) EM(i) sent to the pixel circuit Pix(i, j) in FIG. 5 via the corresponding light emission control line EMi changes from L level to H level at time t1, the P-type first light emission control transistor T5 changes from ON state to OFF state and stays in OFF state while the corresponding light emission control signal EM(i) takes H level. Accordingly, in the period t1 to t8 during which the corresponding light emission control signal EM(i) takes H level, a current does not flow through the organic EL element OL and the pixel circuit Pix(i, j) is in the non-light emission state. In the period (non-light emission period) t1 to t8 during which the pixel circuit Pix(i, j) is in the non-light emission state, the N-type display element initialization transistor T7 is turned to ON state, whereby the voltage (anode voltage) Va of the anode electrode of the organic EL element OL is initialized.

In the non-light emission period t1 to t8, the second scanning signal (hereinafter also referred to as the "corresponding second scanning signal") NS(i) sent to the pixel circuit Pix(i, j) via the corresponding second scanning signal line NSi changes at time t2 from L level to H level, whereby the N-type threshold compensation transistor T2 changes from OFF state to ON state and stays in ON state while the corresponding second scanning signal NS(i) takes H level. In the period t2 to t6 during which the threshold compensation transistor T2 is in ON state, the second scanning signal (hereinafter also referred to as the "subsequent second scanning signal") NS(i+2) sent to the pixel circuit Pix(i, j) via the subsequent second scanning signal line NSi+2 changes at time t3 from L level to H level, whereby the P-type second light emission control transistor T6 changes from ON state to OFF state and stays in OFF state while the subsequent second scanning signal NS(i+2) takes H level.

As described above, during the period t2 to t3 from when the corresponding second scanning signal NS(i) changes to H level until the subsequent second scanning signal NS(i+2) changes to H level, both the threshold compensation transistor T2 and the second light emission control transistor T6 are in ON state. During the period t2 to t3, since the corresponding light emission control line EMi is at H level, the display element initialization transistor T7 is also in ON state. Therefore, as can be understood from FIG. 5, in the period t2 to t3, a current flows from the holding capacitor Cst, which is connected to the gate terminal of the drive transistor T4, to the initialization voltage line Vini via the threshold compensation transistor T2, the second light emission control transistor T6, and the display element initialization transistor T7 in sequence, whereby the holding capacitor Cst is initialized (hereinafter, the period t2 to t3 is referred to as the "initialization period"). Thus, the voltage (gate voltage) Vg of the gate terminal of the drive transistor T4 is initialized to the initialization voltage Vini. In this way, a path for initializing a holding voltage of the holding capacitor Cst, that is, initializing the gate voltage Vg, is formed by the threshold compensation transistor T2, the second light emission control transistor T6, and the display element initialization transistor T7.

After the initialization period t2 to t3 described above, the first scanning signal (hereinafter also referred to as the “corresponding first scanning signal”) PS(i) sent to the pixel circuit Pix(i, j) via the corresponding first scanning signal line PSi changes from H level to L level at time t4, whereby the P-type write control transistor T3 changes from OFF state to ON state and stays in ON state while the corresponding first scanning signal PS(i) takes L level. During the period t4 to t5 when the corresponding first scanning signal PS(i) takes L level, as illustrated in FIG. 6, since the corresponding second scanning signal NS(i) and the subsequent second scanning signal NS(i+2) both take H level, the N-type threshold compensation transistor T2 is maintained in ON state, and the P-type second light emission control transistor T6 is maintained in OFF state. Accordingly, in the above-discussed period t4 to t5, the voltage of the data signal D(j) sent to the pixel circuit Pix(i, j) via the corresponding data signal line Dj is applied, as the data voltage Vdata, to the holding capacitor Cst via the drive transistor T4 in the diode-connected state (hereinafter, this period t4 to t5 is referred to as the “data write period”). As a result, the data voltage having experienced the threshold compensation is written and held in the holding capacitor Cst, and the gate voltage Vg of the drive transistor T4 is maintained at a value equivalent to the holding voltage of the holding capacitor Cst. At this time, when the threshold value of the drive transistor T4 is Vth (<0), the gate voltage Vg takes a value obtained by Formula (1) described before, as in the pixel circuit Pix(i, j) in the comparative example (FIG. 3).

At time t5, the corresponding first scanning signal PS(i) changes from L level to H level, whereby the write control transistor T3 turns to OFF state. Thereafter, at time t6, the corresponding second scanning signal NS(i) changes from H level to L level, whereby the threshold compensation transistor T2 turns to OFF state. Thereafter, at time t7, the subsequent second scanning signal NS(i+2) changes from H level to L level, whereby the second light emission control transistor T6 turns to ON state. However, at this time point, since the corresponding light emission control signal EM(i) takes H level, the first light emission control transistor T5 is in OFF state and the non-light emission state is maintained.

Thereafter, at time t8, the light emission control signal EM(i) changes from H level to L level, whereby the first light emission control transistor T5 also turns to ON state and the light emission period is started. In the light emission period, the current I1 of an amount corresponding to the voltage (voltage written in the data write period t4 to t5) held by the holding capacitor Cst flows from the high-level power source line ELVDD to the low-level power source line ELVSS via the first light emission control transistor T5, the drive transistor T4, the second light emission control transistor T6, and the organic EL element OL. In the light emission period, the current I1 flowing through the organic EL element OL is obtained by Formula (4) described above, as in the comparative example. Accordingly, in the present embodiment as well, in the light emission period after time t8, the organic EL element OL emits light with luminance corresponding to the data voltage Vdata, which is the voltage of the corresponding data signal line Dj, regardless of the threshold voltage Vth of the drive transistor T4. In the example depicted in FIG. 6, the corresponding light emission control line EMi is in the deactivated state during the period t1 to t8, and the period t1 to t8 is a non-light emission period of the pixel circuit Pix(i, j). However, it is sufficient for the light emission control lines EM1 to EMn to be driven in such a manner as to be in the deactivated state at least during the select period t2 to t6 of the corresponding second scanning signal line NSi (selective deactivation).

In the present embodiment, the control signal supplied to the gate terminal of the second light emission control transistor T6 is the second scanning signal NS(i+2) positioned two lines after the corresponding second scanning signal NS(i), but is not limited thereto. That is, as can be understood from the operation of the pixel circuit Pix(i, j) depicted in FIG. 6, it is sufficient that the second scanning signal supplied to the gate terminal of the second light emission control transistor T6 as the control signal is a subsequent second scanning signal NS(i+X) (X is a positive integer) of the corresponding second scanning signal NS(i), and the H level period (active period) of the subsequent second scanning signal NS(i+X) partially overlaps the H level period of the corresponding second scanning signal NS(i). The data write period t4 to t5 in the present embodiment is set within the overlapping period t3 to t6 (see FIG. 6). Therefore, the subsequent second scanning signal line NSi+X is a second scanning signal line selected in such a manner that the select period of the corresponding second scanning signal line NSi partially overlaps with the select period of the subsequent second scanning signal line NSi+X, and the first scanning signal lines PS1 to PSn are driven in such a manner that the overlapping period t3 to t6 includes therein the select period of the corresponding first scanning signal line PSi, that is, the data write period. The light emission control lines EM1 to EMn need to be driven such that the corresponding light emission control line EMi is in the deactivated state at least in the select period of the corresponding second scanning signal line NSi.

1.5 Gate Driver

As described above, the scanning-side drive circuit 40 according to the present embodiment functions as a scanning signal line drive circuit and a light emission control circuit (see FIG. 1). The configuration and operation of a portion of the scanning-side drive circuit 40 functioning as the scanning signal line drive circuit configured to generate the first and second scanning signals (hereinafter, this portion is referred to as a “gate driver”) will be described below.

1.5.1 Configuration Example of Shift Register

In the present embodiment, as illustrated in FIG. 1, the display portion is provided with (n×m) pixel circuits. Hereinafter, among the (n×m) pixel circuits, m pixel circuits Pix(i, 1) to Pix(i, m) aligned in the extending direction of the first scanning signal line PSi are referred to as a “pixel row” or simply as a “row” (i=1 to n). The gate driver in the present embodiment is constituted of a shift register including a plurality of stages, and a bistable circuit constituting each stage of the shift register is hereinafter referred to as a “unit circuit” (the same applies to other embodiments). A shift register 301 includes n unit circuits 3(1) to 3(*n*) in one-to-one correspondence with the n pixel rows Pix(1, 1) to Pix(1, m), Pix(2, 1) to Pix(2, m), . . . , Pix(n, 1) to Pix(n, m).

Figure 7:
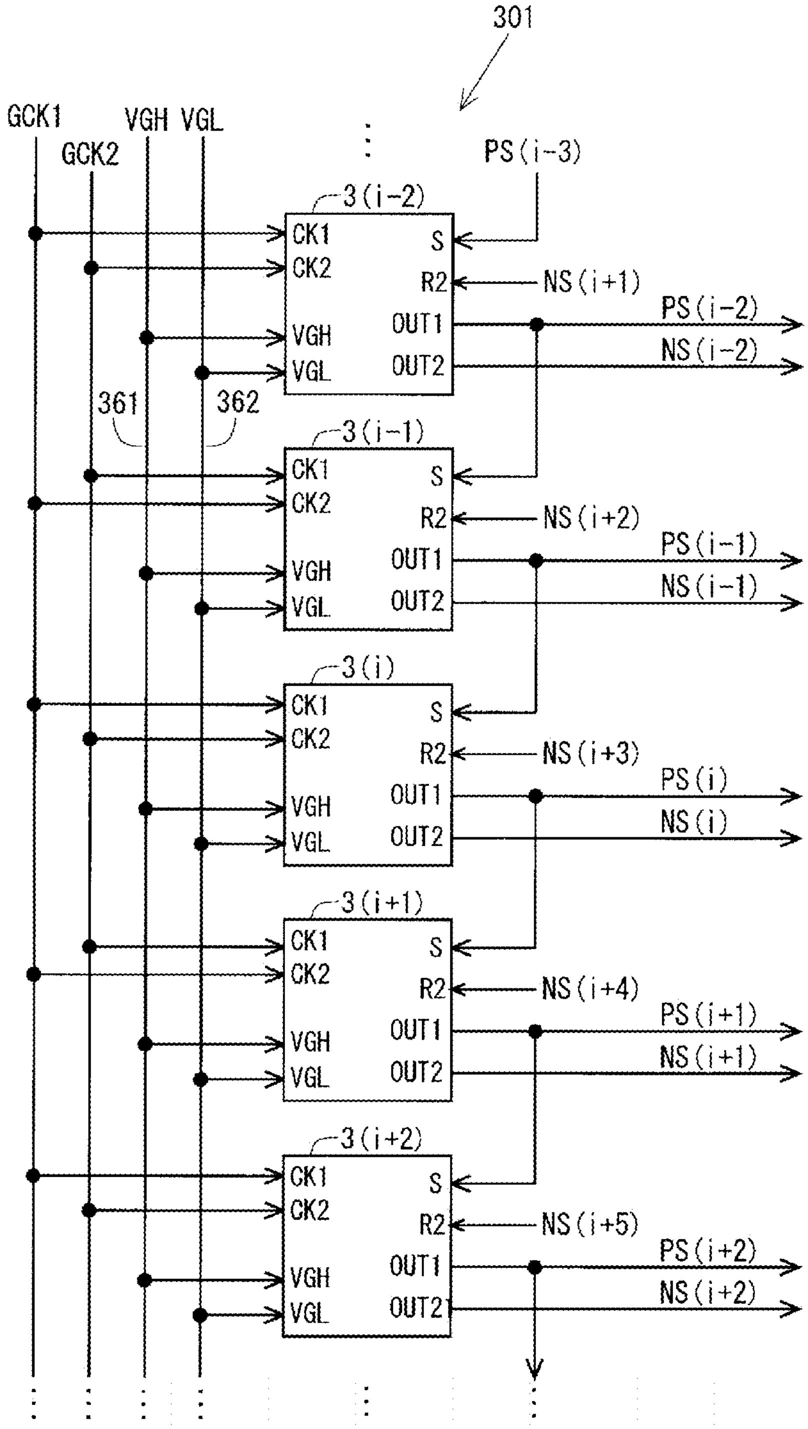
FIG. 7 is a circuit diagram illustrating a schematic configuration of a shift register constituting a gate driver according to the first embodiment.

FIG. 7 is a circuit diagram for describing the schematic configuration of the shift register 301 constituting the gate driver serving as the scanning signal line drive circuit according to the present embodiment, in which the configuration of five stages of the shift register 301 is illustrated. Here, it is assumed that i is an even number, and attention is focused on the unit circuits 3(*i*−2), 3(*i*−1), 3(*i*), 3(*i*+1), and 3(*i*+2) respectively provided at the (i−2)-th stage, the (i−1)- th stage, the i-th stage, the (i+1)-th stage, and the (i+2)-th stage. A gate start pulse signal, the first gate clock signal GCK1, and the second gate clock signal GCK2 are sent to the shift register 301 as signals for controlling the gate driver (hereinafter also referred to as "gate control signals GCTL") among the signals included in the scanning-side control signal Scs from the display control circuit 20. A gate high voltage VGH as a first constant voltage and a gate low voltage VGL as a second constant voltage are also applied to the shift register 301. The gate high voltage VGH is a voltage at a level for setting the P-type transistor in the pixel circuit 15 to OFF state and the N-type transistor in the pixel circuit 15 to ON state. The gate low voltage VGL is a voltage at a level for setting the P-type transistor in the pixel circuit 15 to ON state and the N-type transistor in the pixel circuit 15 to OFF state (the same applies to other embodiments). The gate high voltage VGH is supplied by a first constant voltage line 361, and the gate low voltage VGL is supplied by a second constant voltage line 362. The gate start pulse signal is a signal provided to the unit circuit 3(1) at the first stage as a set signal S, and is omitted in FIG. 7.

Each unit circuit 3 includes input terminals for receiving a first control clock signal CK1, a second control clock signal CK2, the set signal S, the gate high voltage VGH, and the gate low voltage VGL and output terminals for outputting a first output signal OUT1 and a second output signal OUT2. The first output signal OUT1 is a first scanning signal, and the second output signal OUT2 is a second scanning signal. That is, in each unit circuit 3, the first scanning signal and the second scanning signal are generated.

For the unit circuits 3 at even-numbered stages, the first gate clock signal GCK1 is supplied as the first control clock signal CK1 and the second gate clock signal GCK2 is supplied as the second control clock signal CK2. For the unit circuits 3 at odd-numbered stages, the second gate clock signal GCK2 is supplied as the first control clock signal CK1 and the first gate clock signal GCK1 is supplied as the second control clock signal CK2. The gate high voltage VGH and the gate low voltage VGL are sent in common to all of the unit circuits 3. To the unit circuit 3(*k*) at each stage, the first output signal OUT1 from the unit circuit of the previous stage is supplied as the set signal S. The first output signal OUT1 from the unit circuit 3(*k*) at each stage is supplied to the corresponding first scanning signal line PSk as the first scanning signal PS(k), and the second output signal OUT2 from the unit circuit 3(*k*) at each stage is supplied to the corresponding second scanning signal line NSk as the second scanning signal NS(k) (k=1 to n). As illustrated in FIG. 5, focusing on each pixel circuit Pix(i, j) of the i-th row (j=1 to m), the first scanning signal line PSi is connected to the gate terminal of the write control transistor T3, the second scanning signal line NSi is connected to the gate terminal of the threshold compensation transistor T2, and the subsequent second scanning signal line NSi+2 is connected to the gate terminal of the second light emission control transistor T6.

The first gate clock signal GCK1 and the second gate clock signal GCK2 constitutes a two-phase clock signal periodically repeating a first period during which the gate low voltage VGL (first level voltage) is maintained and a second period during which the gate high voltage VGH (second level voltage) is maintained. The length of the first period is equal to or less than the length of the second period. However, typically, the length of the first period is shorter than the length of the second period. Note that the first gate clock signal GCK1 and the second gate clock signal GCK2 are output from a clock signal output circuit provided inside the display control circuit 20. The above-described points regarding the first gate clock signal GCK1 and the second gate clock signal GCK2 also apply to other embodiments.

1.5.2 Unit Circuit

Figure 8:
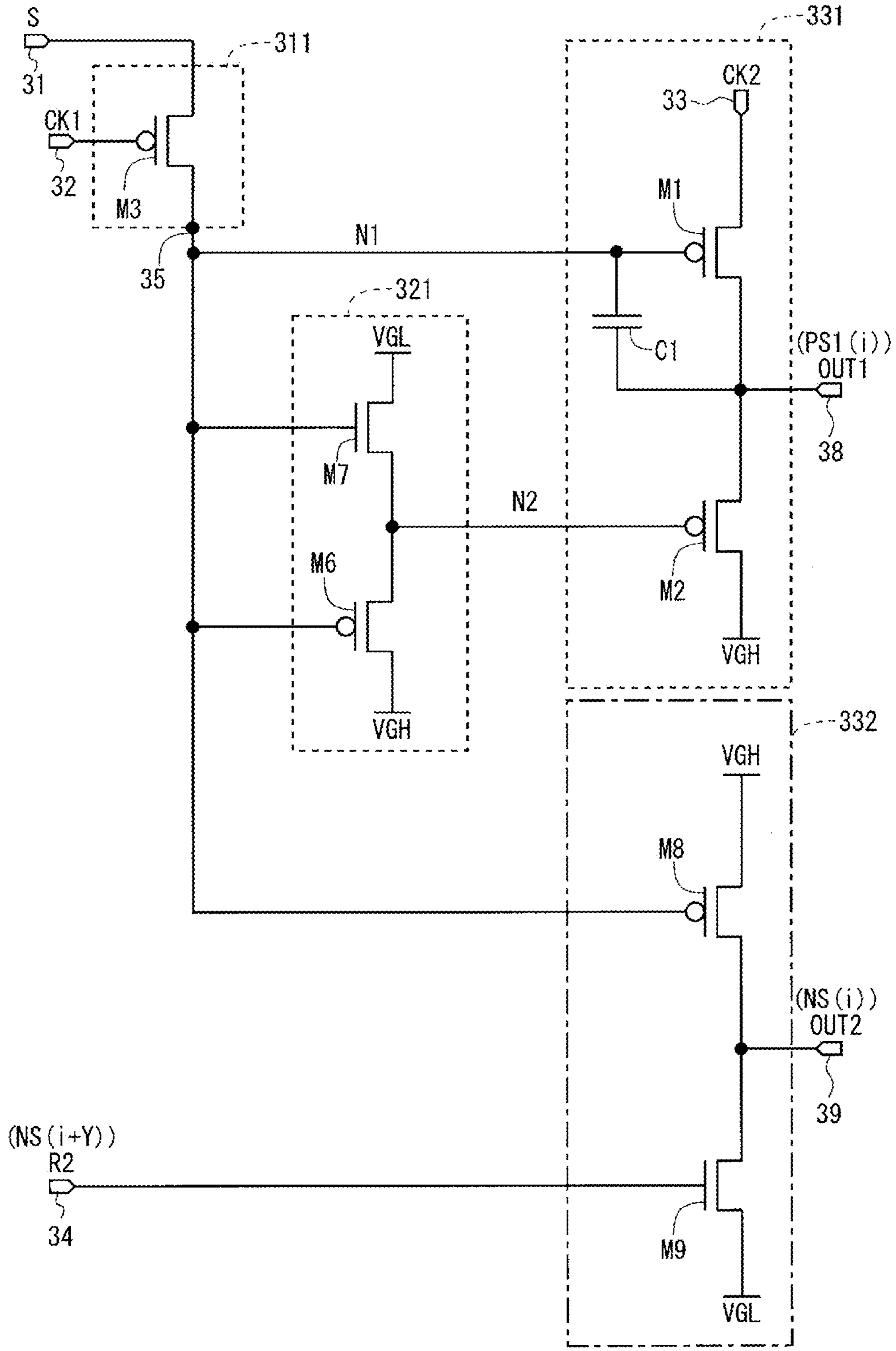
FIG. 8 is a circuit diagram illustrating a configuration example of a unit circuit in a shift register according to the first embodiment.

FIG. 8 is a circuit diagram illustrating a configuration example of the unit circuit 3 according to the present embodiment. As illustrated in FIG. 8, the unit circuit 3 includes seven transistors, that is, transistors M1 to M3 and M6 to M9 to serve as switching elements, and one capacitor C1. The transistors M1 to M3, M6, and M8 are P-type transistors, and the transistors M7 and M9 are N-type transistors. The unit circuit 3 includes four input terminals, i.e., input terminals 31 to 34, and two output terminals, i.e., output terminals 38 and 39, in addition to an input terminal connected to the first constant voltage line 361 for supplying the gate high voltage VGH and an input terminal connected to the second constant voltage line 362 for supplying the gate low voltage VGL. In FIG. 8, the input terminal for receiving the set signal S is denoted by the reference sign 31, the input terminal for receiving the first control clock signal CK1 is denoted by the reference sign 32, the input terminal for receiving the second control clock signal CK2 is denoted by the reference sign 33, the input terminal for receiving the subsequent scanning signal NS(i+Y) for reset as a signal R2 for resetting the second output signal OUT2 is denoted by the reference sign 34, the output terminal for outputting the first output signal OUT1 is denoted by the reference sign 38, and the output terminal for outputting the second output signal OUT2 is denoted by the reference sign 39. Hereinafter, the output terminal for outputting the first output signal OUT1 is referred to as a "first output terminal", and the output terminal for outputting the second output signal OUT2 is referred to as a "second output terminal". Y specifying the subsequent scanning signal NS(i+Y) for reset is a positive integer greater than an integer X specifying the subsequent second scanning signal NS(i+X) (Y>X), and in the example illustrated in FIG. 7, Y is equal to 4, but is not limited thereto.

The source terminal of the transistor M3 and the gate terminals of the transistors M1 and M6 to M8 are connected to each other, and a node where these terminals are connected to each other is referred to as a "first internal node". The first internal node is denoted by the reference sign N1. The voltage of the first internal node N1 indicates a logical value to be transferred serially from the first stage to the final stage in the shift register 301. The gate terminal of the transistor M1 and one end of the capacitor C1 are connected to each another. The drain terminal of the transistor M6, the drain terminal of the transistor M7, and the gate terminal of the transistor M2 are connected to each other, and a node where these terminals are connected to each other is referred to as a "second internal node". The second internal node is denoted by the reference sign N2.

The unit circuit 3 includes a first control circuit 311 configured to control the voltage of the first internal node N1, a first output circuit 331 configured to control the output of the first output signal OUT1, a second control circuit 321 configured to control the voltage of the second internal node N2, and a second output circuit 332 configured to control the output of the second output signal OUT2. The first control circuit 311 includes the transistor M3. An output terminal 35 of the first control circuit 311 is connected to the first internal node N1. The second control circuit 321 includes the transistor M6 and the transistor M7. The first output circuit 331 includes the transistor M1 serving as a first output switching element, the transistor M2, and the capacitor C1. The second output circuit 332 includes the transistor M8 serving as a second output switching element and the transistor M9 serving as a reset switching element.

Regarding the transistor M1, the gate terminal is connected to the first internal node N1, the drain terminal is connected to the input terminal 33, and the source terminal is connected to the first output terminal 38. Regarding the transistor M2, the gate terminal is connected to the second internal node N2, the source terminal is connected to the first constant voltage line, and the drain terminal is connected to the first output terminal 38. Regarding the transistor M3, the gate terminal is connected to the input terminal 32, the drain terminal is connected to the input terminal 31, and the source terminal is connected to the first internal node N1. Regarding the transistor M6, the gate terminal is connected to the first internal node N1, the source terminal is connected to the first constant voltage line, and the drain terminal is connected to the second internal node N2. Regarding the transistor M7, the gate terminal is connected to the first internal node N1, the drain terminal is connected to the second internal node N2, and the source terminal is connected to the second constant voltage line. One end of the capacitor C1 is connected to the gate terminal of the transistor M1 and the other end thereof is connected to the first output terminal 38. Regarding the transistor M8, the gate terminal is connected to the first internal node N1, the source terminal is connected to the first constant voltage line, and the drain terminal is connected to the second output terminal 39. Regarding the transistor M9, the gate terminal is connected to the input terminal 34, the drain terminal is connected to the second output terminal 39, and the source terminal is connected to the second constant voltage line.

1.5.3 Operation of Shift Register

Figure 9:
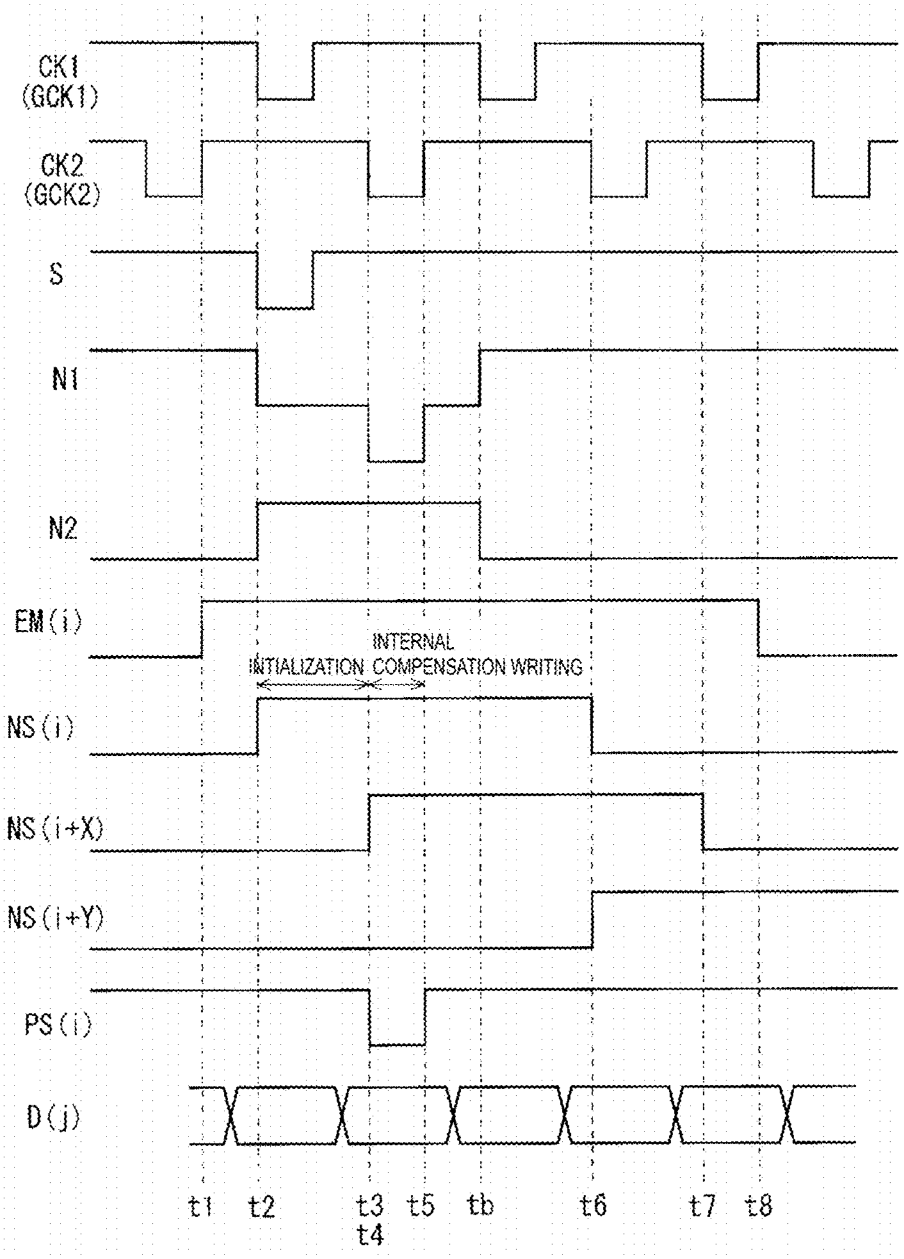
FIG. 9 is a signal waveform diagram for describing an operation of the unit circuit in FIG. 8 according to the first embodiment.

The operation of the shift register 301 configured as described above will be described below with reference to FIGS. 8 and 9. FIG. 9 is a signal waveform diagram for describing the operation of the unit circuit 3(*i*) at the i-th stage in the shift register 301. In order to facilitate understanding of the operation of the display device 10 according to the present embodiment, the light emission control signal EM(i) generated by the scanning-side drive circuit 40 is also depicted in FIG. 9, and the data signal D(j) generated by the data-side drive circuit 30 (j=1 to m) is also depicted in FIG. 9 for the same purpose.

In FIG. 9, as illustrated in FIG. 6, it is assumed that the light emission control signal EM(i) corresponding to the i-th pixel row, that is, the corresponding light emission control signal EM(i) discussed above changes from L level to H level at time t1. As depicted in FIG. 9, in a period before time t1, the voltage of the first internal node N1 is maintained at H level, the voltage of the second internal node N2 is maintained at L level, the first output signal OUT1 (PS(i)) is maintained at H level, and the second output signal OUT2 (NS(i)) is maintained at L level. Note that since the second internal node N2 is maintained at L level, the transistor M2 is kept in ON state.

Then, at time t2, the first control clock signal CK1 changes from H level to L level, whereby the transistor M3 is turned to ON state. Further, at time t2, the set signal S changes from H level to L level. With this, the voltage of the first internal node N1 changes to L level, and the transistors M1, M6, and M8 are turned to ON state. Thus, the voltage of the second internal node N2 changes from L level to H level and the transistor M2 is turned to OFF state. Further, the second output signal OUT2, that is, the second scanning signal NS(i) changes from L level to H level, and the threshold compensation transistor T2 connected with the second output terminal 39 is turned to ON state.

Then, at time t3, the second control clock signal CK2 changes from H level to L level. At this time, since the transistor M1 is in ON state, along with the voltage drop of the input terminal 33, the voltage of the first output terminal 38 (voltage of the first output signal OUT1) drops. Here, since the capacitor C1 is provided between the first internal node N1 and the first output terminal 38, along with the voltage drop of the first output terminal 38, the voltage of the first internal node N1 also drops. As a result, a large negative voltage is applied to the gate terminal of the transistor M1. Due to such a bootstrap operation, the voltage of the first output signal OUT1, that is, the voltage of the first scanning signal PS(i) drops to a level sufficient to cause the write control transistor T3, which is connected with the first output terminal 38, to be in ON state. In the example illustrated in FIG. 9, at time t3 mentioned above, the subsequent second scanning signal NS(i+X) changes from L level to H level, and the second light emission control transistor T6 connected to the subsequent second scanning signal line NSi+X is turned to OFF state (see FIG. 5).

Then, at time t5, the second control clock signal CK2 changes from L level to H level. Thus, along with the voltage rise of the input terminal 33, the voltage of the first output terminal 38 (voltage of the first output signal OUT1, that is, the voltage of the first scanning signal PS(i)) rises. This causes the write control transistor T3 connected with the first output terminal 38 to be in OFF state. When the voltage of the first output terminal 38 rises, the voltage of the first internal node N1 also rises through the capacitor C1.

Then, at time tb, the first control clock signal CK1 changes from H level to L level. This turns the transistor M3 to ON state. At this time, the set signal S is maintained at H level. With this, the voltage of the first internal node N1 rises to H level, the transistors M1, M6, and M8 are turned to OFF state, and the transistor M7 is turned to ON state. As a result, the voltage of the second internal node N2 also changes from H level to L level. By the voltage of the second internal node N2 changing to L level, the transistor M2 is turned to ON state. In a period after time tb, as in the period before time t1, the voltage of the first internal node N1 is maintained at H level, and the voltage of the second internal node N2 is maintained at L level.

After time tb, at time t6, the subsequent scanning signal NS(i+Y) for reset supplied to the input terminal 34 changes from L level to H level (in this example, Y=2). With this, the transistor M9 is turned to ON state, the second output signal OUT2, that is, the second scanning signal NS(i) changes from H level to L level, and the threshold compensation transistor T2 connected with the second output terminal 39 is turned to OFF state.

Thereafter, the subsequent second scanning signal NS(i+X) is changed to L level at time t7, and then the subsequent light emission control signal EM(i+X) is changed to L level at time t8 to start the light emission period.

In the shift register 301 constituting the gate driver of the present embodiment, the unit circuits 3 configured to operate as described above are cascade-connected as illustrated in FIG. 7, and the gate start pulse signal included in the scanning-side control signal Scs is input to the first stage thereof. With this, the first scanning signals PS(1) to PS(n) for sequentially selecting the first scanning signal lines PS1 to PSn are generated, the second scanning signals NS(1) to NS(n+X) for sequentially selecting the second scanning signal lines NS1 to NSn+X are generated, the first scanning signals PS(1) to PS(n) are applied to the first scanning signal lines PS1 to PSn respectively, and the second scanning signals NS(1) to NS(n+X) are applied to the second scanning signal lines NS1 to NSn+X respectively (in the example depicted in FIG. 1, X=2).

By driving the first scanning signal lines PS1 to PSn and the second scanning signal lines NS1 to NSn+X and driving the light emission control lines EM1 to EMn in the manner described above, the pixel circuit 15 (the pixel circuit Pix(i, j) depicted in FIG. 5) according to the present embodiment performs the initialization operation, data write operation with threshold compensation, and light emitting operation as described above (see FIG. 6).

1.5.4 Another Configuration Example of Unit Circuit

Figure 10:
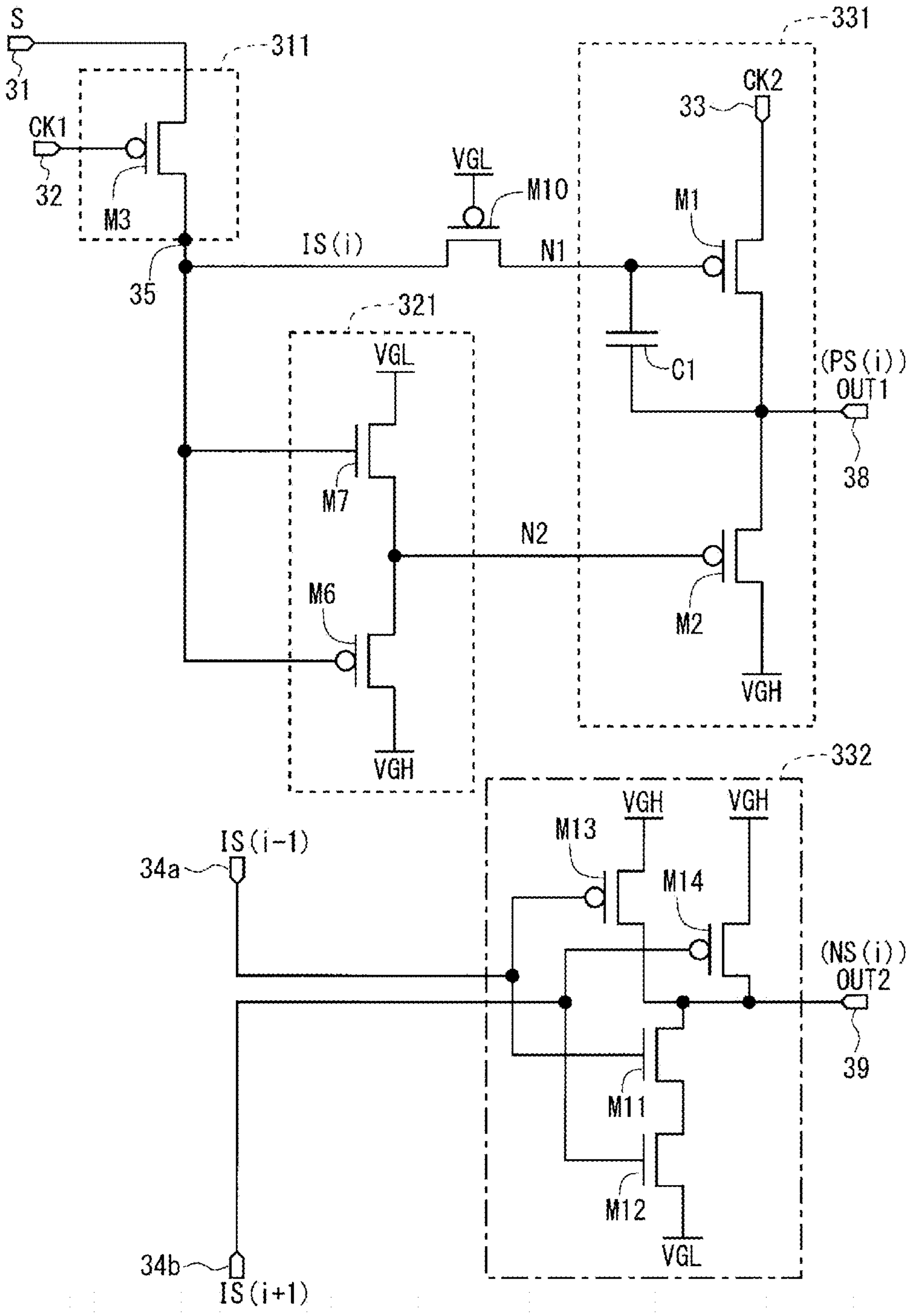
FIG. 10 is a circuit diagram illustrating another configuration example of a unit circuit in a shift register constituting a gate driver according to the first embodiment.

FIG. 10 is a circuit diagram illustrating another configuration example of the unit circuit 3 in the shift register 301 constituting the gate driver according to the present embodiment. As can be understood by comparing FIG. 10 with FIG. 8, the unit circuit 3 of FIG. 10 differs from the unit circuit 3 of FIG. 8 in the configuration of the second output circuit 332 for controlling the output of the second output signal OUT2, and also differs from the unit circuit 3 of FIG. 8 in that the output terminal 35 of the first control circuit 311 is connected to the gate terminal of the transistor M1 via the P-type transistor M10, to the gate terminal of which the second constant voltage (gate low voltage VGL) is applied. Other configurations of the unit circuit 3 in FIG. 10 are the same as those of the unit circuit 3 in FIG. 8. Note that, however, the unit circuit 3 of FIG. 10 has two input terminals 34*a* and 34*b* instead of the input terminal 34, as input terminals connected to the second output circuit 332. Of the configuration of the unit circuit 3 in FIG. 10, portions that are the same as or correspond to those of the unit circuit 3 in FIG. 8 are denoted by the same reference signs.

In the unit circuit 3 of FIG. 10, a node where the drain terminal of the transistor M10 and the gate terminal of the transistor M1 are connected to each other is the first internal node N1, and the voltage of the first internal node N1 changes in the same manner as the voltage of the first internal node N1 in the unit circuit 3 of FIG. 8. In the unit circuit 3 of FIG. 10, the source terminal of the transistor M3, the gate terminals of the transistors M6 and M7, and the source terminal of the transistor M10 are connected to each other, and a node where these terminals are connected to each other is referred to as a "state node". The state node of the unit circuit 3 is denoted by a reference sign of IS, and the voltage of the state node IS of the i-th stage unit circuit 3 is denoted by a reference sign of IS(i). The amplitude of the voltage IS(i) of the state node IS is suppressed by the transistor M10 in such a manner that the voltage IS(i) is not lowered from the second constant voltage (VGL). However, the voltage IS(i) changes as in the first internal node N1 from the viewpoint of the logical value.

As illustrated in FIG. 10, the second output circuit 332 is a NAND gate constituted of two P-type transistors M13 and M14 connected in parallel to each other and two N-type transistors M11 and M12 connected in series to each other. The two input terminals 34*a* and 34*b* and one output terminal 39 are connected to the second output circuit 332 as the NAND gate. The second output circuit 332 outputs the second output signal OUT2 of L level from the output terminal 39 when H level signal is supplied to both of the two input terminals 34*a* and 34*b*, and outputs the second output signal OUT2 of H level from the output terminal 39 when the L level signal is supplied to one or both of the two input terminals 34*a* and 34*b*. In the shift register 301 according to the present embodiment, L level corresponds to the logical value "1" (true), and H level corresponds to the logical value "0" (false). Accordingly, the second output circuit 332 outputs a signal obtained by logically inverting the logical sum of the two logical values indicated by the signals (voltages) supplied to the two input terminals 34*a* and 34*b*, as the second output signal OUT2.

1.5.5 Operation of Shift Register in Another Configuration Example

Figure 11:
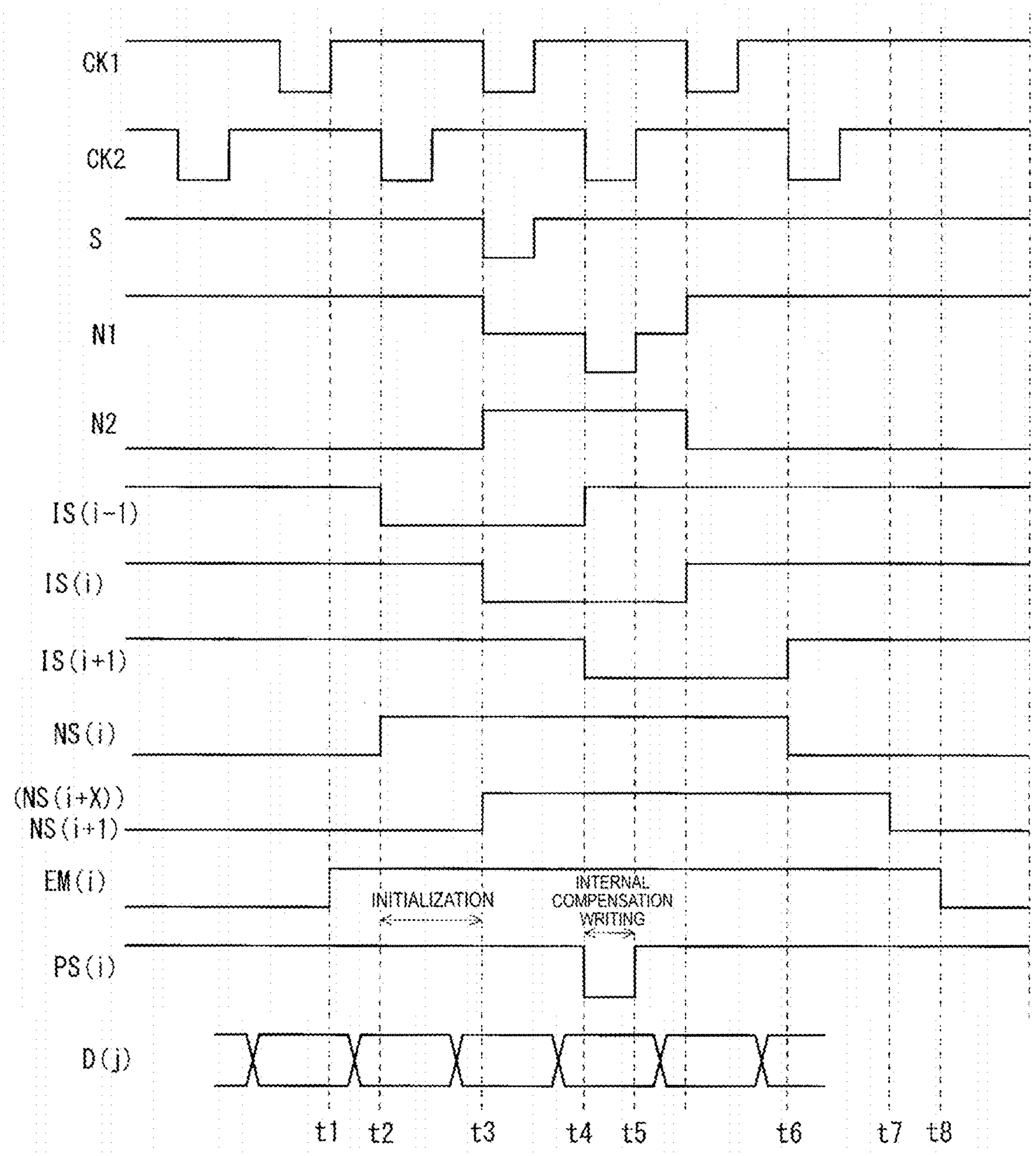
FIG. 11 is a signal waveform diagram for describing an operation of the unit circuit in FIG. 10 according to the first embodiment.

The operation of the shift register 301 using the unit circuit 3 in FIG. 10 will be described below with reference to FIGS. 10 and 11. FIG. 11 is a signal waveform diagram for describing the operation of the unit circuit 3(*i*) at the i-th stage in the shift register 301. In order to facilitate understanding of the operation of the display device 10 according to the present embodiment, the light emission control signal EM(i) generated by the scanning-side drive circuit 40 is also depicted in FIG. 11, and the data signal D(j) generated by the data-side drive circuit 30 (j=1 to m) is also depicted in FIG. 11 for the same purpose. In the shift register 301 of FIG. 7 using the unit circuit 3 in FIG. 8, the subsequent scanning signal NS(i+Y) for reset is supplied to the input terminal 34 of the i-th stage unit circuit 3(*i*). In contrast, in the present shift register 301 using the unit circuit 3 of FIG. 10, the voltage IS(i−1) of the state node IS at the previous stage and the voltage IS(i+1) of the state node IS at the subsequent stage are respectively supplied to the two input terminals 34*a* and 34*b* of the i-th stage unit circuit 3(*i*) instead.

As can be understood by comparing FIG. 11 with FIG. 9, in the present shift register 301 as well, the voltages of the first internal node N1 and the second internal node N2, and the first scanning signal PS(i) output as the first output signal OUT1 change in the same manner as in the shift register 301 of FIG. 7 using the unit circuit 3 in FIG. 8. The voltage IS(i) of the state node IS in the i-th stage unit circuit 3(*i*) changes as depicted in FIG. 11 by the work of the P-type transistor M10, to the gate terminal of which the gate low voltage VGL is applied. Thus, the voltages IS(i−1) and IS(i+1) of the state node IS at the previous stage and the subsequent stage of the i-th stage unit circuit 3(*i*) also change as depicted in FIG. 11. These voltages IS(i−1) and IS(i+1) of the state node IS are supplied to the second output circuit 332 as a NAND gate via the input terminals 34*a* and 34*b*, respectively, and the second scanning signal NS(i) as depicted in FIG. 11 is output from the output terminal 39 as the second output signal OUT2.

In the shift register constituting the gate driver of the present embodiment, the unit circuits 3 configured to operate as described above are cascade-connected, and the gate start pulse signal included in the scanning-side control signal Scs is input to the first stage thereof. With this, the first scanning signals PS(1) to PS(n) for sequentially selecting the first scanning signal lines PS1 to PSn are generated, and the second scanning signals NS(1) to NS(n+X) for sequentially selecting the second scanning signal lines NS1 to NSn+X are generated. When the first scanning signal lines PS1 to PSn and the second scanning signal lines NS1 to NSn+X are driven by the first scanning signals PS(1) to PS(n) and the second scanning signals NS(1) to NS(n+X), and the light emission control lines EM1 to EMn are also driven in the manner described before, the pixel circuit 15 (the pixel circuit Pix(i, j) depicted in FIG. 5) according to the present embodiment performs the initialization operation, data write operation with threshold compensation, and light emitting operation as described above (see FIG. 6).

1.6 Effects

Like the pixel circuit 15*a* in the comparative example illustrated in FIG. 3, the pixel circuit in the organic EL display device employing the known internal compensation method requires the initialization transistor T1 for initializing the voltage (gate voltage) of the gate terminal of the drive transistor T4. In contrast, the Pix(i, j), which is the pixel circuit 15 on the i-th row and j-th column according to the present embodiment, operates based on the first scanning signal PS(i), the second scanning signals NS(i) and NS(i+X), and the light emission control signal Em(i) as described above: a path for initializing the gate voltage Vg of the drive transistor T4 is formed by the threshold compensation transistor T2, the second light emission control transistor T6, and the display element initialization transistor T7 in the pixel circuit Pix(i, j) (i=1 to n, j=1 to m) as described above (see FIGS. 5 and 6). Because of this, it is unnecessary to provide a transistor as a switching element for initializing the gate voltage between the holding capacitor Cst and the initialization voltage line Vini. As a result, in the organic EL display device employing the internal compensation method, the number of elements constituting the pixel circuit is reduced compared to the known technique, whereby the high-resolution of the display image is easily achieved and the yield of manufacturing is improved.

Figure 12:
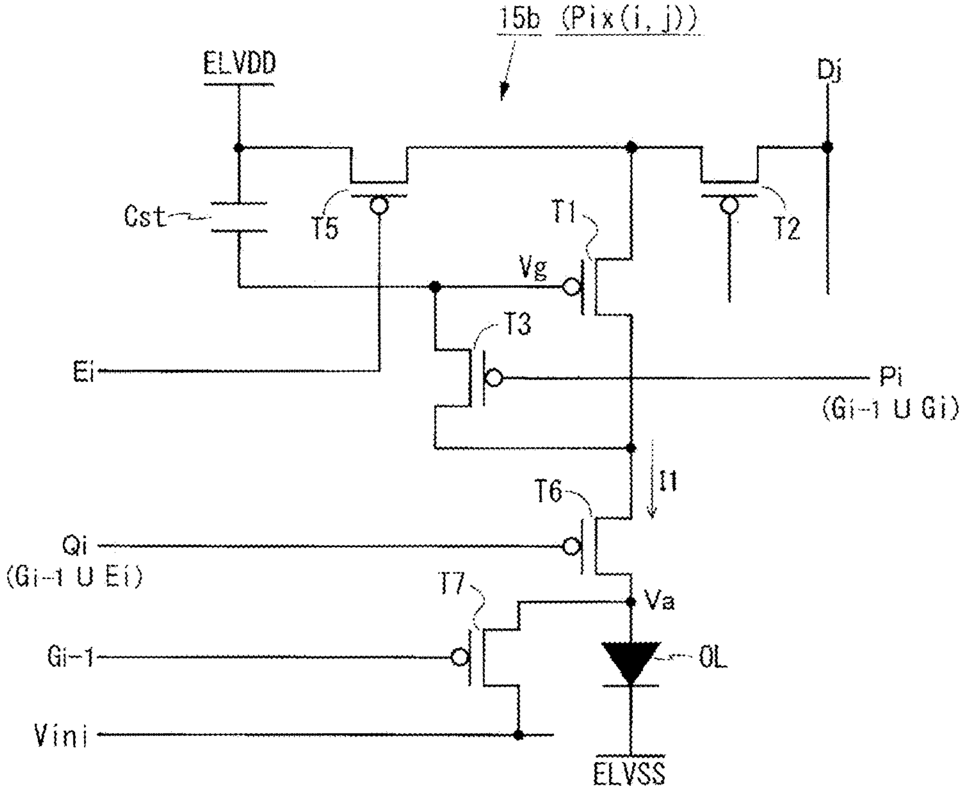
FIG. 12 is a circuit diagram illustrating a configuration of a pixel circuit according to a known example.
Figure 13:
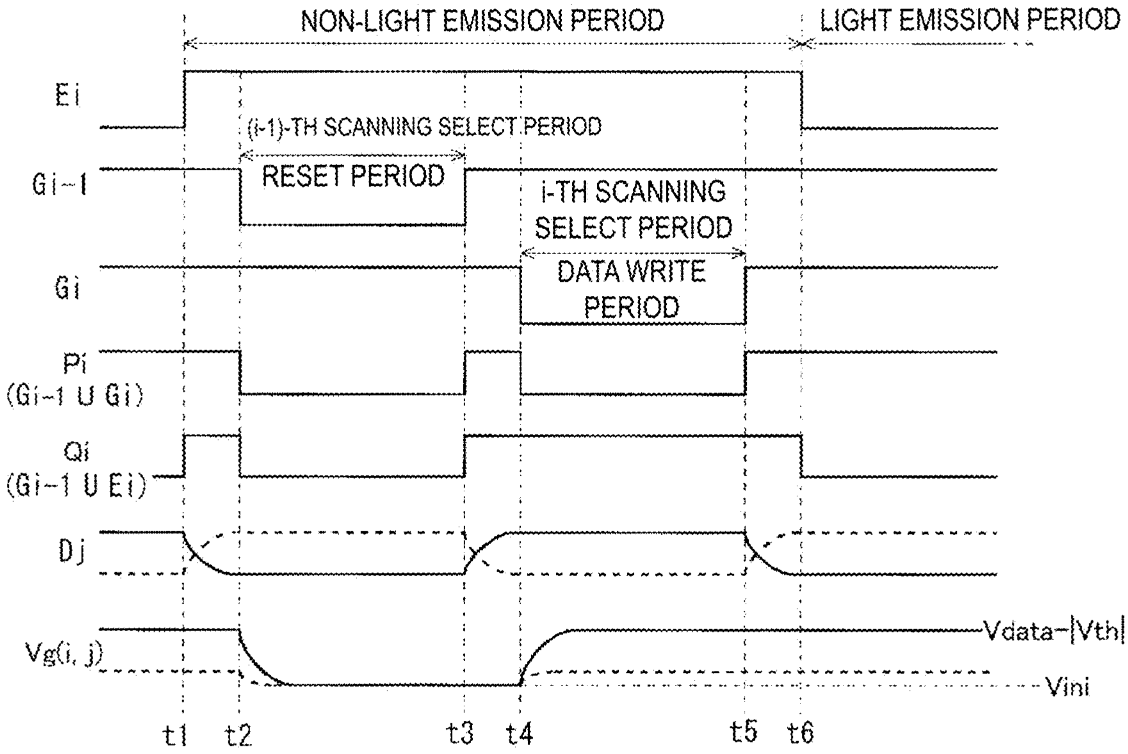
FIG. 13 is a signal waveform diagram for describing an operation of the pixel circuit according to the known example.

As described above, an internal compensation type pixel circuit is known in which, instead of providing a gate voltage initialization transistor, other transistors in the pixel circuit are configured to be additionally used for initializing the gate voltage (PTL 1 and PTL 2). FIG. 12 is a circuit diagram illustrating a configuration example of a known internal compensation type pixel circuit (hereinafter referred to as a "pixel circuit in a known example") 15*b* configured as mentioned above, that is, a circuit diagram illustrating the configuration of a pixel circuit in a display device according to a first embodiment described in PTL 3 (WO 2019/186763). Note that, in FIG. 12, the reference signs of the elements such as transistors constituting the pixel circuit 15*b* are changed to coincide with the reference signs of the corresponding elements in the pixel circuit 15 (FIG. 5) of the present embodiment. FIG. 13 is a signal waveform diagram for describing an operation of the pixel circuit 15*b*. In the display device according to the known example, by driving each pixel circuit 15*b* by signals as depicted in FIG. 13, the same function as that of the display device according to the present embodiment may be enabled.

As can be understood by comparing FIG. 12 with FIG. 5, the pixel circuit 15*b* has basically the same configuration as the pixel circuit 15 of the present embodiment, and in any of the cases, a path for initializing the gate voltage Vg of the drive transistor T4 is formed by the threshold compensation transistor T2, the second light emission control transistor T6, and the display element initialization transistor T7. However, while a corresponding first type logical-sum signal line Pi, a corresponding second type logical-sum signal line Qi, and a preceding scanning signal line Gi−1 are connected to the gate terminals of the transistors T2, T6, and T7 respectively in the known example, the corresponding second scanning signal line NSi, the light emission control line EMi, and the subsequent second scanning signal line NSi+2 are respectively connected thereto in the present embodiment. In this case, the corresponding first type logical-sum signal line Pi is a signal line for transmitting a signal of the logical sum of the corresponding scanning signal G(i) and its immediately previous scanning signal G(i−1): the corresponding second type logical-sum signal line Qi is a signal line for transmitting a signal of the logical sum of the immediately previous scanning signal G(i−1) of the corresponding scanning signal and the corresponding light emission control signal EM(i). Therefore, according to the present embodiment, the number of signal lines to be disposed in the display panel for driving each pixel circuit Pix(i, j) is reduced as compared to the above-discussed known example, and the configuration of the scanning-side drive circuit is simplified accordingly. According to the present embodiment, similarly to the known example described above, since the path for initializing the gate voltage Vg of the drive transistor T4 is formed by the threshold compensation transistor T2, the second light emission control transistor T6, and the display element initialization transistor T7, a leakage current in the path extending from the gate terminal of the drive transistor T4 connected to the holding capacitor Cst to the initialization voltage line Vini during the light emission period is reduced as compared to the configuration in which the first initialization transistor T1 is provided for initializing the gate voltage Vg (see FIG. 3).

2. Second Embodiment

A display device that performs pause driving is known as a display device with low power consumption. Pause driving is a driving method referred to as "intermittent driving" or "low-frequency driving" in which a drive period (refresh period) and a pause period (non-refresh period) are provided when the same image is continuously displayed). In pause driving, a drive circuit is activated during the drive period and the operation of the drive circuit is paused during the pause period.

In the organic EL display device that performs such pause driving, in order to suppress the occurrence of flicker derived from the hysteresis characteristics of the drive transistor T4, a configuration is conceivable in which the first scanning signal line PSi is driven and the driving of the second scanning signal line NSi is stopped so as to apply a bias stress voltage (also referred to as an "on-bias voltage") to the drive transistor T4 via the data signal line Dj in the pause period. In the above-described first embodiment, when the driving of the second scanning signal line NSi is stopped, the second light emission control transistor T6 is maintained in ON state in the pixel circuit 15 illustrated in FIG. 5, whereby the pixel circuit 15 does not appropriately operate in the pause period. Then, hereinafter, an organic EL display device will be described as a second embodiment that uses a pixel circuit not including the first initialization transistor T1 for initializing a gate voltage Vg of a drive transistor T4 as in the first embodiment described above, and appropriately operates even when the on-bias voltage is applied in a pause period during pause driving.

2.1 Configuration

Figure 14:
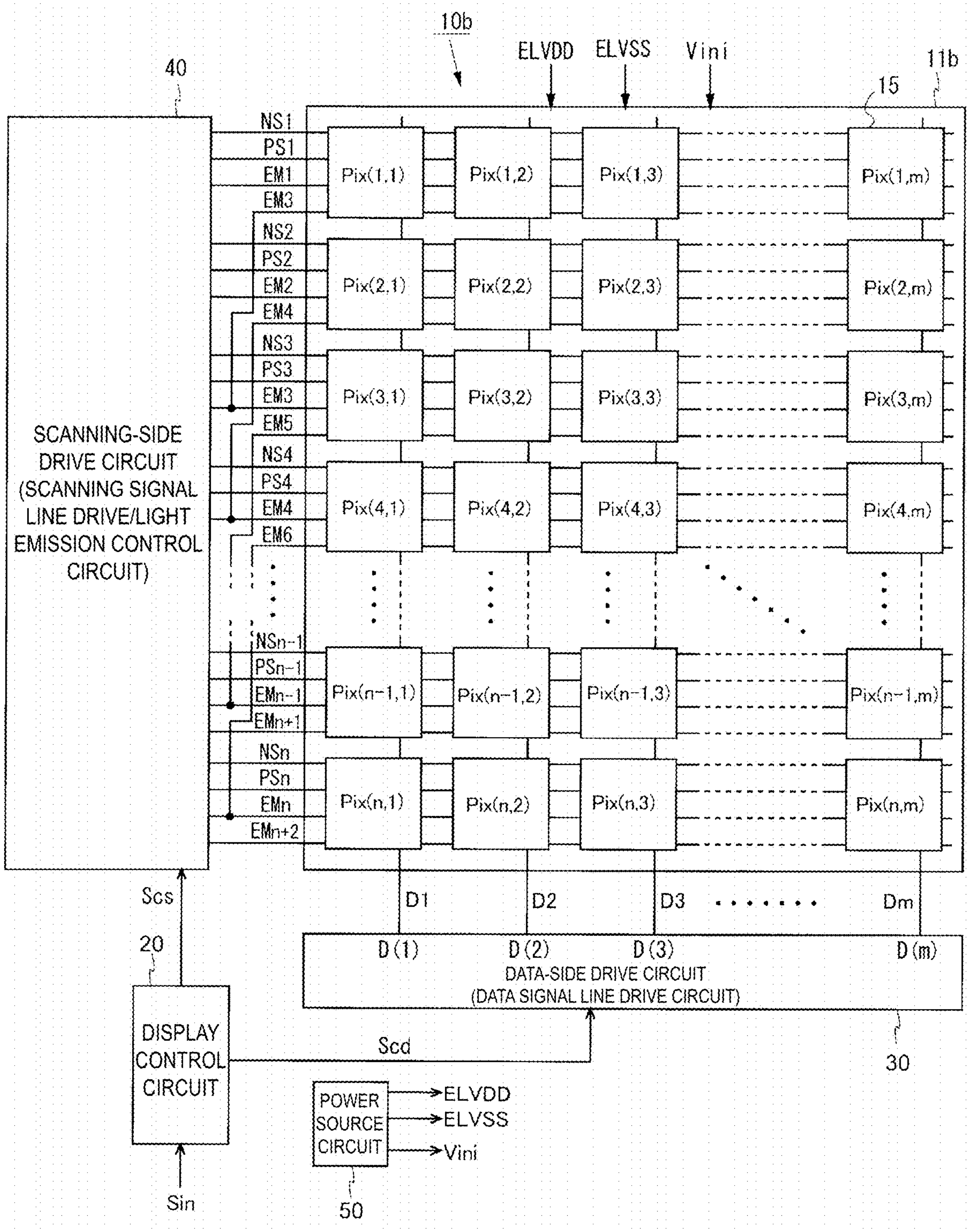
FIG. 14 is a block diagram illustrating an overall configuration of a display device according to a second embodiment.

FIG. 14 is a block diagram illustrating an overall configuration of an organic EL display device 10*b* according to the second embodiment. As in the first embodiment (see FIG. 1), the display device 10*b* is an organic EL display device configured to perform internal compensation and including a display portion 11*b*, a display control circuit 20, a data-side drive circuit 30, a scanning-side drive circuit 40, and a power source circuit 50 as illustrated in FIG. 14. Of the configuration in the present embodiment, portions that are the same as or correspond to those of the first embodiment are denoted by the same reference signs, and detailed description thereof is omitted. The following description is given focusing on the portions of the configuration of the present embodiment that differ from the first embodiment.

In the first embodiment, as illustrated in FIG. 1, the (n+2) second scanning signal lines NS1 to NSn+2 and the n light emission control lines EM1 to EMn are disposed in the display portion 11. However, in the present embodiment, as illustrated in FIG. 14, n second scanning signal lines NS1 to NSn and (n+2) light emission control lines EM1 to EMn+2 are disposed in the display portion 11*b*. Other signal lines, power source lines, and voltage lines disposed in the display portion 11*b* in the present embodiment are the same as those in the first embodiment.

Figure 15:
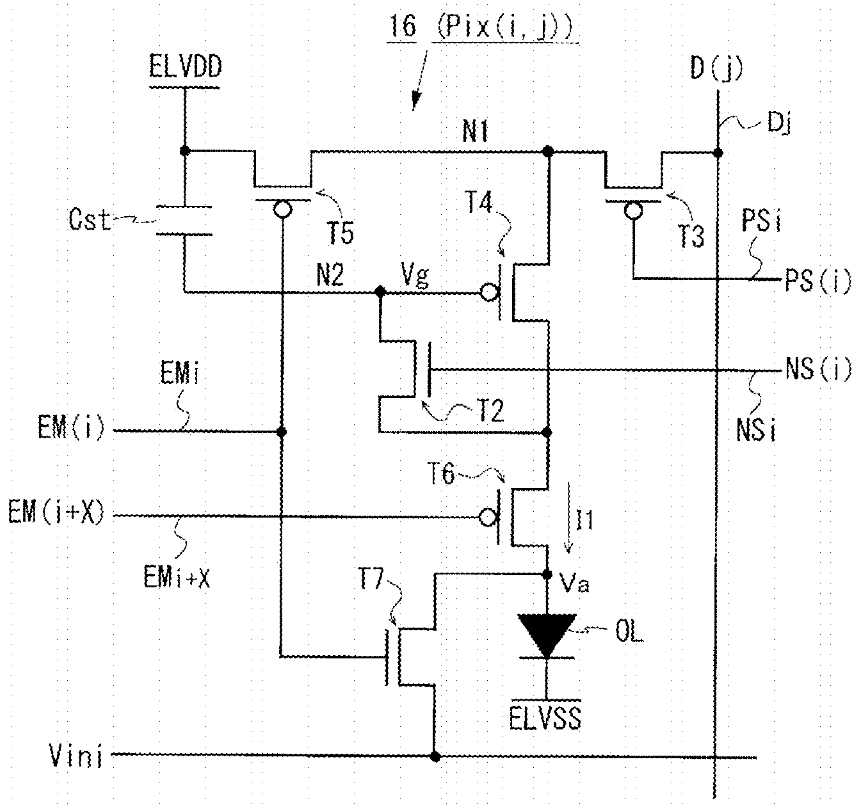
FIG. 15 is a circuit diagram illustrating a configuration of a pixel circuit according to the second embodiment.

FIG. 15 illustrates the configuration of a pixel circuit 16 corresponding to the i-th first scanning signal line PSi and the j-th data signal line Dj in the present embodiment, i.e., the configuration of the pixel circuit Pix(i, j) on the i-th row and j-th column (1≤i≤n, 1≤j≤m). Similar to the pixel circuit 15 (FIG. 5) in the first embodiment, the pixel circuit 16 includes an organic EL element OL as a display element, the drive transistor T4, a write control transistor T3, a threshold compensation transistor T2, a first light emission control transistor T5, a second light emission control transistor T6, a display element initialization transistor T7, and a holding capacitor Cst, and a connection relationship between these elements is the same as that of the pixel circuit 15 in the first embodiment. As illustrated in FIG. 15, the light emission control line EMi+X (X is a positive integer, and X=2 in the example depicted in FIG. 14) subsequent to the corresponding light emission control line EMi is connected to the gate terminal of the second light emission control transistor T6, which is a different point from the first embodiment where the second scanning signal line NSi+X subsequent to the corresponding second scanning signal line NSi is connected to the gate terminal thereof (see FIG. 5). The signal lines connected to the gate terminals of the transistors T2, T3, T5, T6, and T7 as other switching elements in the pixel circuit 16 are the same as those in the pixel circuit 15 in the first embodiment (see FIGS. 5 and 15).

2.2 Operation

The display device 10*b* according to the present embodiment has two operation modes including a normal driving mode and a pause driving mode. That is, the display device 10*b* operates in such a manner that, in the normal driving mode, a refresh frame period Trf for rewriting image data (data voltage in each pixel circuit) of the display portion 11*b* continues, and in the pause driving mode, a drive period TD including only the refresh frame period Trf and a pause period TP including a plurality of non-refresh frame periods Tnrf for stopping the rewriting of image data of the display portion 11*b* alternately appear.

2.2.1 Operation in Normal Driving Mode

Figure 16:
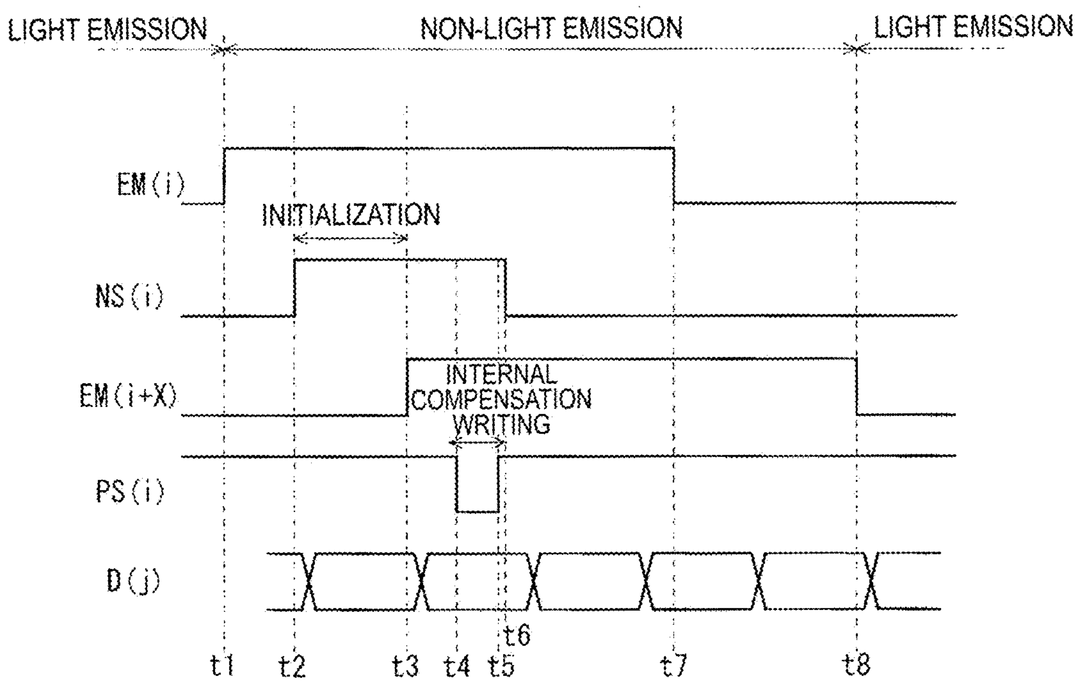
FIG. 16 is a timing chart for describing an operation in a normal driving mode of the pixel circuit according to the second embodiment.

FIG. 16 is a timing chart for describing an operation in the normal driving mode of the pixel circuit 16 according to the present embodiment. Hereinafter, the operation in the normal driving mode of the pixel circuit 16 illustrated in FIG. 15, that is, the pixel circuit Pix(i, j) on the i-th row and j-th column according to the present embodiment will be described with reference to FIGS. 15 and 16. In the normal driving mode of the present embodiment, the first scanning signal line PSi, the second scanning signal line NSi, the light emission control line EMi, and the data signal line Dj are driven as illustrated in FIG. 16, whereby the pixel circuit 16 (the pixel circuit Pix(i, j) on the i-th row and j-th column in the present embodiment) operates as follows.

When the light emission control signal (corresponding light emission control signal) EM(i) sent to the pixel circuit Pix(i, j) in FIG. 15 via the corresponding light emission control line EMi changes from L level to H level at time t1, the P-type first light emission control transistor T5 changes from ON state to OFF state and the pixel circuit Pix(i, j) is brought into a non-light emission state. Thereafter, when the corresponding light emission control signal EM(i) changes from H level to L level at time t7, the first light emission control transistor T5 changes from OFF state to ON state. At this time, since the light emission control signal (hereinafter referred to as the "subsequent light emission control signal") EM(i+X) given to the pixel circuit Pix(i, j) via the subsequent light emission control line EMi+X takes H level, the second light emission control transistor T6 is in OFF state. Because of this, the non-light emission state continues until time point t8 at which the subsequent light emission control signal EM(i+X) changes from H level to L level and the second light emission control transistor T6 turns to ON state. Accordingly, in the pixel circuit Pix(i, j) of the present embodiment, a period from time point t1 at which the corresponding light emission control signal EM(i) changes from L level to H level to time point t8 at which the subsequent light emission control signal EM(i+X) changes from H level to L level, is a non-light emission period.

In the present embodiment, in the non-light emission period, a period t2 to t3 extending from when the corresponding second scanning signal NS(i) changes from L level to H level to when the subsequent light emission control signal EM(i+X) changes from L level to H level is an initialization period. As illustrated in FIG. 16, during the initialization period t2 to t3, the corresponding second scanning signal NS(i) and the corresponding light emission control signal EM(i) take H level, and the subsequent light emission control signal EM(i+X) takes L level, and therefore the N-type threshold compensation transistor T2, the N-type display element initialization transistor T7, and the P-type second light emission control transistor T6 are all in ON state. Because of this, as in the first embodiment, in the initialization period t2 to t3, a current flows from the holding capacitor Cst connected to the gate terminal of the drive transistor T4 to an initialization voltage line Vini via the threshold compensation transistor T2, the second light emission control transistor T6, and the display element initialization transistor T7 in sequence, and the gate voltage Vg of the drive transistor T4 is initialized to the initialization voltage Vini. In the period t2 to t6 (including the initialization period t2 to t3), in which the corresponding light emission control signal EM(i) takes H level, the display element initialization transistor T7 is turned to ON state, whereby a voltage (anode voltage) Va of the anode electrode of the organic EL element OL is initialized. In the initialization period t2 to T3, since the corresponding first scanning signal PS(i) takes H level (see FIG. 16), the write control transistor T3 is in OFF state.

After the initialization period t2 to t3, in the period t3 to t6 until time point t6, at which the corresponding second scanning signal NS(i) changes from H level to L level, the corresponding second scanning signal NS(i) and the subsequent light emission control signal EM(i+X) both take H level, and therefore the N-type threshold compensation transistor T2 is in ON state and the P-type second light emission control transistor T6 is in OFF state. Within the period t3 to t6, the period t4 to t5 extending from when the corresponding first scanning signal PS(i) changes from H level to L level to when the corresponding first scanning signal PS(i) returns to H level is a data write period in the present embodiment. Since the corresponding first scanning signal PS(i) takes L level during the data write period t4 to t5, the P-type write control transistor T3 is in ON state. Accordingly, in the data write period t4 to t5, the voltage of the data signal D(j) sent to the pixel circuit Pix(i, j) via the corresponding data signal line Dj is applied, as a data voltage Vdata, to the holding capacitor Cst via the drive transistor T4 in the diode-connected state. As a result, the data voltage having experienced the threshold compensation is written and held in the holding capacitor Cst, and the gate voltage Vg of the drive transistor T4 is maintained at a value corresponding to the holding voltage of the holding capacitor Cst (see Formula (1) described above).

At time t5, the corresponding first scanning signal PS(i) changes from L level to H level, whereby the write control transistor T3 turns to OFF state. Thereafter, at time t6, the corresponding second scanning signal NS(i) changes from H level to L level, whereby the threshold compensation transistor T2 turns to OFF state. Thereafter, at time T7, the corresponding light emission control signal EM(i) changes from H level to L level, whereby the N-type display element initialization transistor T7 is turned to OFF state, and the P-type first light emission control transistor T5 is turned to ON state. However, at this time point, since the subsequent light emission control signal EM(i+X) takes H level, the second light emission control transistor T6 is in OFF state and the non-light emission state is maintained.

Thereafter, at time t8, the subsequent light emission control signal EM(i+X) changes from H level to L level, whereby the second light emission control transistor T6 also turns to ON state and the light emission period is started. As in the first embodiment described above, during the light emission period, a current I1 of the amount corresponding to the voltage (voltage written in the data write period t4 to t5) held by the holding capacitor Cst flows from a high-level power source line ELVDD to a low-level power source line ELVSS via the first light emission control transistor T5, the drive transistor T4, the second light emission control transistor T6, and the organic EL element OL. With this, the organic EL element OL emits light with luminance corresponding to the data voltage Vdata, which is the voltage of the corresponding data signal line Dj, regardless of the threshold voltage Vth of the drive transistor T4 (see Formula (4) described above).

As can be understood from the above-described operation of the pixel circuit Pix(i, j) in the present embodiment (see FIG. 16), it is sufficient that the positive integer X specifying the subsequent light emission control signal EM(i+X) is selected such that the subsequent light emission control signal EM(i+X) changes from L level to H level after the corresponding second scanning signal NS(i) changes from L level to H level and the H level period (non-active period) of the subsequent light emission control signal EM(i+X) partially overlaps the H level period (active period) of the corresponding second scanning signal NS(i). The data write period t4 to t5 in the present embodiment is set within the overlapping period t3 to t6 (see FIG. 16). Therefore, the first scanning signal lines PS1 to PSn are driven in such a manner that the select period of the corresponding first scanning signal line PSi is included in the overlapping period t3 to t6. The light emission control lines EM1 to EMn need to be driven such that the corresponding light emission control line EMi is in the deactivated state at least in the select period of the corresponding second scanning signal line NSi.

2.2.2 Operation in Pause Driving Mode

Figure 17:
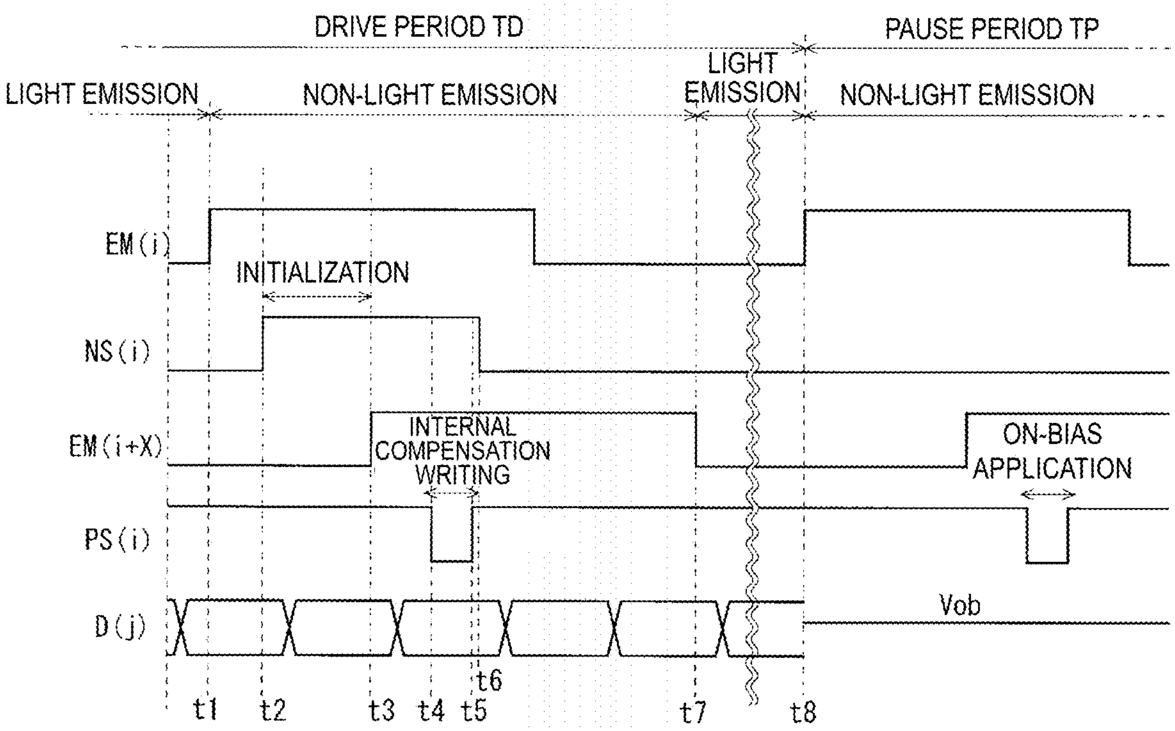
FIG. 17 is a timing chart for describing an operation in a pause driving mode of a pixel circuit according to the second embodiment.

FIG. 17 is a timing chart for describing the operation in the pause driving mode of the pixel circuit 16 according to the present embodiment. Hereinafter, the operation in the pause driving mode of the pixel circuit 16 illustrated in FIG. 15, that is, the pixel circuit Pix(i, j) on the i-th row and j-th column according to the present embodiment will be described with reference to FIGS. 15 and 17. In the pause driving mode of the present embodiment, the first scanning signal line PSi, the second scanning signal line NSi, and the light emission control line EMi are driven as illustrated in FIG. 17, whereby the pixel circuit 16 operates as follows.

As can be understood from FIGS. 16 and 17, during the drive period TD, the first scanning signal line PSi, the second scanning signal line NSi, and the light emission control line EMi are driven as in the normal driving mode, and the pixel circuit Pix(i, j) operates as in the normal driving mode.

As illustrated in FIG. 17, during the pause period TP, the driving of the second scanning signal line NSi is stopped and the second scanning signal NS(i) is maintained at L level, but the light emission control line EMi and the first scanning signal line PSi are driven in the same manner as in the drive period TD in order to suppress the occurrence of flicker in the display image. The reason why the first scanning signal line PSi is driven also in the pause period TP is as follows: in order to suppress the occurrence of flicker derived from the hysteresis characteristics of the drive transistor T4, an on-bias voltage Vob is applied to the drive transistor T4 via the data signal line Dj as described before (see PTL 4 and PTL 5).

In the pause period TP, the first scanning signal (corresponding first scanning signal) PS(i) supplied to the pixel circuit Pix(i, j) via the corresponding first scanning signal line PSi changes in the same manner as in the drive period TD, and the on-bias voltage Vob is applied to the source terminal of the drive transistor t4 in a period corresponding to the data write period t4 to t5 in the drive period TD, i.e., a period during which the corresponding first scanning signal PS(i) takes L level. As illustrated in FIG. 17, during a period when the corresponding first scanning signal PS(i) takes L level (hereinafter referred to as an "on-bias period"), since the corresponding light emission control signal EM(i) and the subsequent light emission control signal EM(i+X) both take H level, the first and second light emission control transistors T5 and T6 are both in OFF state. The threshold compensation transistor T2 is in OFF state during the pause period TP. In such state, the voltage of the corresponding data signal line Dj is applied as the on-bias voltage Vob to the source terminal of the drive transistor T4 via the write control transistor T3 in ON state. With this, since a difference in the threshold value of the drive transistor T4 between the start time of a lighting operation in the drive period TD and the start time of a lighting operation in the pause period TP is suppressed, the occurrence of the flicker derived from the hysteresis characteristics may be prevented.

2.3 Gate Driver

As described above, the scanning-side drive circuit 40 according to the present embodiment also functions as a scanning signal line drive circuit and a light emission control circuit (see FIG. 14). The configuration and operation of a gate driver that is a portion of the scanning-side drive circuit 40 functioning as the scanning signal line drive circuit for generating the first and second scanning signals will be described below.

2.3.1 Configuration Example of Shift Register

Figure 18:
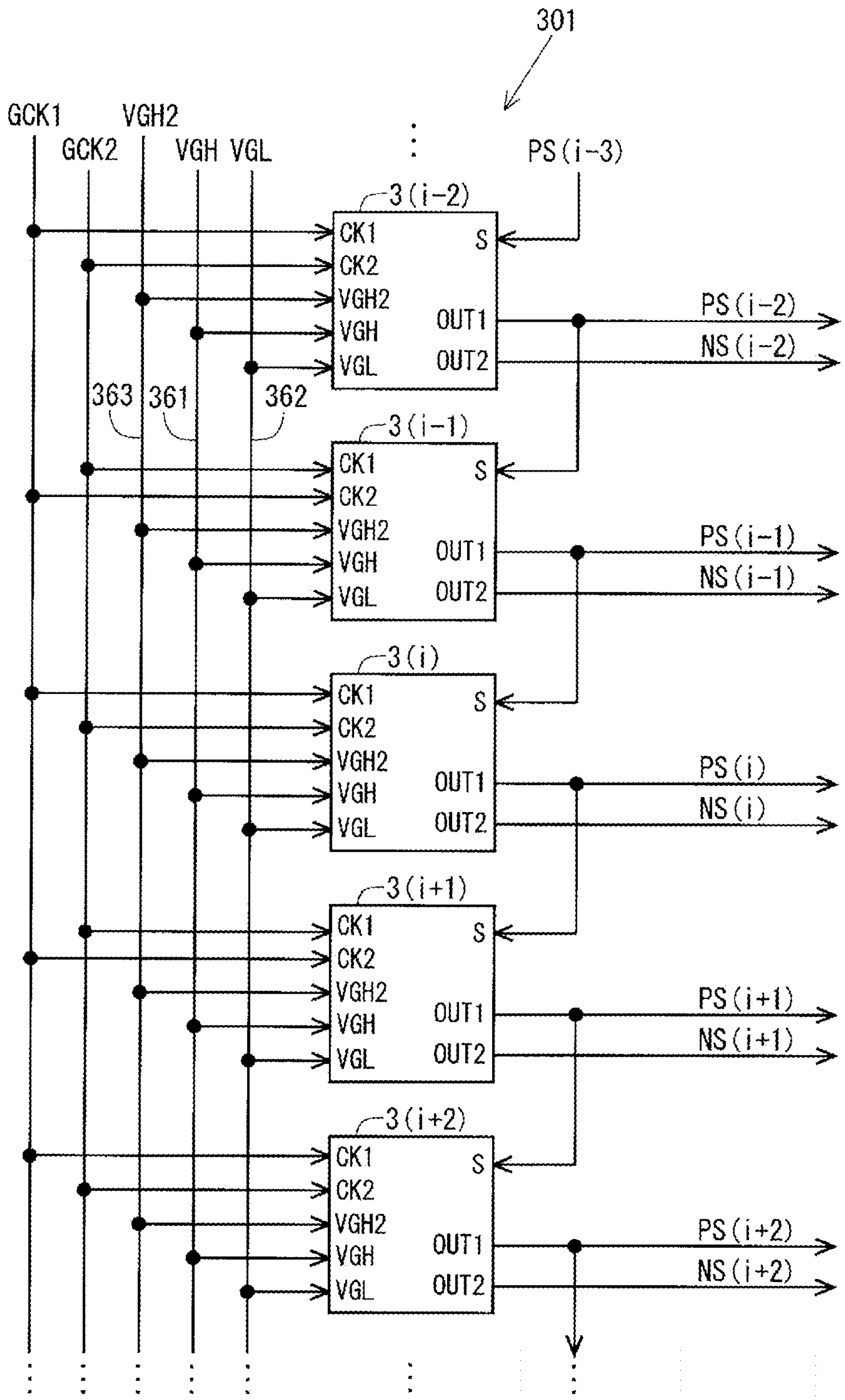
FIG. 18 is a circuit diagram illustrating a schematic configuration of a shift register constituting a gate driver according to the second embodiment.

FIG. 18 is a circuit diagram for describing the schematic configuration of a shift register 301 constituting the gate driver as the scanning signal line drive circuit according to the present embodiment, in which the configuration of five stages of the shift register 301 is illustrated. Here, it is assumed that i is an even number, and attention is focused on the unit circuits 3(*i*−2), 3(*i*−1), 3(*i*), 3(*i*+1), and 3(*i*+2) respectively provided at the (i−2)-th stage, the (i−1)-th stage, the i-th stage, the (i+1)-th stage, and the (i+2)-th stage. As in the shift register according to the first embodiment (FIG. 7), among the signals included in a scanning-side control signal Scs from the display control circuit 20, a gate start pulse signal, a first gate clock signal GCK1, and a second gate clock signal GCK2 are sent to the shift register 301 as the gate control signals GCTL for controlling the gate driver. A gate high voltage VGH as a first constant voltage and a gate low voltage VGL as a second constant voltage are also applied to the shift register 301. Furthermore, a drive-time gate high signal VGH2, which takes H level (same level as the gate high voltage VGH) during the drive period TD and takes L level (same level as the gate low voltage VGL) during the pause period TP, is also supplied from the display control circuit 20 to the shift register 301. The drive-time gate high signal VGH2 functions as a mode signal indicating whether the period for the operation of the shift register 301 is the drive period TD or the pause period TP. The gate high voltage VGH is supplied by a first constant voltage line 361, the gate low voltage VGL is supplied by a second constant voltage line 362, and the drive-time gate high signal VGH2 is supplied through a voltage signal line 363. The gate start pulse signal is a signal supplied to the unit circuit 3(1) at the first stage as a set signal S, and is omitted in FIG. 18.

Each unit circuit 3 includes input terminals for receiving a first control clock signal CK1, a second control clock signal CK2, the set signal S, the gate high voltage VGH, the gate low voltage VGL and the drive-time gate high signal VGH2, and output terminals for outputting a first output signal OUT1 and a second output signal OUT2. The first output signal OUT1 is a first scanning signal, and the second output signal OUT2 is a second scanning signal. That is, in each unit circuit 3, the first scanning signal and the second scanning signal are generated.

As in the shift register 301 according to the first embodiment (FIG. 7), for the unit circuits 3 at even-numbered stages, the first gate clock signal GCK1 is supplied as the first control clock signal CK1 and the second gate clock signal GCK2 is supplied as the second control clock signal CK2. For the unit circuits 3 at odd-numbered stages, the second gate clock signal GCK2 is supplied as the first control clock signal CK1 and the first gate clock signal GCK1 is supplied as the second control clock signal CK2. The gate high voltage VGH, the gate low voltage VGL, and the drive-time gate high signal VGH2 are sent in common to all of the unit circuits 3. To the unit circuit 3(*k*) at each stage, the first output signal OUT1 from the unit circuit of the previous stage is supplied as the set signal S. The first output signal OUT1 from the unit circuit 3(*k*) at each stage is supplied to the corresponding first scanning signal line PSk as the first scanning signal PS(k), and the second output signal OUT2 from the unit circuit 3(*k*) at each stage is supplied to the corresponding second scanning signal line NSk as the second scanning signal NS(k) (k=1 to n). As illustrated in FIG. 15, focusing on each pixel circuit Pix(i, j) of the i-th row (j=1 to m), the first scanning signal line PSi is connected to the gate terminal of the write control transistor T3, and the second scanning signal line NSi is connected to the gate terminal of the threshold compensation transistor T2.

2.3.2 Unit Circuit

Figure 19:
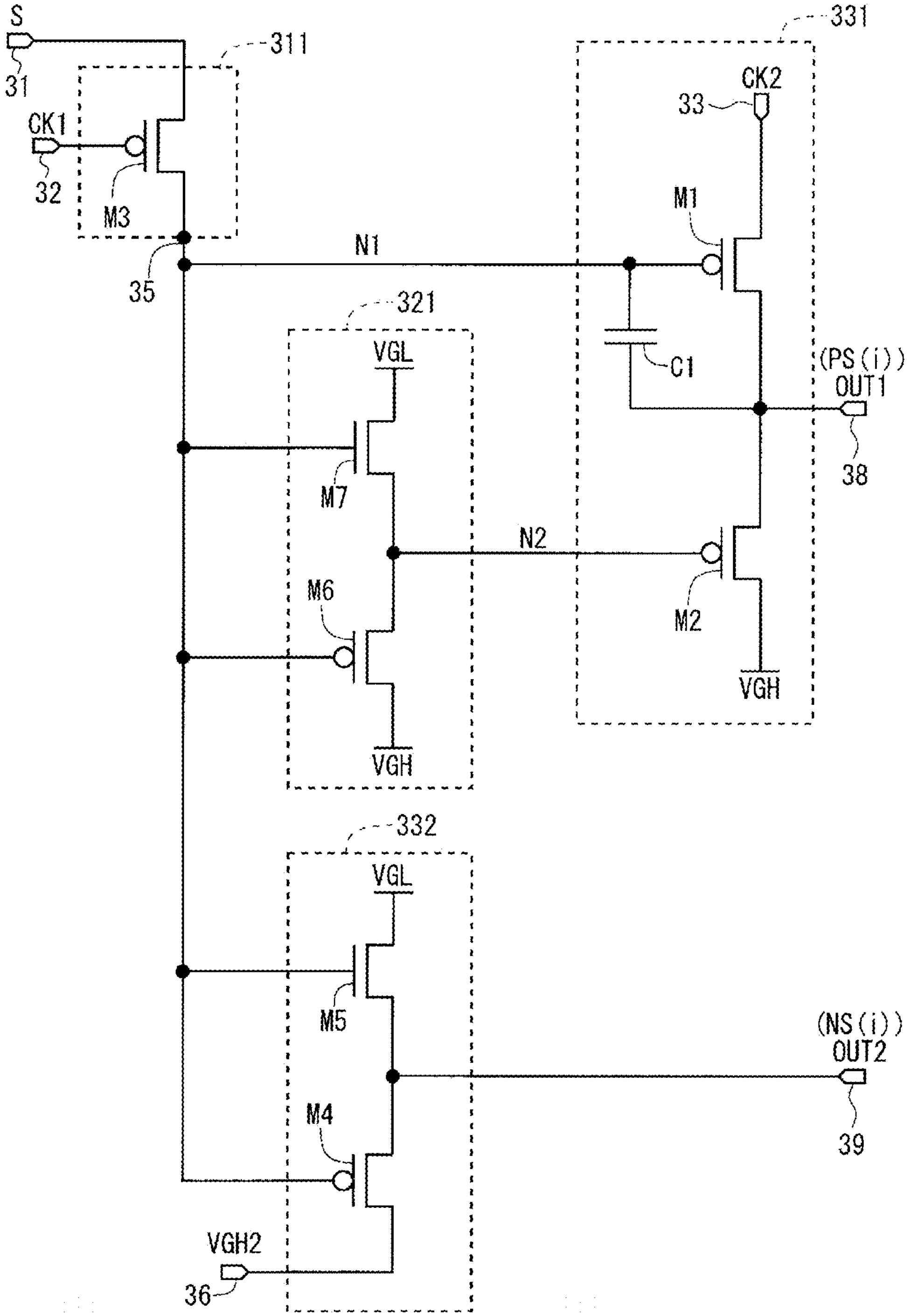
FIG. 19 is a circuit diagram illustrating a configuration example of a unit circuit in the shift register constituting the gate driver according to the second embodiment.

FIG. 19 is a circuit diagram illustrating a configuration example of the unit circuit 3 in the shift register 301 constituting the gate driver according to the present embodiment. As can be understood by comparing FIG. 19 with FIG. 8, the unit circuit 3 in the present embodiment differs from the unit circuit 3 in the first embodiment (FIG. 8) in the configuration of a second output circuit 332 for controlling the output of the second output signal OUT2, and also differs in that an input terminal 36 for receiving the drive-time gate high signal VGH2 is provided instead of the input terminals 34 for receiving the subsequent scanning signal NS(i+Y) for reset. Other configurations of the unit circuit 3 in the present embodiment are the same as those of the unit circuit 3 in the first embodiment (FIG. 8). Thus, the portions of the configuration of the unit circuit 3 in the present embodiment that are the same as or correspond to those of the unit circuit 3 in the first embodiment (FIG. 8) are assigned the same reference signs.

As illustrated in FIG. 19, the second output circuit 332 in the present embodiment includes a P-type transistor M4 and an N-type transistor M5 configured to function as switching elements. Regarding the transistor M4, the gate terminal is connected to a first internal node N1, the source terminal is connected to the input terminal 36, that is, the input terminal for receiving the drive-time gate high signal VGH2, and the drain terminal is connected to a second output terminal 39. Regarding the transistor M5, the gate terminal is connected to the first internal node N1, the drain terminal is connected to the second output terminal 39, and the source terminal is connected to the second constant voltage line. Note that the unit circuit 3 is configured such that a threshold voltage Vtn (>0) of the N-type transistor M5 in the second output circuit 332 is greater than the absolute value of a threshold voltage Vtp (<0) of a P-type transistor M3 in a first control circuit 311.

2.3.3 Operation of Shift Register

Figure 20:
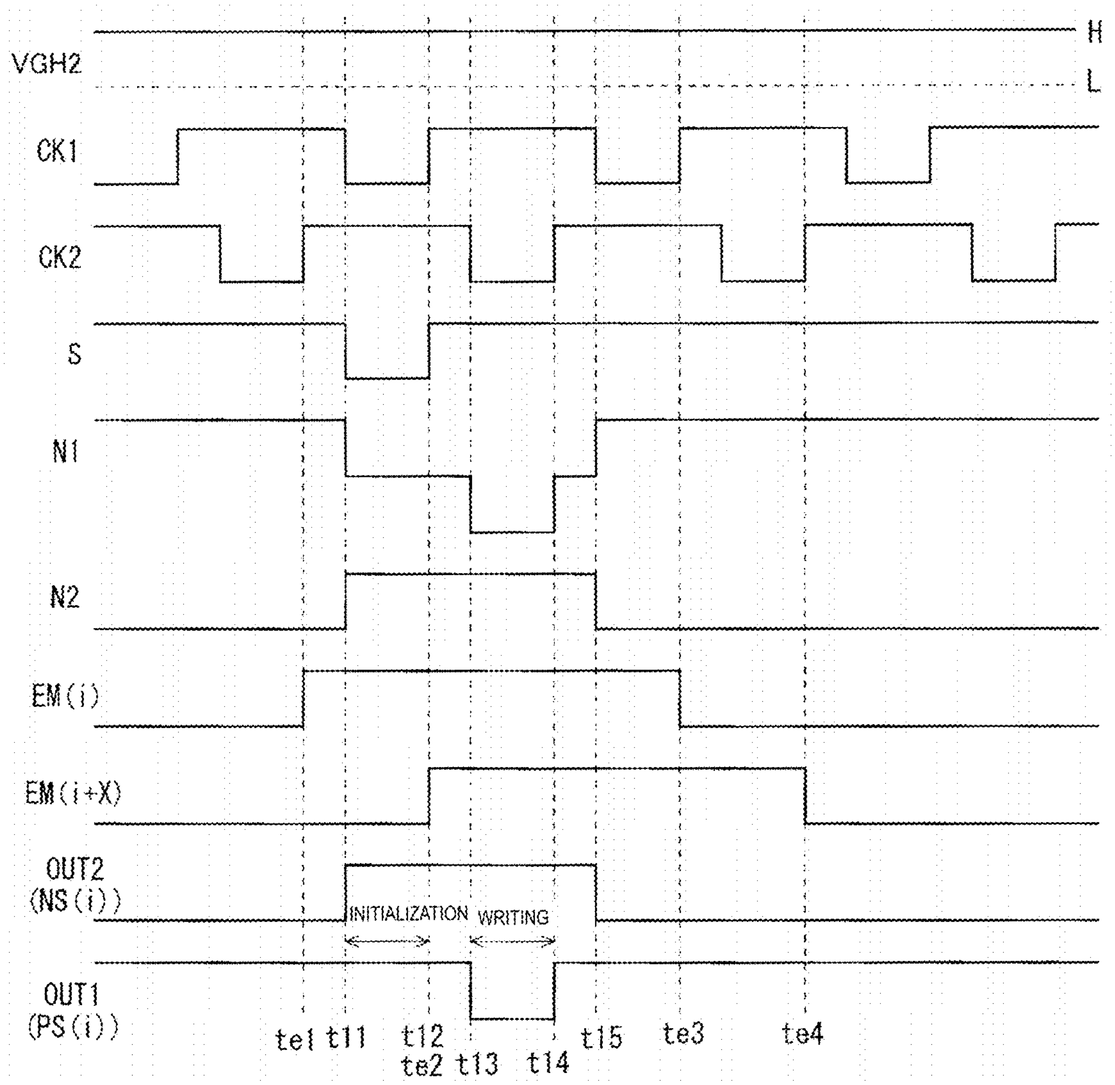
FIG. 20 is a signal waveform diagram for describing an operation in a drive period of the unit circuit in FIG. 19 according to the second embodiment.
Figure 21:
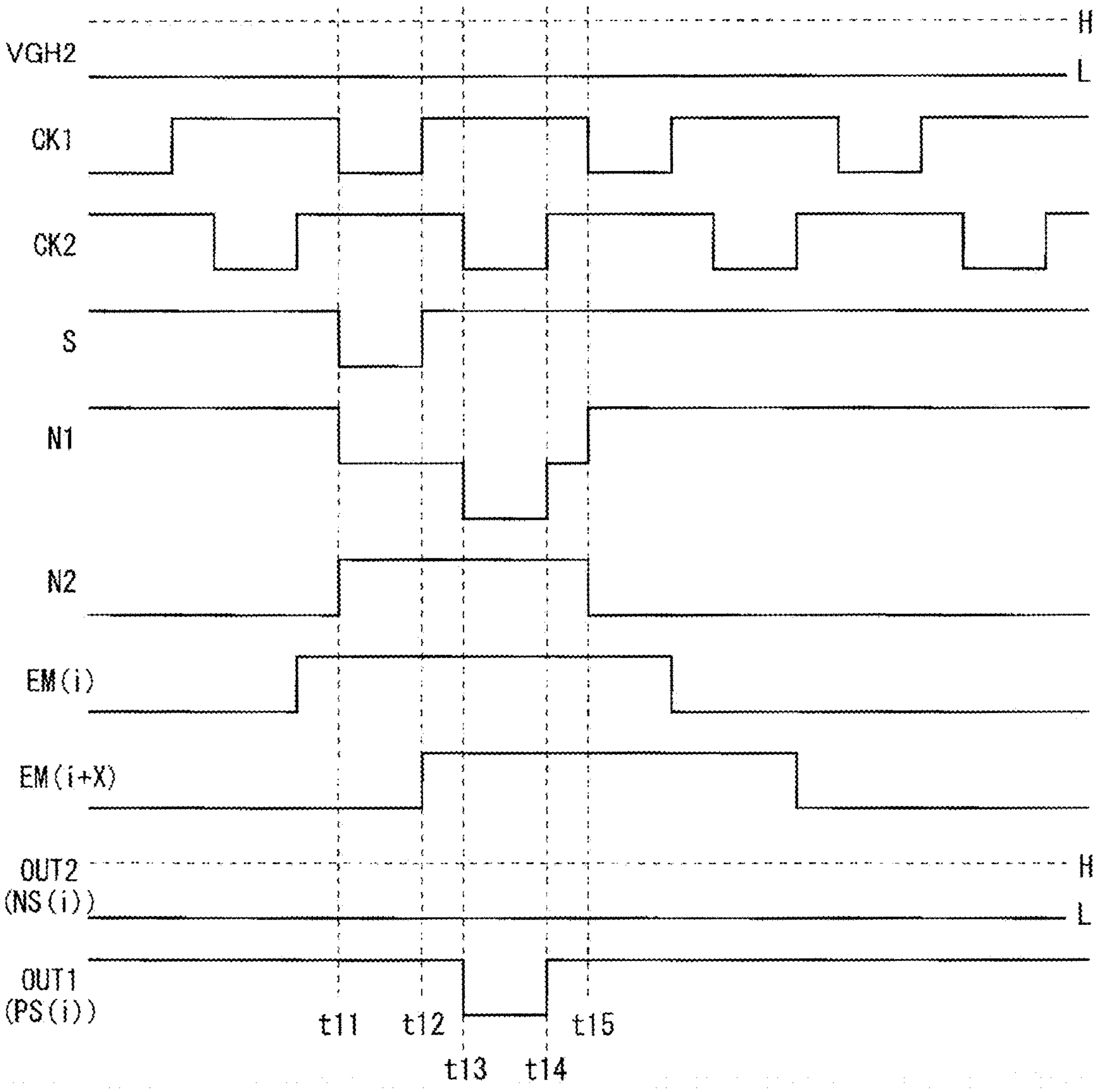
FIG. 21 is a signal waveform diagram for describing an operation in a pause period of the unit circuit in FIG. 19 according to the second embodiment.

An operation in the pause driving mode of the shift register 301 of the present embodiment configured as described above will be described below with reference to FIGS. 19, 20, and 21. Since an operation in the normal driving mode of this shift register 301 is the same as that in the drive period TD in the pause driving mode, the description thereof is omitted. FIG. 20 is a signal waveform diagram for describing the operation in the drive period TD (RF frame period Trf) in the pause driving mode of the unit circuit 3(*i*) of the i-th stage used in the shift register 301. FIG. 21 is a signal waveform diagram for describing the operation in the pause period TP (NRF frame period Tnrf) in the pause driving mode of the unit circuit 3(*i*) of the i-th stage in the shift register 301. In order to facilitate understanding of the operation of the display device 10*b* according to the present embodiment, the light emission control signal EM(i) generated by the scanning-side drive circuit 40 is also depicted in FIGS. 20 and 21.

First, the operation of the unit circuit 3 in the drive period TD (RF frame period) will be described with reference to FIG. 20. In a period before time t11, the voltage of the first internal node N1 is maintained at H level, the voltage of a second internal node N2 is maintained at L level, the first output signal OUT1 is maintained at H level, and the second output signal OUT2 is maintained at L level. Note that since the second internal node N2 is maintained at L level, a transistor M2 is kept in ON state.

At time t11, the first control clock signal CK1 changes from H level to L level, putting the transistor M3 in ON state. Also, at time t11, the set signal S changes from H level to L level. With this, the voltage of the first internal node N1 drops to L level, a transistor M1 and a transistor M6 are turned to ON state, and the transistor M5 and a transistor M7 are turned to OFF state. As a result, the voltage of the second internal node N2 changes from L level to H level. Also, since the drive-time gate high signal VGH2 during the drive period TD is maintained at H level, the transistor M4 is turned to ON state. This causes the second output signal OUT2 to change from L level to H level. As a result, the threshold compensation transistor T2 connected with the second output terminal 39 turns to ON state.

The L level voltage of the first internal node N1 is, more precisely, set to a level of voltage higher than the gate low voltage VGL as the second constant voltage by an amount equivalent to the absolute value of the threshold voltage Vtp of the transistor M3. However, as described above, the threshold voltage Vtn (>0) of the N-type transistor M5 in the second output circuit 332 is greater than the absolute value of the threshold voltage Vtp (<0) of the P-type transistor M3 in the first control circuit 311. Thus, the transistor M5 is reliably turned to OFF state, also by the above-discussed L level voltage of the first internal node N1.

Then, at time t12, the first control clock signal CK1 changes from L level to H level. This turns the transistor M3 to OFF state. Also, at time t12, the set signal S changes from L level to H level.

Then, at time t13, the second control clock signal CK2 changes from H level to L level. At this time, since the transistor M1 is in ON state, along with the voltage drop of an input terminal 33, the voltage of the first output terminal 38 (voltage of the first output signal OUT1) drops. Here, since a capacitor C1 is provided between the first internal node N1 and the first output terminal 38, along with the voltage drop of the first output terminal 38, the voltage of the first internal node N1 also drops. By such a bootstrap operation, the voltage of the first output signal OUT1 drops to a level sufficient to cause the write control transistor T3 connected with the first output terminal 38 to be turned to ON state.

Then, at time t14, the second control clock signal CK2 changes from L level to H level. With this, along with the rise of the voltage of the input terminal 33, the voltage (voltage of the first output signal OUT1) of the first output terminal 38 rises. When the voltage of the first output terminal 38 rises, the voltage of the first internal node N1 also rises through the capacitor C1.

Then, at time t15, the first control clock signal CK1 changes from H level to L level. This turns the transistor M3 to ON state. At this time, the set signal S is maintained at H level. Accordingly, the voltage of the first internal node N1 increases to H level, the transistor M1, the transistor M4, and the transistor M6 are turned to OFF state, and the transistor M5 and transistor M7 are turned to ON state. With this, the second output signal OUT2 changes from H level to L level, and the voltage of the second internal node N2 also changes from H level to L level. When the second output signal OUT2 changes to L level, the threshold compensation transistor T2 connected with the second output terminal 39 is turned to OFF state. By the voltage of the second internal node N2 changing to L level, the transistor M2 is turned to ON state.

As in a period before time t11, in a period after time t15, the voltage of the first internal node N1 is maintained at H level, the voltage of the second internal node N2 is maintained at L level, the first output signal OUT1 is maintained at H level, and the second output signal OUT2 is maintained at L level.

Two light emission control signals EM(i) and EM(i+X) to be supplied to the pixel circuits Pix(i, 1) to Pix(i, m) on the i-th row connected to the first and second output terminals 38 and 39 change as depicted in FIG. 20. That is, the corresponding light emission control signal EM(i) changes from L level to H level at time te1 before time t11, and changes from H level to L level at time te3 after time t15. The subsequent light emission control signal EM(i+X) changes from L level to H level at time te2 (=t12) after time t11 and before time t13, and changes from H level to L level at time te4 after time te3. With this, the subsequent light emission control signal EM(i+X) changes to H level after the second scanning signal NS(i) changes to H level, and the first scanning signal PS(i) takes L level (active) in an overlapping period te2 to t15 of H level period of the second scanning signal NS(i) and H level period of the subsequent light emission control signal EM(i+X). The light emission period starts at time te4, at which the subsequent light emission control signal EM(i+X) changes from H level to L level (time te4 corresponds to time t7 illustrated in FIG. 17).

Next, an operation of the unit circuit 3 in the pause period TP (NRF frame period) will be described with reference to FIG. 21. In a period before time t11, the voltage of the first internal node N1 is maintained at H level, the voltage of the second internal node N2 is maintained at L level, the first output signal OUT1 is maintained at H level, and the second output signal OUT2 is maintained at L level. Note that since the second internal node N2 is maintained at L level, the transistor M2 is kept in ON state.

At time t11, the first control clock signal CK1 changes from H level to L level, putting the transistor M3 in ON state. Also, at time t11, the set signal S changes from H level to L level. Accordingly, as in the drive period TD, the voltage of the first internal node N1 decreases to L level, the transistor M1 and the transistor M6 are turned to ON state, and the transistor M7 is turned to OFF state. At this time, in the second output circuit 332, the transistor M5 is turned to OFF state, and during the pause period TP, the drive-time gate high signal VGH2 takes L level. Thus, irrespective of the state of the transistor M4, the first output signal OUT1 is maintained at L level. As a result, the threshold compensation transistor T2 connected with the second output terminal 39 is maintained in OFF state.

Then, at time t12, the first control clock signal CK1 changes from L level to H level. This turns the transistor M3 to OFF state. Also, at time t12, the set signal S changes from L level to H level.

Then, at time t13, the second control clock signal CK2 changes from H level to L level. At this time, since the transistor M1 is in ON state, along with the voltage drop of the input terminal 33, the voltage of the first output terminal 38 (voltage of the first output signal OUT1) drops. Since the capacitor C1 is provided between the first internal node N1 and the first output terminal 38, at this time in the first output circuit 331, a bootstrap operation is performed as in the drive period TD. In other words, along with the voltage drop of the first output terminal 38, the voltage of the first internal node N1 also drops. As a result, the voltage of the first output signal OUT1 drops to a level sufficient to cause the write control transistor T3 connected with the first output terminal 38 to be in ON state. At this time, in the second output circuit 332, the transistor M5 is in OFF state, and the transistor M4 is turned to ON state: during the pause period TP, the drive-time gate high signal VGH2 takes L level. Thus, the second output signal OUT2 is maintained at L level.

Then, at time t14, the second control clock signal CK2 changes from L level to H level. With this, along with the rise of the voltage of the input terminal 33, the voltage (voltage of the first output signal OUT1) of the first output terminal 38 rises. When the voltage of the first output terminal 38 rises, the voltage of the first internal node N1 also rises through the capacitor C1.

Then, at time t15, the first control clock signal CK1 changes from H level to L level. This turns the transistor M3 to ON state. At this time, the set signal S is maintained at H level. Accordingly, the voltage of the first internal node N1 increases to H level, the transistor M1, the transistor M4, and the transistor M6 are turned to OFF state, and the transistor M5 and transistor M7 are turned to ON state. Thus, as in the drive period TD, the voltage of the second internal node N2 also changes from H level to L level and the transistor M2 is turned to ON state. In addition, since the transistor M4 is turned to OFF state and the transistor M5 is turned to ON state, the second output signal OUT2 is maintained at L level.

As in a period before time t11, in a period after time t15, the voltage of the first internal node N1 is maintained at H level, the voltage of the second internal node N2 is maintained at L level, the first output signal OUT1 is maintained at H level, and the second output signal OUT2 is maintained at L level.

Two light emission control signals EM(i) and EM(i+X) to be supplied to the pixel circuits Pix(i, 1) to Pix(i, m) on the i-th row connected to the first and second output terminals 38 and 39 change as depicted in FIG. 21, as in the drive period TD (see FIG. 20).

As described above, in the pause period TP, the first control circuit 311, the second control circuit 321, and the first output circuit 331 operate as in the drive period TD (see FIG. 20). As a result, the first output signal OUT1, which changes as in the drive period TD, is applied to the corresponding first scanning signal line PSi as the first scanning signal PS(i). However, since the drive-time gate high signal VGH2 takes L level during the pause period TP, the second output signal OUT2 generated in the second output circuit 332 is maintained at L level during the pause period TP (see FIG. 21).

In the shift register 301 constituting the gate driver in the present embodiment, the unit circuits 3 configured to operate as described above in the drive period TD and the pause period TP are cascade-connected as illustrated in FIG. 18, and the gate start pulse signal included in the scanning-side control signal Scs is input to the first stage. With this, the first scanning signals PS(1) to PS(n) to be applied to the first scanning signal lines PS1 to PSn, respectively, are generated, and the second scanning signals NS(1) to NS(n) to be applied to the second scanning signal lines NS1 to NSn, respectively, are also generated. In the drive period TD, the first scanning signal lines PS1 to PSn and the second scanning signal lines NS1 to NSn are driven by the first scanning signals PS(1) to PS(n) and the second scanning signals NS(1) to NS(n), and the light emission control lines EM1 to EMn+X are also driven in the manner described before, whereby the pixel circuit 16 (the pixel circuit Pix(i, j) depicted in FIG. 15) performs the initialization operation, data write operation with threshold compensation, and light emitting operation as described above (see FIGS. 16 and 17). During the pause period TP, driving of the second scanning signal lines NS1 to NSn is stopped, but the first scanning signal lines PS1 to PSn are driven by the first scanning signals PS(1) to PS(n) and the light emission control lines EM1 to EMn+X are driven as described above (see FIG. 17). Thus, in the pause period TP, the image display of the immediately previous RF frame period is continued by the light emitting operation accompanied by a non-light emission period similarly to the drive period TD, and the on-bias voltage Vob is applied to the drive transistor T4 in the pixel circuit 16 via the data signal line Dj in each non-light emission period.

2.4 Effects

In the present embodiment as described above, also in the case of performing the pause driving in the organic EL display device employing the internal compensation method, the Pix(i, j) as the pixel circuit 16 on the i-th row and j-th column operates based on the first scanning signal PS(i), the second scanning signal NS(i), and the light emission control signals EM(i) and EM(i+X): in the drive period TD, a path for initializing the gate voltage Vg of the drive transistor T4 is formed by the threshold compensation transistor T2, the second light emission control transistor T6, and the display element initialization transistor T7 in the pixel circuit Pix(i, j) (i=1 to n, j=1 to m) as described above, and it is unnecessary to provide a transistor as a switching element for initializing the gate voltage between the holding capacitor and the initialization voltage line (see FIG. 15). Therefore, according to the present embodiment, it is possible to obtain the same effects as those of the first embodiment while reducing the power consumption by the pause driving. Furthermore, in the pause driving, the on-bias voltage Vob is applied to the drive transistor T4 for each non-light emission period in the pause period TP (see FIG. 17), and thus it is possible to suppress the occurrence of flicker derived from the hysteresis characteristics of the drive transistor T4.

3. Third Embodiment

Next, an organic EL display device according to a third embodiment will be described. In the first and second embodiments, as illustrated in FIGS. 5 and 15, both the P-type transistor and the N-type transistor are used in the pixel circuits 15 and 16. In contrast, in the present embodiment, transistors used in a pixel circuit are only P-type transistors (see FIG. 22 described below), and an internal compensation method is employed as in the first and second embodiments.

3.1 Overall Configuration

An overall configuration of a display device according to the present embodiment is basically the same as that of the second embodiment (see FIG. 14), and the constituent elements that are the same as or correspond to the constituent elements of the second embodiment are assigned the same reference signs and detailed description thereof is omitted. Portions in the configuration of the present embodiment that differ from the above-described second embodiment will be mainly described below.

In the present embodiment, corresponding to the configuration of a pixel circuit illustrated in FIG. 22 described below, two types of scanning signal lines for P-type transistors, i.e., first P scanning signal lines PS11 to PS**1*n* and second P scanning signal lines PS21 to PS2*n* are disposed in the display portion 11*b* in place of the first scanning signal lines PS1 to PSn and the second scanning signal lines NS1 to NSn. The i-th first P scanning signal line P1*i* and second P scanning signal line P2*i***, the i-th light emission control line EMi, and the j-th data signal line Dj correspond to a pixel circuit Pix(i, j) on the i-th row and j-th column.

In each frame period, based on the scanning-side control signal Scs, the scanning-side drive circuit 40, serving as the scanning signal line drive circuit, sequentially selects the n first P scanning signal lines PS11 to PS**1*n* each for a predetermined period corresponding to one horizontal period and sequentially selects the n second P scanning signal lines PS21 to PS2*n* each for a predetermined period corresponding to one horizontal period, applies an active signal to the selected first P scanning signal line PS1*s* (s is an integer satisfying a relation of $1 \leq s \leq n$) and applies an active signal to the selected second P scanning signal line PS2*k*** (k is an integer satisfying a relation of $1 \leq k \leq n$), and applies a non-active signal to the non-selected first P scanning signal line and applies a non-active signal to the non-selected second P scanning signal line. By driving the above-described first P scanning signal lines PS11 to PS1$n$ and second P scanning signal lines PS21 to PS2$n$ and driving the data signal lines D1 to Dm and light emission control lines EM1 to EMn+X (X is a positive integer satisfying a condition described later) similar to those of the second embodiment, each pixel circuit in the present embodiment operates (details will be described below).

3.2 Configuration of Pixel Circuit

Figure 22:
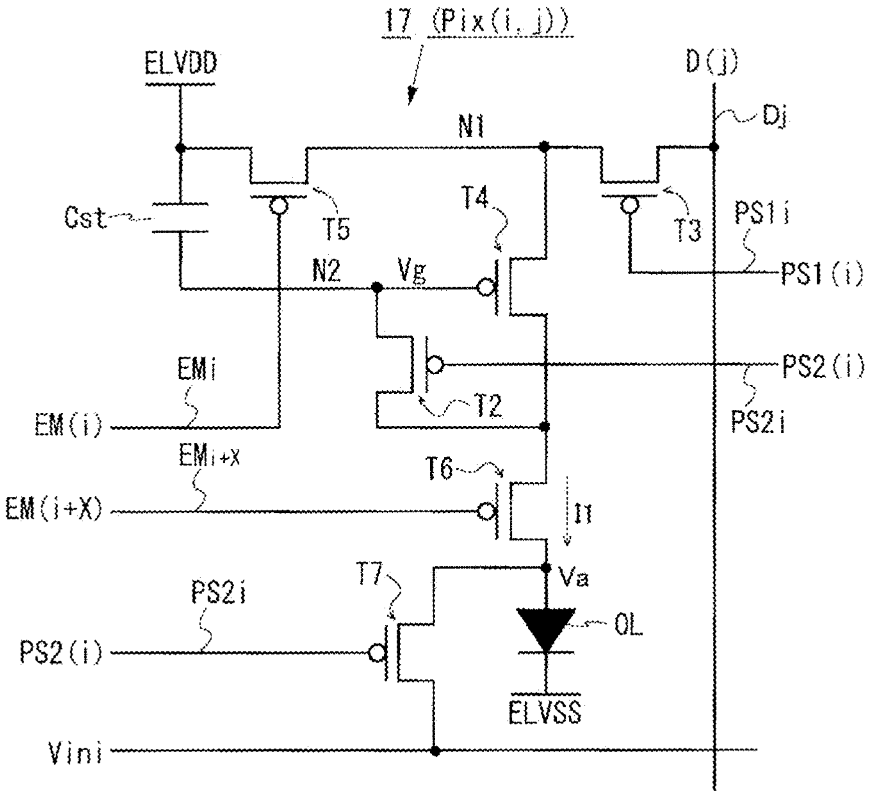
FIG. 22 is a circuit diagram illustrating a configuration of a pixel circuit in a display device according to a third embodiment.

FIG. 22 illustrates the configuration of a pixel circuit 17 corresponding to the i-th first P scanning signal line PS1$i$ and the j-th data signal line Dj in the present embodiment, i.e., the configuration of the pixel circuit Pix(i, j) on the i-th row and j-th column (1≤i≤n, 1≤j≤m). Similar to the pixel circuit 16 (FIG. 15) in the second embodiment, the pixel circuit 17 includes an organic EL element OL as a display element, a drive transistor T4, a write control transistor T3, a threshold compensation transistor T2, a first light emission control transistor T5, a second light emission control transistor T6, a display element initialization transistor T7, and a holding capacitor Cst, and a connection relationship between these elements is the same as that of the pixel circuit 16 in the second embodiment. However, as illustrated in FIG. 22, the first P scanning signal line (hereinafter referred to as the "corresponding first P scanning signal line") PS1$i$ corresponding to the pixel circuit Pix(i, j) is connected to the gate terminal of the write control transistor T3, and the second P scanning signal line (hereinafter referred to as the "corresponding second P scanning signal line") PS2$i$ corresponding to the pixel circuit Pix(i, j) is connected to the gate terminals of the threshold compensation transistor T2 and the display element initialization transistor T7. Thus, the pixel circuit 17 of the present embodiment is different from the pixel circuit 16 of the second embodiment in the point described above. The corresponding light emission control line EMi and subsequent light emission control line EMi+X are connected to the gate terminals of the first and second light emission control transistors T5 and T6, respectively, as in the pixel circuit 16 of the second embodiment (see FIG. 15).

3.3 Operation of Pixel Circuit

Figure 23:
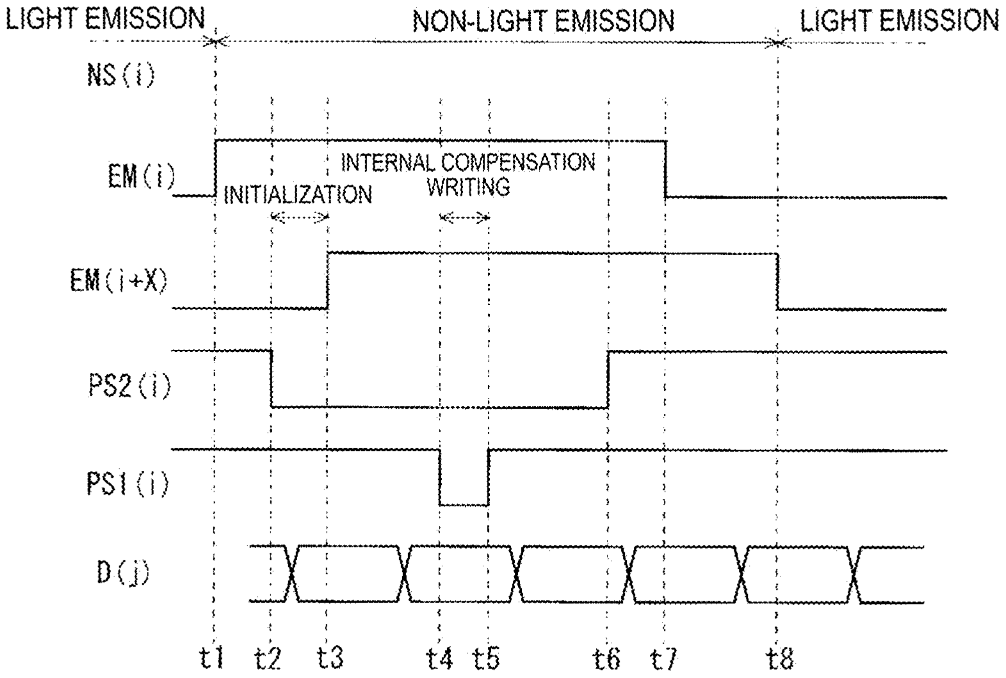
FIG. 23 is a timing chart for describing an operation of the pixel circuit according to the third embodiment.

FIG. 23 is a timing chart for describing an operation of the pixel circuit 17 in the present embodiment. Next, the operation of the pixel circuit 17 illustrated in FIG. 22, that is the operation of the pixel circuit Pix(i, j) on the i-th row and j-th column in the present embodiment will be described with reference to FIGS. 22 and 23. In the pixel circuit 17 of the present embodiment, the first P scanning signal line PS1$i$, the second P scanning signal line PS2$i$, the light emission control line EMi, and the data signal line Dj are driven as illustrated in FIG. 23, whereby the pixel circuit 17 (the pixel circuit Pix(i, j) on the i-th row and j-th column in the present embodiment) operates as follows.

As illustrated in FIG. 23, in the pixel circuit Pix(i, j) in FIG. 22, the corresponding light emission control signal EM(i) and the subsequent light emission control signal EM(i+X) are supplied to the gate terminals of the first and second light emission control transistors T5 and T6, respectively, as in the pixel circuit 16 (FIG. 15) of the second embodiment. Accordingly, in the pixel circuit Pix(i, j) of the present embodiment, a period from time point t1 at which the corresponding light emission control signal EM(i) changes from L level to H level to time point t8 at which the subsequent light emission control signal EM(i+X) changes from H level to L level, is a non-light emission period.

In the non-light emission period, the corresponding second P scanning signal PS2($i$) changes from H level to L level at time t2, and the subsequent light emission control signal EM(i+X) changes from L level to H level at time t3. In the present embodiment, the period from time t2 to time t3 is an initialization period. During the initialization period t2 to t3, since both the corresponding second P scanning signal PS2($i$) and the subsequent light emission control signal EM(i+X) take L level, the threshold compensation transistor T2, the second light emission control transistor T6, and the display element initialization transistor T7 are all in ON state. Because of this, as in the first and second embodiments, in the initialization period t2 to t3, a current flows from the holding capacitor Cst connected to the gate terminal of the drive transistor T4 to an initialization voltage line Vini via the threshold compensation transistor T2, the second light emission control transistor T6, and the display element initialization transistor T7 in sequence, and the gate voltage Vg of the drive transistor T4 is initialized to the initialization voltage Vini. In this way, as in the first embodiment, a path for initializing the gate voltage Vg is formed by the threshold compensation transistor T2, the second light emission control transistor T6, and the display element initialization transistor T7. In the period t2 to t6 (including the initialization period t2 to t3), during which the corresponding second P scanning signal PS2($i$) takes L level, the display element initialization transistor T7 is turned to ON state, whereby a voltage (anode voltage) Va of the anode electrode of the organic EL element OL is initialized. During the initialization period t2 to t3, since the corresponding first P scanning signal PS1($i$) takes H level (see FIG. 23), the write control transistor T3 is in OFF state.

After the initialization period t2 to t3, in the period t3 to t6 until time point t6 at which the corresponding second P scanning signal PS2($i$) changes from L level to H level, the corresponding second P scanning signal PS2($i$) takes L level and the subsequent light emission control signal EM(i+X) takes H level, and therefore the threshold compensation transistor T2 is in ON state and the second light emission control transistor T6 is in OFF state. Within the period t3 to t6, the period t4 to t5 extending from when the corresponding first P scanning signal PS1($i$) changes from H level to L level to when the corresponding first P scanning signal PS1($i$) returns to H level, is a data write period in the present embodiment. Since the corresponding first P scanning signal PS1($i$) takes L level during the data write period t4 to t5, the write control transistor T3 is in ON state. Accordingly, in the data write period t4 to t5, the voltage of the data signal D(j) sent to the pixel circuit Pix(i, j) via the corresponding data signal line Dj is applied, as a data voltage Vdata, to the holding capacitor Cst via the drive transistor T4 in the diode-connected state. As a result, the data voltage having experienced the threshold compensation is written and held in the holding capacitor Cst, and the gate voltage Vg of the drive transistor T4 is maintained at a value corresponding to the holding voltage of the holding capacitor Cst (see Formula (1) described above).

At time t5, the corresponding first P scanning signal PS1($i$) changes from L level to H level, whereby the write control transistor T3 turns to OFF state. Thereafter, at time t6, the corresponding second P scanning signal PS2($i$) changes from L level to H level, whereby both the threshold compensation transistor T2 and the display element initialization transistor T7 turn to OFF state.

Thereafter, at time t7, the corresponding light emission control signal EM(i) changes from H level to L level, whereby the first light emission control transistor T5 turns to ON state. Thereafter, at time t8, the subsequent light emission control signal EM(i+X) changes from H level to L level, whereby the second light emission control transistor T6 also turns to ON state and the light emission period is started. As in the first and second embodiments described above, during the light emission period, a current I1 of the amount corresponding to the voltage (voltage written in the data write period t4 to t5) held by the holding capacitor Cst flows from a high-level power source line ELVDD to a low-level power source line ELVSS via the first light emission control transistor T5, the drive transistor T4, the second light emission control transistor T6, and the organic EL element OL. With this, the organic EL element OL emits light with luminance corresponding to the data voltage Vdata, which is the voltage of the corresponding data signal line Dj, regardless of the threshold voltage Vth of the drive transistor T4 (see Formula (4) described above).

As can be understood from the above-described operation of the pixel circuit Pix(i, j) in the present embodiment (see FIG. 23), it is sufficient that the positive integer X specifying the subsequent light emission control signal EM(i+X) is selected such that the subsequent light emission control signal EM(i+X) changes from L level to H level after the corresponding second P scanning signal PS2(*i*) changes from H level to L level and the H level period (non-active period) of the subsequent light emission control signal EM(i+X) partially overlaps L level period (active period) of the corresponding second P scanning signal PS2(*i*). The data write period t4 to t5 in the present embodiment is set within the overlapping period t3 to t6 (see FIG. 23). Therefore, the first P scanning signal lines PS11 to PS In are driven in such a manner that the select period of the corresponding first P scanning signal line PS1*i* is included in the overlapping period t3 to t6. The light emission control lines EM1 to EMn need to be driven such that the corresponding light emission control line EMi is in the deactivated state at least during the select period of the corresponding second P scanning signal line PS2*i*.

3.4 Gate Driver

The scanning-side drive circuit 40 in the present embodiment functions as a scanning signal line drive circuit and a light emission control circuit as in the first and second embodiments (see FIGS. 1 and 14). The configuration and operation of a gate driver which is a portion of the scanning-side drive circuit 40 functioning as the scanning signal line drive circuit for generating the first and second P scanning signals will be described below.

3.4.1 Configuration of Shift Register

In the present embodiment as well, (n×m) pixel circuits are provided in the display portion 11*b*, as in the first and second embodiments. Hereinafter, among the (n×m) pixel circuits, m pixel circuits Pix(i, 1) to Pix(i, m) aligned in the extending direction of the first and second P scanning signal lines PS1*i* and PS2*i* are referred to as a "pixel row" or simply as a "row" (i=1 to n). The gate driver of the present embodiment is constituted by a shift register configured of a plurality of stages, and then a shift register 301 includes n unit circuits 3(1) to 3(*n*) in one-to-one correspondence with n pixel rows of Pix(1, 1) to Pix(1, m), Pix(2, 1) to Pix(2, m), . . . , Pix(n, 1) to Pix(n, m).

Figure 24:
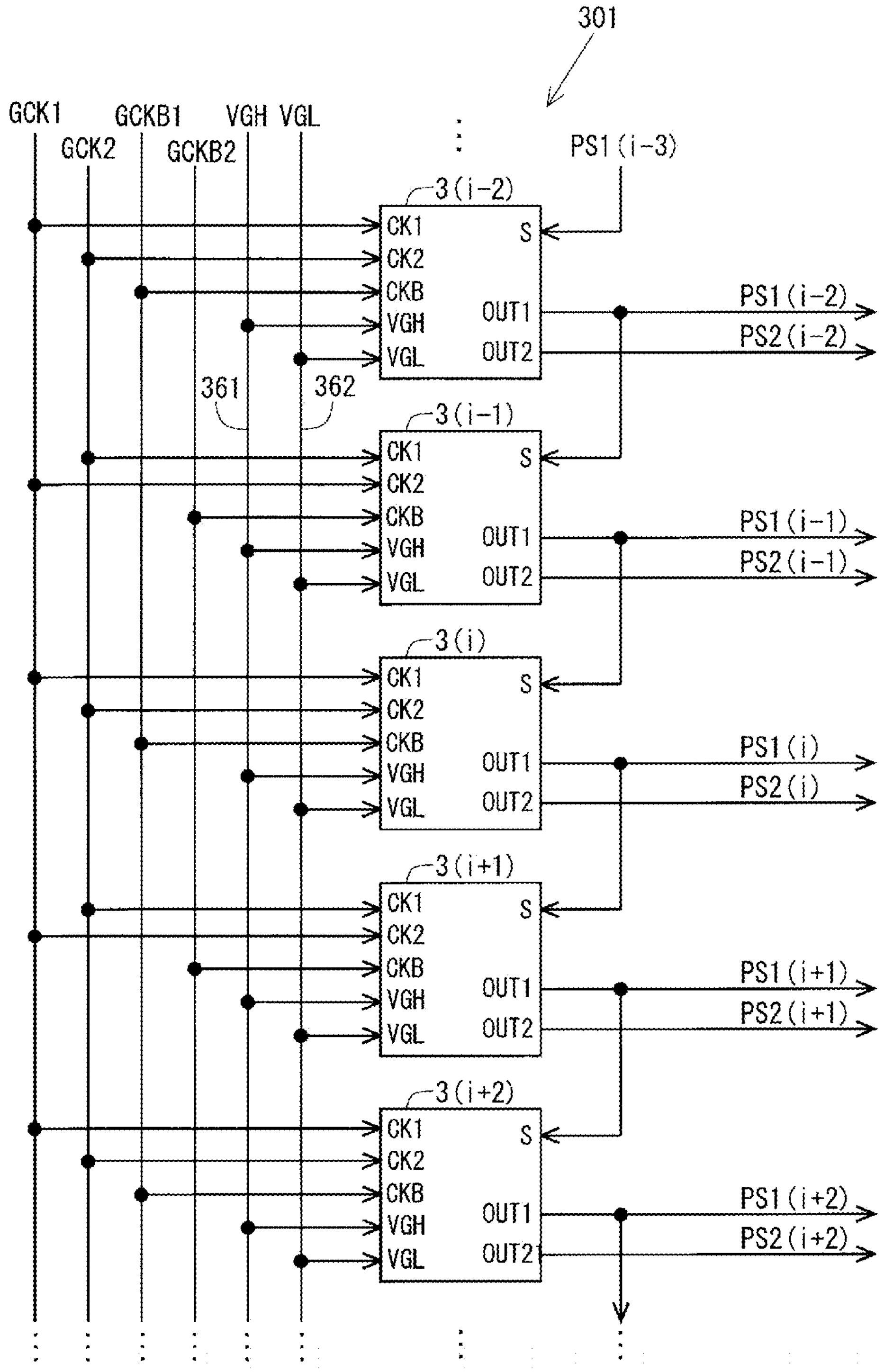
FIG. 24 is a circuit diagram illustrating a schematic configuration of a shift register constituting a gate driver according to the third embodiment.

FIG. 24 is a circuit diagram for describing the schematic configuration of the shift register 301 constituting the gate driver in the present embodiment, in which the configuration of five stages of the shift register 301 is illustrated. Here, it is assumed that i is an even number, and attention is focused on the unit circuits 3(*i*−2), 3(*i*−1), 3(*i*), 3(*i*+1), and 3(*i*+2) respectively provided at the (i−2)-th stage, the (i−1)-th stage, the i-th stage, the (i+1)-th stage, and the (i+2)-th stage. Among the signals included in the scanning-side control signal Scs from the display control circuit 20, a gate start pulse signal, a first gate clock signal GCK1, a second gate clock signal GCK2, a first invert gate clock signal GCKB1, and a second invert gate clock signal GCKB2 are sent to the shift register 301, as the gate control signals GCTL for controlling the gate driver. A gate high voltage VGH as a first constant voltage and a gate low voltage VGL as a second constant voltage are also applied to the shift register 301. The gate high voltage VGH is supplied through a first constant voltage line 361, and is a voltage with a level for bringing a transistor in the pixel circuit 17 into OFF state. The gate low voltage VGL is supplied through a second constant voltage line 362, and is a voltage with a level for bringing a transistor in the pixel circuit 17 into ON state. The gate start pulse signal is a signal supplied to the unit circuit 3(1) of the first stage as a set signal S, and is omitted in FIG. 24.

Each unit circuit 3 includes input terminals for receiving a first control clock signal CK1, a second control clock signal CK2, an invert control clock signal CKB, the set signal S, the gate high voltage VGH and the gate low voltage VGL, and output terminals for outputting a first output signal OUT1 and a second output signal OUT2. The first output signal OUT1 is the first P scanning signal, and the second output signal OUT2 is the second P scanning signal. That is, in each unit circuit 3, the first P scanning signal and the second P scanning signal are generated.

As for the unit circuits 3 at even-numbered stages, the first gate clock signal GCK1 is supplied as the first control clock signal CK1, the second gate clock signal GCK2 is supplied as the second control clock signal CK2, and the first invert gate clock signal GCKB1 is supplied as the invert control clock signal CKB. As for the unit circuits 3 at odd-numbered stages, the second gate clock signal GCK2 is supplied as the first control clock signal CK1, the first gate clock signal GCK1 is supplied as the second control clock signal CK2, and the second invert gate clock signal GCKB2 is supplied as the invert control clock signal CKB. The gate high voltage VGH and the gate low voltage VGL are sent in common to all of the unit circuits 3. To the unit circuit 3(*k*) at each stage, the first output signal OUT1 from the unit circuit of the previous stage is supplied as the set signal S. The first output signal OUT1 from the unit circuit 3(*k*) at each stage is supplied to the corresponding first P scanning signal line PS1*k* as the first P scanning signal PS1(*k*), and the second output signal OUT2 from the unit circuit 3(*k*) at each stage is supplied to the corresponding second P scanning signal line PS2*k* as the second P scanning signal PS2(*k*) (k=1 to n). As illustrated in FIG. 22, focusing on each pixel circuit Pix(i, j) of the i-th row (j=1 to m), the first P scanning signal line PS1*i* is connected to the gate terminal of the write control transistor T3, and the second P scanning signal line PS2*i* is connected to the gate terminals of the threshold compensation transistor T2 and the display element initialization transistor T7.

Figure 26:
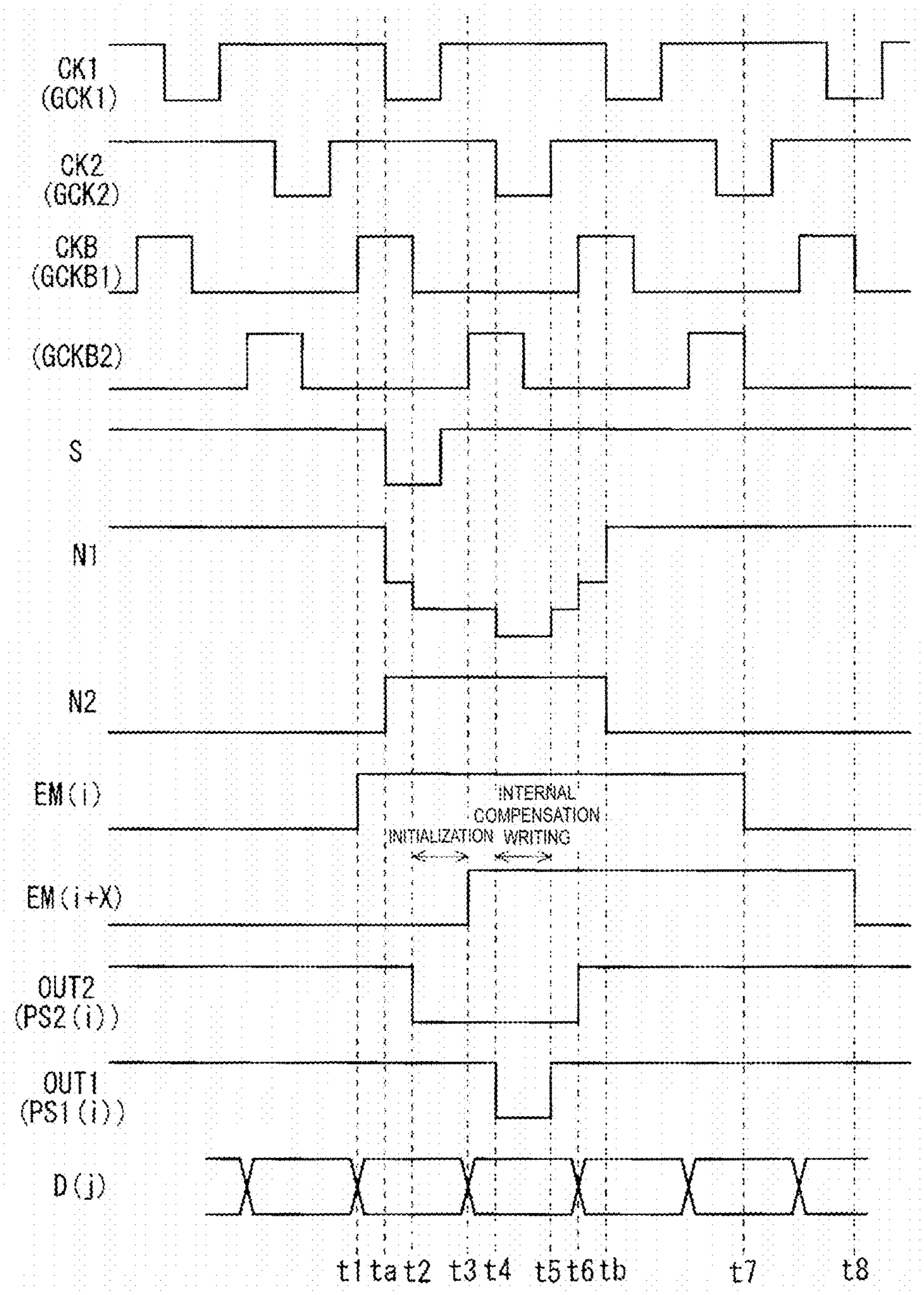
FIG. 26 is a signal waveform diagram for describing an operation of the unit circuit in FIG. 25 according to the third embodiment.

The first gate clock signal GCK1 and the second gate clock signal GCK2 are clock signals similar to the first gate clock signal GCK1 and the second gate clock signal GCK2 used in the first embodiment described above. As illustrated in FIG. 26, the first invert gate clock signal GCKB1 is a logical inversion signal of the first gate clock signal GCK1 with a phase advanced by half the pulse width (more generally, a signal with an advanced phase within a range such that the signal has a pulse overlapping portion with the first gate clock signal GCK1): the second invert gate clock signal GCKB2 is a logical inversion signal of the second gate clock signal GCK2 with a phase advanced by half the pulse width (more generally, a signal with an advanced phase within a range such that the signal has a pulse overlapping portion with the second gate clock signal GCK2).

3.4.2 Unit Circuit

Figure 25:
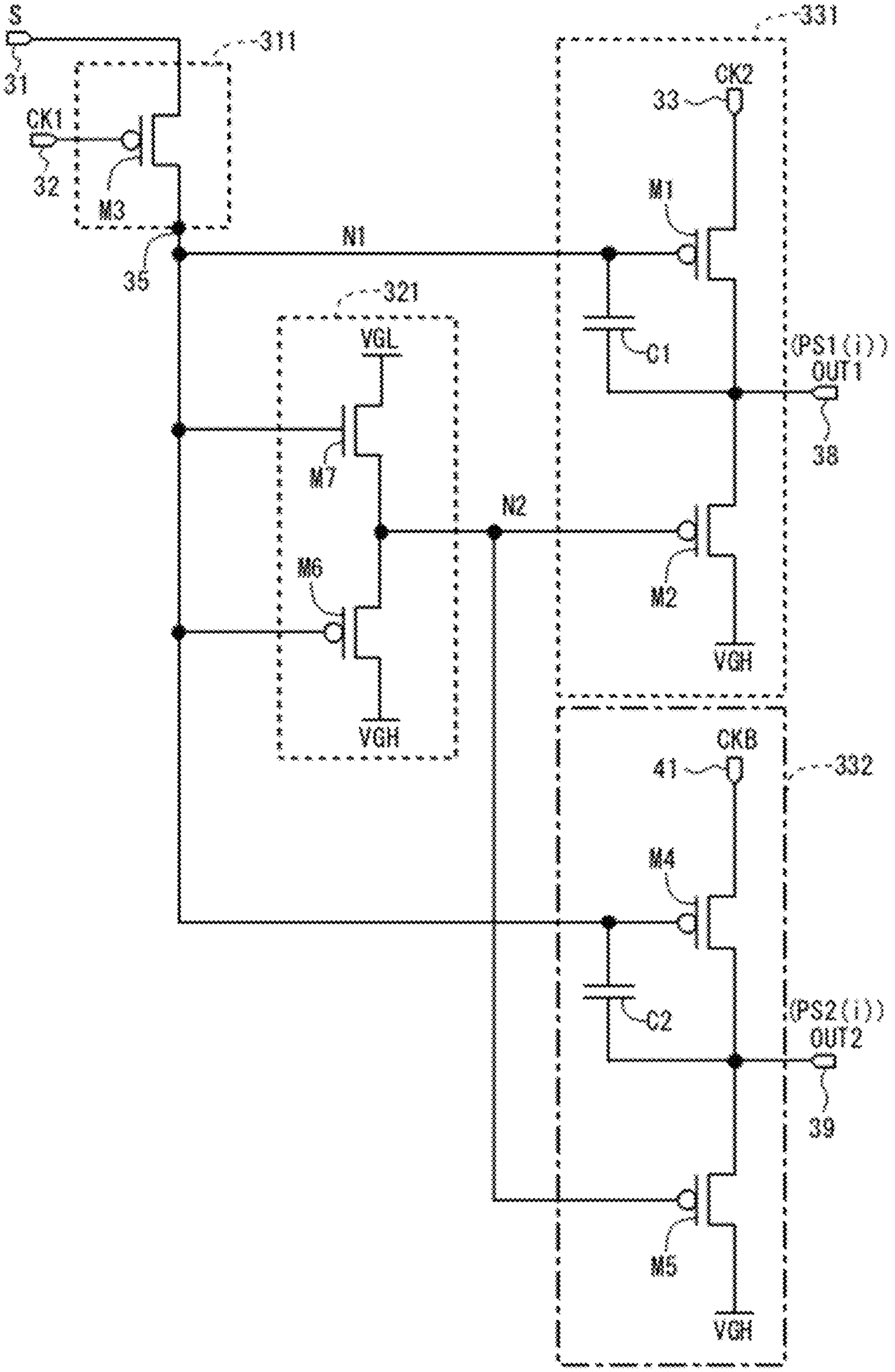
FIG. 25 is a circuit diagram illustrating a configuration example of a unit circuit in the shift register constituting the gate driver according to the third embodiment.

FIG. 25 is a circuit diagram illustrating a configuration example of the unit circuit 3 in the shift register 301 constituting the gate driver according to the present embodiment. As can be understood by comparing FIG. 25 with FIG. 8, the unit circuit 3 in the present embodiment differs from the unit circuit 3 in the first embodiment (FIG. 8) in the configuration of a second output circuit 332 for controlling the output of the second output signal OUT2, and also differs therefrom in that the input terminal 34 for receiving the subsequent scanning signal NS(i+Y) for reset is not provided and an input terminal 41 for receiving the invert control clock signal CKB is provided. Other configurations of the unit circuit 3 in the present embodiment are the same as those of the unit circuit 3 in the first embodiment (FIG. 8). Thus, the portions of the configuration of the unit circuit 3 in the present embodiment that are the same as or correspond to those of the unit circuit 3 in the first embodiment (FIG. 8) are assigned the same reference signs.

As illustrated in FIG. 25, the second output circuit 332 in the present embodiment includes P-type transistors M4 and M5 functioning as switching elements, and a capacitor C2. Regarding the transistor M4, the gate terminal is connected to a first internal node N1, the drain terminal is connected to the input terminal 41, and the source terminal is connected to a second output terminal 39. Regarding the transistor M5, the gate terminal is connected to a second internal node N2, the drain terminal is connected to the second output terminal 39, and the source terminal is connected to the first constant voltage line. Regarding a transistor M6, the gate terminal is connected to the first internal node N1, the source terminal is connected to the first constant voltage line, and the drain terminal is connected to the second internal node N2.

3.4.3 Operation of Shift Register

The operation of the shift register 301 configured as described above will be described below with reference to FIGS. 25 and 26. FIG. 26 is a signal waveform diagram for describing the operation of the unit circuit 3(*i*) at the i-th stage in the shift register 301. In order to facilitate the understanding of the operation of the display device 10*b* in the present embodiment, the light emission control signals EM(i) and EMi(i+X) generated by the scanning-side drive circuit 40 are also depicted in FIG. 26, and the data signal D(j) generated by the data-side drive circuit 30 (j=1 to m) is also depicted in FIG. 26 for the same purpose.

In FIG. 26 as well, as illustrated in FIG. 23, it is assumed that the light emission control signal EM(i) corresponding to the i-th pixel row, that is, the corresponding light emission control signal EM(i) changes from L level to H level at time t1, and the light emission control signal EM(i+X) subsequent to the corresponding light emission control signal, that is, the subsequent light emission control signal EM(i+X) changes from L level to H level at time t3. As depicted in FIG. 26, in a period before time t1, the voltage of the first internal node N1 is maintained at H level, the voltage of the second internal node N2 is maintained at L level, and a first output signal OUT1 (PS1(*i*)) and a second output signal OUT2 (PS2(*i*)) are both maintained at H level. Since the second internal node N2 is maintained at L level, a transistor M2 and the transistor M5 are maintained in ON state.

At time ta in a period from time t1 to time t3, the first control clock signal CK1 changes from H level to L level, whereby a transistor M3 is turned to ON state. Further, at time ta, the set signal S changes from H level to L level. With this, the voltage of the first internal node N1 changes to L level, whereby a transistor M1, the transistor M4, and the transistor M6 are turned to ON state. Thus, the voltage of the second internal node N2 changes from L level to H level, whereby the transistor M2 and a transistor M5 are turned to OFF state.

Then, at time t2, the invert control clock signal CKB changes from H level to L level. At this time, since the transistor M4 is in ON state, along with the voltage drop of the input terminal 41, the voltage (voltage of the second output signal OUT2) of the second output terminal 39 drops. Here, since the capacitor C2 is provided between the first internal node N1 and the second output terminal 39, along with the voltage drop of the second output terminal 39, the voltage of the first internal node N1 also drops. As a result, a large negative voltage is applied to the gate terminal of the transistor M4. Due to such a bootstrap operation, the voltage of the second output signal OUT2, that is, the voltage of the second P scanning signal PS2(*i*) drops to a level sufficient to cause the threshold compensation transistor T2 and the display element initialization transistor T7, to which the second output terminal 39 is connected, to be in ON state.

Thereafter, the subsequent light emission control signal EM(i+X) changes from L level to H level at time t3, and then the second control clock signal CK2 changes from H level to L level at time t4. At this time, since the transistor M1 is in ON state, along with the voltage drop of an input terminal 33, the voltage of a first output terminal 38 (voltage of the first output signal OUT1) drops. Here, since a capacitor C1 is provided between the first internal node N1 and the first output terminal 38, along with the voltage drop of the first output terminal 38, the voltage of the first internal node N1 further drops. As a result, a large negative voltage is applied to the gate terminal of the transistor M1. Due to such a bootstrap operation, the voltage of the first output signal OUT1, that is, the voltage of the first P scanning signal PS1(*i*) drops to a level sufficient to cause the write control transistor T3 connected with the first output terminal 38 to be in ON state.

Then, at time t5, the second control clock signal CK2 changes from L level to H level. Thus, along with the voltage rise of the input terminal 33, the voltage of the first output terminal 38 (voltage of the first output signal OUT1, that is, the voltage of the first P scanning signal PS1(*i*)) rises. This causes the write control transistor T3 connected with the first output terminal 38 to be in OFF state. When the voltage of the first output terminal 38 rises, the voltage of the first internal node N1 also rises through the capacitor C1.

Then, at time t6, the invert control clock signal CKB changes from L level to H level. Thus, along with the voltage rise of the input terminal 41, the voltage of the second output terminal 39 (voltage of the second output signal OUT2, that is, the voltage of the second P scanning signal PS2(*i*)) rises. This turns the threshold compensation transistor T2 and the display element initialization transistor T7, to which the second output terminal 39 is connected, to OFF state. When the voltage of the second output terminal 39 rises, the voltage of the first internal node N1 also rises through the capacitor C2.

Then, at time tb, the first control clock signal CK1 changes from H level to L level. This turns the transistor M3 to ON state. At this time, the set signal S is maintained at H level. Because of this, the voltage of the first internal node N1 rises to H level, the transistors M1, M4 and M6 are turned to OFF state, and the transistor M7 is turned to ON state. As a result, the voltage of the second internal node N2 also changes from H level to L level. By the voltage of the second internal node N2 changing to L level, the transistors M2 and M5 are turned to ON state.

In a period after time tb, as in a period before time t1, the voltage of the first internal node N1 is maintained at H level, the voltage of the second internal node N2 is maintained at L level, and the first and second output signals OUT1 and OUT2, that is, the first and second P scanning signals PS1(*i*) and PS2(*i*) are both maintained at H level. In FIG. 26 as well, as illustrated in FIG. 23, the corresponding light emission control signal EM(i) changes to L level at time t7, thereafter the subsequent light emission control signal EM(i+X) also changes to L level at time t8, and thus the light emission period starts from time t8.

In the shift register 301 constituting the gate driver (the scanning signal line drive circuit) of the present embodiment, the unit circuits 3 configured to operate as described above are cascade-connected as illustrated in FIG. 24, and the gate start pulse signal included in the scanning-side control signal Scs is input to the first stage thereof. With this, the first P scanning signals PS1(1) to PS1(*n*) for sequentially selecting the first P scanning signal lines PS11 to PS1*n* are generated, and the second P scanning signals PS2(1) to PS2(*n*) for sequentially selecting the second P scanning signal lines PS21 to PS2*n* are generated: the first P scanning signals PS1(1) to PS1(*n*) are applied to the first P scanning signal lines PS11 to PS1*n* respectively, and the second P scanning signals PS2(1) to PS2(*n*) are applied to the second P scanning signal lines PS21 to PS2*n* respectively.

In this manner, by driving the first P scanning signal lines PS11 to PS1*n* and the second P scanning signal lines PS21 to PS2*n*, and driving the light emission control lines EM1 to EMn+X as described before, the pixel circuit 17 (the pixel circuit Pix(i, j) depicted in FIG. 22) in the present embodiment operates substantially similarly to the pixel circuit 15 (the pixel circuit Pix(i, j) depicted in FIG. 5) in the first embodiment.

3.5 Effects

According to the present embodiment described above, even in a case where only P-type transistors are used for the transistors in the pixel circuits of the organic EL display device employing the internal compensation method as illustrated in FIG. 22, the Pix(i, j) as the pixel circuit 17 on the i-th row and j-th column operates based on the first P scanning signal PS1(*i*), the second P scanning signal PS2(*i*), and the light emission control signals EM(i) and EM(i+X): as discussed above, in the pixel circuit Pix(i, j) (i=1 to n, j=1 to m), a path for initializing the gate voltage Vg of the drive transistor T4 is formed by the threshold compensation transistor T2, the second light emission control transistor T6, and the display element initialization transistor T7, and it is unnecessary to provide a transistor as a switching element for initializing the gate voltage between the holding capacitor and the initialization voltage line. Thus, according to the present embodiment, in the organic EL display device employing the internal compensation method using the pixel circuit 17, in which no N-type transistor is used but only P-type transistors are used, the number of elements constituting the pixel circuit is reduced, thereby making it possible to achieve the high-resolution of the display image with ease and improve the yield of manufacturing.

4. Modified Example

The disclosure is not limited to each of the embodiments described above, and various modifications may be made without departing from the scope of the disclosure. For example, the following modified example can be considered.

In each of the embodiments described above, the pixel circuits 15, 16 and 17, and the unit circuit 3 in the scanning-side drive circuit 40 include P-type transistors and N-type transistors. Typically, an LTPS-TFT having high mobility is used for a P-type transistor, and an oxide TFT such as an IGZO-TFT having excellent off-leakage characteristics is used for an N-type transistor. However, the disclosure is not limited to these TFTs. For example, in the first to third embodiments, a configuration using an N-type LTPS-TFT may be employed.

In each of the above-described embodiments, the shift register 301 constituting the gate driver as the scanning signal line drive circuit included in the scanning-side drive circuit 40 is configured to operate by the two-phase clock signal composed of the first and second gate clock signals GCK1 and GCK2 (see FIGS. 7, 18, and 24), but may be configured to operate by a multiphase clock signal including three or more phases. A predetermined number of two or more clock signals constituting the multiphase clock signal for the operation of the shift register 301 cyclically correspond to a plurality of the unit circuits 3(1) to 3(*n*) cascade-connected to each other to constitute the shift register 301, and a corresponding clock signal among the predetermined number of clock signals is input to each of the plurality of the unit circuits 3(1) to 3(*n*).

The unit circuit 3 having the configuration illustrated in FIG. 19 is used in the shift register 301 constituting the gate driver included in the scanning-side drive circuit 40 in the second embodiment. However, instead of the above unit circuit 3, the unit circuit 3 having the configuration illustrated in FIG. 8 or the unit circuit 3 having the configuration illustrated in FIG. 10 may be used in a case where the pause driving is not performed.

In the above description, an organic EL display device has been exemplified to describe each embodiment and a modified example thereof. However, the disclosure is not limited to an organic EL display device, and is applicable to any display device employing an internal compensation method and using a display element driven by a current. The display element that can be used in such a configuration is a display element in which luminance, transmittance, or other factors are controlled by a current and includes, for example, an organic EL element, that is, an organic light-emitting diode (OLED), or an inorganic light-emitting diode, a quantum dot light-emitting diode (QLED) or the like.

REFERENCE SIGNS LIST

10, **10*b*** Organic EL display device
11, **11*b*** Display portion
15, 16, 17 Pixel circuit
20 Display control circuit
30 Data-side drive circuit (data signal line drive circuit)
40 Scanning-side drive circuit (scanning signal line drive/light emission control circuit)
361 First constant voltage line
362 Second constant voltage line
Pix(i, j) Pixel circuit (i=1 to n, j=1 to m)
Dj Data signal line (j=1 to m)
PSi First scanning signal line (i=1 to n)
NSi Second scanning signal line (i=1 to n)
PS1*i* First P scanning signal line (i=1 to n)
PS2*i* Second P scanning signal line (i=1 to n)
EMi Light emission control line (i=1 to n)
ELVDD High-level power source line (first power source line), high-level power source voltage ELVSS Low-level power source line (second power source line), low-level power source voltage
Vini Initialization voltage line
OL Organic EL element (display element)
Cst Holding capacitor
T1 First initialization transistor (first initialization switching element)
T2 Threshold compensation transistor (threshold compensation switching element)
T3 Write control transistor (write control switching element)
T4 Drive transistor
T5 First light emission control transistor (first light emission control switching element)
T6 Second light emission control transistor (second light emission control switching element)
T7 Display element initialization transistor (initialization switching element)
M1 to M10 Transistor (in unit circuit)
N1 to N2 Internal node (in unit circuit)
C1, C2 Capacitor
TD Drive period
TP Pause period
VGH First constant voltage
VGL Second constant voltage
VGH2 Drive-time gate high signal
Vob On-bias voltage

The invention claimed is:

1. A display device, comprising:

a display portion including a plurality of data signal lines, a plurality of first scanning signal lines, a plurality of second scanning signal lines, a plurality of light emission control lines, a first power source line, a second power source line, an initialization voltage line, and a plurality of pixel circuits;

a data-side drive circuit configured to generate a plurality of data signals and apply the generated data signals to the plurality of data signal lines; and a scanning-side drive circuit configured to selectively drive the plurality of first scanning signal lines, selectively drive the plurality of second scanning signal lines, and selectively deactivate the plurality of light emission control lines, wherein each of the plurality of pixel circuits corresponds to one of the plurality of data signal lines, corresponds to one of the plurality of first scanning signal lines, corresponds to one of the plurality of second scanning signal lines, and corresponds to one of the plurality of light emission control lines, and includes a display element driven by a current, a drive transistor, a holding capacitor, a write control switching element, a threshold compensation switching element, first and second light emission control switching elements whose conductivity types are different from a conductivity type of the threshold compensation switching element, and an initialization switching element whose conductivity type is identical to the conductivity type of the threshold compensation switching element, the drive transistor has a first conduction terminal connected to a corresponding data signal line via the write control switching element and connected to the first power source line via the first light emission control switching element, a second conduction terminal connected to a first terminal of the display element via the second light emission control switching element, and a control terminal connected to a fixed voltage line via the holding capacitor and connected to the second conduction terminal via the threshold compensation switching element, the first terminal of the display element is connected to the initialization voltage line via the initialization switching element, and a second terminal of the display element is connected to the second power source line, the first light emission control switching element has a control terminal connected to a corresponding light emission control line, the write control switching element has a control terminal connected to a corresponding first scanning signal line, the threshold compensation switching element has a control terminal connected to a corresponding second scanning signal line, the initialization switching element has a control terminal connected to the corresponding light emission control line, the second light emission control switching element has a control terminal connected to a subsequent signal line which is either a subsequent second scanning signal line selected after the corresponding second scanning signal line or a subsequent light emission control line deactivated after the corresponding light emission control line, the subsequent second scanning signal line is a second scanning signal line that is selected from the plurality of second scanning signal lines such that a select period of the corresponding second scanning signal line overlaps with a select period of the subsequent second scanning signal line, the subsequent light emission control line is a light emission control that is line selected from the plurality of light emission control lines such that the subsequent light emission control line is deactivated after a start time point of selection of the corresponding second scanning signal line, and such that a select period of the corresponding second scanning signal line overlaps with a select period as a deactivation period of the subsequent light emission control line, and the scanning-side drive circuit drives the plurality of first scanning signal lines such that the corresponding first scanning signal line is in a non-select state from the start time point of selection of the corresponding second scanning signal line to a start time point of selection of the subsequent signal line, and is in a select state in an overlapping period of the select period of the corresponding second scanning signal line and the select period of the subsequent signal line, and selectively deactivates the plurality of light emission control lines such that the corresponding light emission control line is in a deactivated state during the select period of the corresponding second scanning signal line.

2. The display device according to claim 1, wherein the scanning-side drive circuit includes a shift register configured of a plurality of unit circuits cascade-connected to each other, a first constant voltage line configured to supply a first constant voltage equivalent to a voltage of the first scanning signal line in a non-select state and a voltage of the second scanning signal line in a select state, and a second constant voltage line configured to supply a second constant voltage equivalent to a voltage of the first scanning signal line in the select state and a voltage of the second scanning signal line in the non-select state, the shift register is configured to receive, at a first stage from an outside, an input signal allowed to take two logic levels consisting of first and second levels, and to serially transfer a logic level indicated by the input signal from the first stage toward a final stage in accordance with a two-phase clock signal, of first and second clock signals constituting the two-phase clock signal, the first clock signal is input as a first control clock signal and the second clock signal is input as a second control clock signal to an even-numbered unit circuit, to an odd-numbered unit circuit, the second clock signal is input as the first control clock signal and the first clock signal is input as the second control clock signal, and each unit circuit is a bistable circuit corresponding to one of the plurality of first scanning signal lines and corresponding to one of the plurality of second scanning signal lines, is configured to receive the input signal of a logic level supplied from the unit circuit of a previous stage or from the outside, and includes a first internal node configured to selectively hold the two logic levels, a first control circuit configured to supply the input signal received by the each unit circuit to the first internal node at a timing corresponding to the first control clock signal, a first output circuit including a first output switching element that is in ON state when the logic level of the first internal node is the first level and is in OFF state when the logic level of the first internal node is the second level, and configured to output the second control clock signal to a corresponding first scanning signal line via the first output switching element when the logic level of the first internal node is the first level and to output the first constant voltage to the corresponding first scanning signal line when the logic level of the first internal node is the second level, and a second output circuit including a second output switching element that is in ON state when the logic level of the first internal node is the first level and is in OFF state when the logic level of the first internal node is the second level and also including a switching element for reset that is in ON state in a select period of the scanning signal line for reset serving as a predetermined second scanning signal line selected after the subsequent second scanning signal line and is in OFF state in a non-select period of the scanning signal line for reset, and configured to output the first constant voltage to the corresponding second scanning signal line via the second output switching element when the logic level of the first internal node is the first level and to output the second constant voltage to the corresponding second scanning signal line via the switching element for reset when the scanning signal line for reset is in the select state.

3. The display device according to claim 1, wherein the scanning-side drive circuit includes a shift register configured of a plurality of unit circuits cascade-connected to each other, a first constant voltage line configured to supply a first constant voltage equivalent to a voltage of the first scanning signal line in a non-select state and a voltage of the second scanning signal line in a select state, and a second constant voltage line configured to supply a second constant voltage equivalent to a voltage of the first scanning signal line in the select state and a voltage of the second scanning signal line in the non-select state, the shift register is configured to receive, at a first stage from an outside, an input signal allowed to take two logic levels consisting of first and second levels, and to serially transfer a logic level indicated by the input signal from the first stage toward a final stage in accordance with a two-phase clock signal, of first and second clock signals configuring the two-phase clock signal, the first clock signal is input as a first control clock signal and the second clock signal is input as a second control clock signal to an even-numbered unit circuit, to an odd-numbered unit circuit, the second clock signal is input as the first control clock signal and the first clock signal is input as the second control clock signal, and each unit circuit is a bistable circuit corresponding to one of the plurality of first scanning signal lines and corresponding to one of the plurality of second scanning signal lines, is configured to receive the input signal of the logic levels supplied from the unit circuit of a previous stage or from the outside, and includes a first internal node configured to selectively hold the two logic levels, a first control circuit configured to supply the input signal received by the each unit circuit to the first internal node at a timing corresponding to the first control clock signal, a first output circuit including a first output switching element that is in ON state in a case where the logic level of the first internal node is the first level and is in OFF state in a case where the logic level of the first internal node is the second level, and configured to output the second control clock signal to a corresponding first scanning signal line via the first output switching element in a case where the logic level of the first internal node is the first level and to output the first constant voltage to the corresponding first scanning signal line in a case where the logic level of the first internal node is the second level, and a second output circuit configured to generate a signal obtained by logically inverting a logical sum of a logical value indicated by the first internal node in a previous-stage unit circuit and a logical value indicated by the first internal node in a subsequent-stage unit circuit, and to output the generated signal to a corresponding second scanning signal line.

4. The display device according to claim 1, further comprising:

a display control circuit configured to control the data-side drive circuit and the scanning-side drive circuit such that a drive period including a refresh frame period for writing voltages of the plurality of data signals as data voltages into the plurality of pixel circuits and a pause period including a non-refresh frame period for stopping the writing of the data voltages into the plurality pixel circuits alternately appear, wherein the control terminal of the second light emission control transistor is connected to the subsequent light emission control line.

5. The display device according to claim 4, wherein the display control circuit controls, in the drive period, the data-side drive circuit and the scanning-side drive circuit such that a voltage of the corresponding data signal line is written into and held in the holding capacitor as a data voltage via the write control transistor, the drive transistor and the threshold compensation transistor when the first and second light emission control transistors are in OFF state, and such that a current corresponding to the voltage held in the holding capacitor flows through the display element when the first and second light emission control transistors are in ON state, and controls, in the pause period, the data-side drive circuit and the scanning-side drive circuit such that a voltage of the corresponding data signal line is applied as a bias voltage to the first conduction terminal of the drive transistor via the write control transistor when the first and second light emission control transistors are in OFF state, and such that a current corresponding to the voltage held in the holding capacitor flows through the display element when the first and second light emission control transistors are in ON state.

6. The display device according to claim 4, wherein the scanning-side drive circuit includes a shift register configured of a plurality of unit circuits cascade-connected to each other, a first constant voltage line configured to supply a first constant voltage equivalent to a voltage of the first scanning signal line in a non-select state and a voltage of the second scanning signal line in a select state, and a second constant voltage line configured to supply a second constant voltage equivalent to a voltage of the first scanning signal line in the select state and a voltage of the second scanning signal line in the non-select state, the shift register is configured to receive, at a first stage from an outside, an input signal allowed to take two logic levels including first and second levels, and to serially transfer a logic level indicated by the input signal from the first stage toward a final stage in accordance with a two-phase clock signal, of first and second clock signals constituting the two-phase clock signal, the first clock signal is input as a first control clock signal and the second clock signal is input as a second control clock signal to an even-numbered unit circuit, to an odd-numbered unit circuit, the second clock signal is input as the first control clock signal and the first clock signal is input as the second control clock signal, and each unit circuit is a bistable circuit corresponding to one of the plurality of first scanning signal lines and corresponding to one of the plurality of second scanning signal lines, is configured to receive the input signal of a logic level supplied from the unit circuit of a previous stage or from the outside and to receive a mode signal indicating whether a period during which the shift register is caused to operate is the drive period or the pause period, and includes a first internal node configured to selectively hold the two logic levels, a first control circuit configured to supply the input signal received by the each unit circuit to the first internal node at a timing corresponding to the first control clock signal, a first output circuit including a first output switching element that is in ON state when the logic level of the first internal node is the first level and is in OFF state when the logic level of the first internal node is the second level, and configured to output the second control clock signal to a corresponding first scanning signal line via the first output switching element when the logic level of the first internal node is the first level and to output the first constant voltage to the corresponding first scanning signal line when the logic level of the first internal node is the second level, and a second output circuit configured to output a signal of a logic level obtained by inverting a logic level of the first internal node to a corresponding second scanning signal line when the mode signal indicates the drive period, and to output the second constant voltage to the corresponding second scanning signal line when the mode signal indicates the pause period.

7. The display device according to claim 1, wherein the drive transistor, the write control switching element, and the first and second light emission control switching elements are P-type transistors, and the threshold compensation switching element and the initialization switching element are N-type transistors.

8. The display device according to claim 7, wherein, of the transistors included in each pixel circuit, the P-type transistors are each a thin film transistor including a channel layer formed of low-temperature polysilicon, and the N-type transistors are each a thin film transistor including a channel layer formed of an oxide semiconductor.

9. A display device, comprising:

a display portion including a plurality of data signal lines, a plurality of first scanning signal lines, a plurality of second scanning signal lines, a plurality of light emission control lines, a first power source line, a second power source line, an initialization voltage line, and a plurality of pixel circuits;

a data-side drive circuit configured to generate a plurality of data signals and apply the generated data signals to the plurality of data signal lines; and a scanning-side drive circuit configured to selectively drive the plurality of first scanning signal lines, selectively drive the plurality of second scanning signal lines, and selectively deactivate the plurality of light emission control lines, wherein each of the plurality of pixel circuits corresponds to one of the plurality of data signal lines, corresponds to one of the plurality of first scanning signal lines, corresponds to one of the plurality of second scanning signal lines, and corresponds to one of the plurality of light emission control lines, and includes a display element driven by a current, a drive transistor, a holding capacitor, a write control switching element, a threshold compensation switching element, first and second light emission control switching elements, and an initialization switching element, the drive transistor, the write control switching element, the threshold compensation switching element, the first and second light emission control switching elements, and the initialization switching element are transistors whose conductivity types are all identical, the drive transistor has a first conduction terminal connected to a corresponding data signal line via the write control switching element and connected to the first power source line via the first light emission control switching element, a second conduction terminal connected to a first terminal of the display element via the second light emission control switching element, and a control terminal connected to a fixed voltage line via the holding capacitor and connected to the second conduction terminal via the threshold compensation switching element, the first terminal of the display element is connected to the initialization voltage line via the initialization switching element, and a second terminal of the display element is connected to the second power source line, the first light emission control switching element has a control terminal connected to a corresponding light emission control line, the write control switching element has a control terminal connected to a corresponding first scanning signal line, the threshold compensation switching element has a control terminal connected to a corresponding second scanning signal line, the initialization switching element has a control terminal connected to the corresponding second scanning signal line, the second light emission control switching element has a control terminal connected to a subsequent light emission control line that is deactivated after the corresponding light emission control line is deactivated, the subsequent light emission control line is a light emission control line that is selected from the plurality of light emission control lines such that the subsequent light emission control line is deactivated after a start time point of selection of the corresponding second scanning signal line, and such that a select period of the corresponding second scanning signal line overlaps with a select period as a deactivation period of the subsequent light emission control line, and the scanning-side drive circuit drives the plurality of first scanning signal lines such that the corresponding first scanning signal line is in a non-select state from the start time point of selection of the corresponding second scanning signal line to a start time point of deactivation of the subsequent light emission control line, and is in a select state in an overlapping period of the select period of the corresponding second scanning signal line and the select period of the subsequent light emission control line, and selectively deactivates the plurality of light emission control lines such that the corresponding light emission control line is in a deactivated state during the select period of the corresponding second scanning signal line.

10. The display device according to claim 9, wherein the scanning-side drive circuit includes a shift register configured of a plurality of unit circuits cascade-connected to each other, a first constant voltage line configured to supply a first constant voltage equivalent to a voltage of the first scanning signal line in a non-select state and a voltage of the second scanning signal line in a non-select state, and a second constant voltage line configured to supply a second constant voltage equivalent to a voltage of the first scanning signal line in a select state and a voltage of the second scanning signal line in a select state, the shift register is configured to receive, at a first stage from an outside, an input signal allowed to take two logic levels consisting of first and second levels, and to serially transfer a logic level indicated by the input signal from the first stage toward a final stage in accordance with a two-phase clock signal, of first and second clock signals constituting the two-phase clock signal, the first clock signal is input as a first control clock signal and the second clock signal is input as a second control clock signal to an even-numbered unit circuit, and a signal obtained by logically inverting the first clock signal and advancing a phase of the inverted signal within a range such that the inverted signal has an overlapping portion of pulses with the first clock signal is also input as an invert control clock signal to the even-numbered unit circuit, to an odd-numbered unit circuit, the second clock signal is input as the first control clock signal and the first clock signal is input as the second control clock signal, and a signal obtained by logically inverting the second clock signal and advancing a phase of the inverted signal within a range such that the inverted signal has an overlapping portion of pulses with the second clock signal is also input as an invert control clock signal, and each unit circuit is a bistable circuit corresponding to one of the plurality of first scanning signal lines and corresponding to one of the plurality of second scanning signal lines, is configured to receive the input signal of a logic level supplied from the unit circuit of a previous stage or from the outside, and includes a first internal node configured to selectively hold the two logic levels, a first control circuit configured to supply the input signal received by the each unit circuit to the first internal node at a timing corresponding to the first control clock signal, a first output circuit including a first output switching element that is in ON state when the logic level of the first internal node is the first level and is in OFF state when the logic level of the first internal node is the second level, and configured to output the second control clock signal to a corresponding first scanning signal line via the first output switching element when the logic level of the first internal node is the first level and to output the first constant voltage to the corresponding first scanning signal line when the logic level of the first internal node is the second level, and a second output circuit including a second output switching element that is in ON state when the logic level of the first internal node is the first level and is in OFF state when the logic level of the first internal node is the second level, and configured to output the invert control clock signal to a corresponding second scanning signal line via the second output switching element when the logic level of the first internal node is the first level and to output the first constant voltage to the corresponding second scanning signal line when the logic level of the first internal node is the second level.

11. The display device according to claim 9, wherein each of the drive transistor, the write control switching element, the threshold compensation switching element, the first and second light emission control switching elements, and the initialization switching element is a P-type transistor.

12. The display device according to claim 9, wherein each of the drive transistor, the write control switching element, the threshold compensation switching element, the first and second light emission control switching elements, and the initialization switching element is a thin film transistor including a channel layer formed of low-temperature polysilicon.

13. A drive method of a display device using a display element driven by a current, wherein the display device includes a display portion including a plurality of data signal lines, a plurality of first scanning signal lines, a plurality of second scanning signal lines, a plurality of light emission control lines, a first power source line, a second power source line, an initialization voltage line, and a plurality of pixel circuits, each of the plurality of pixel circuits corresponds to one of the plurality of data signal lines, corresponds to one of the plurality of first scanning signal lines, corresponds to one of the plurality of second scanning signal lines, and corresponds to one of the plurality of light emission control lines, and includes a display element driven by a current, a drive transistor, a holding capacitor, a write control switching element, a threshold compensation switching element, first and second light emission control switching elements whose conductivity types are different from a conductivity type of the threshold compensation switching element, and an initialization switching element whose conductivity type is identical to the conductivity type of the threshold compensation switching element, the drive transistor has a first conduction terminal connected to a corresponding data signal line via the write control switching element and connected to the first power source line via the first light emission control switching element, a second conduction terminal connected to a first terminal of the display element via the second light emission control switching element, and a control terminal connected to a fixed voltage line via the holding capacitor and connected to the second conduction terminal via the threshold compensation switching element, the first terminal of the display element is connected to the initialization voltage line via the initialization switching element, and a second terminal of the display element is connected to the second power source line, the first light emission control switching element has a control terminal connected to a corresponding light emission control line, the write control switching element has a control terminal connected to a corresponding first scanning signal line, the threshold compensation switching element has a control terminal connected to a corresponding second scanning signal line, the initialization switching element has a control terminal connected to the corresponding light emission control line, the second light emission control switching element has a control terminal connected to a subsequent signal line which is either a subsequent second scanning signal line selected after the corresponding second scanning signal line or a subsequent light emission control line deactivated after the corresponding light emission control line, the subsequent second scanning signal line is a second scanning signal line that is selected from the plurality of second scanning signal lines such that a select period of the corresponding second scanning signal line overlaps with a select period of the subsequent second scanning signal line, the subsequent light emission control line is a light emission control line that is selected from the plurality of light emission control lines such that the subsequent light emission control line is deactivated after a start time point of selection of the corresponding second scanning signal line, and such that a select period of the corresponding second scanning signal line overlaps with a select period as a deactivation period of the subsequent light emission control line, and the drive method includes driving the plurality of first scanning signal lines such that the corresponding first scanning signal line is in a non-select state from the start time point of selection of the corresponding second scanning signal line to a start time point of selection of the subsequent signal line, and is in a select state in an overlapping period of the select period of the corresponding second scanning signal line and the select period of the subsequent signal line, and selectively deactivating the plurality of light emission control lines such that the corresponding light emission control line is in a deactivated state during the select period of the corresponding second scanning signal line.

14. The drive method according to claim 13, further comprising:

performing pause driving to drive the plurality data signal lines, the plurality of first scanning signal lines, the plurality of second scanning signal lines, and the plurality of light emission control lines such that a drive period including a refresh frame period for writing voltages of the plurality of data signals as data voltages into the plurality of pixel circuits and a pause period including a non-refresh frame period for stopping the writing of the data voltages into the plurality pixel circuits alternately appear, wherein the control terminal of the second light emission control switching element is connected to the subsequent light emission control line.

15. The drive method according to claim 14, wherein the performing pause driving includes performing drive-period driving to drive the plurality of data signal lines, the plurality of first scanning signal lines, the plurality of second scanning signal lines, and the plurality of light emission control lines in the drive period such that a voltage of the corresponding data signal line is written into and held in the holding capacitor as a data voltage via the write control switching element, the drive transistor, and the threshold compensation switching element when the first and second light emission control switching elements are in OFF state, and such that a current corresponding to the voltage held in the holding capacitor flows through the display element when the first and second light emission control switching elements are in ON state, and performing pause-period driving to drive the plurality of data signal lines, the plurality of first scanning signal lines, the plurality of second scanning signal lines, and the plurality light emission control lines in the pause period such that the voltage of the corresponding data signal line is applied as a bias voltage to the first conduction terminal of the drive transistor via the write control switching element when the first and second light emission control switching elements are in OFF state, and a current corresponding to the voltage held in the holding capacitor flows through the display element when the first and second light emission control switching elements are in ON state.

* * * * *